(12) United States Patent
Godfrey et al.

(10) Patent No.: US 6,493,657 B1
(45) Date of Patent: Dec. 10, 2002

(54) AMPLITUDE RANGE MATCHING SYSTEM

(75) Inventors: Andrew David Patrick Godfrey, London (GB); Michael Adrian Lynch, London (GB)

(73) Assignee: GLP Partnership, London (GB)

( * ) Notice: Subject to any disclaimer, the term of this patent is extended or adjusted under 35 U.S.C. 154(b) by 0 days.

(21) Appl. No.: 09/378,543

(22) Filed: Aug. 20, 1999

(51) Int. Cl.[7] .............................................. G06F 17/40
(52) U.S. Cl. ..................................... 702/198; 332/151
(58) Field of Search ................................ 702/198, 182, 702/183, 185, 186, 189, 190, 191; 332/151, 170, 106; 348/620, 728, 457, 624; 381/14, 7; 329/311, 319; 455/205, 228, 45; 340/825.72, 825.73; 341/143; 369/47.35; 370/496; 375/130, 269, 279, 308, 329

(56) References Cited

U.S. PATENT DOCUMENTS

| | | | |
|---|---|---|---|
| 4,101,849 A | 7/1978 | Blackmer et al. ............. 333/14 |
| 5,194,822 A | * 3/1993 | Bureau et al. ............... 330/129 |
| 5,963,087 A | * 10/1999 | Anderson .................... 330/52 |
| 6,169,450 B1 | * 1/2001 | Gentzler ..................... 330/52 |
| 6,169,638 B1 | * 1/2001 | Morling ...................... 360/46 |

FOREIGN PATENT DOCUMENTS

| GB | 2224413 | 5/1990 | ........... H04R/25/00 |
|---|---|---|---|
| IT | 1264176 | 3/1969 | ............ H04R/3/00 |

* cited by examiner

Primary Examiner—Marc S. Hoff
Assistant Examiner—Edward Raymond
(74) Attorney, Agent, or Firm—Sofer & Haroun, LLP

(57) ABSTRACT

The present invention, according to one embodiment, relates to a method for matching the dynamic range of an information signal to the dynamic range of a receptor. The method comprises the steps of: monitoring the information signal; varying the gain of the information signal in response to the monitoring step so as to provide a gain adjusted information signal; generating a variable control signal having a frequency outside frequency range of the information signal, in response to the monitoring step; combining the control signal with the gain adjusted information signal so as to provide a combined information signal; and providing a variable amplitude dependent gain to the combined information signal so as to provide an output signal that substantially matches the dynamic range of the receptor.

19 Claims, 42 Drawing Sheets

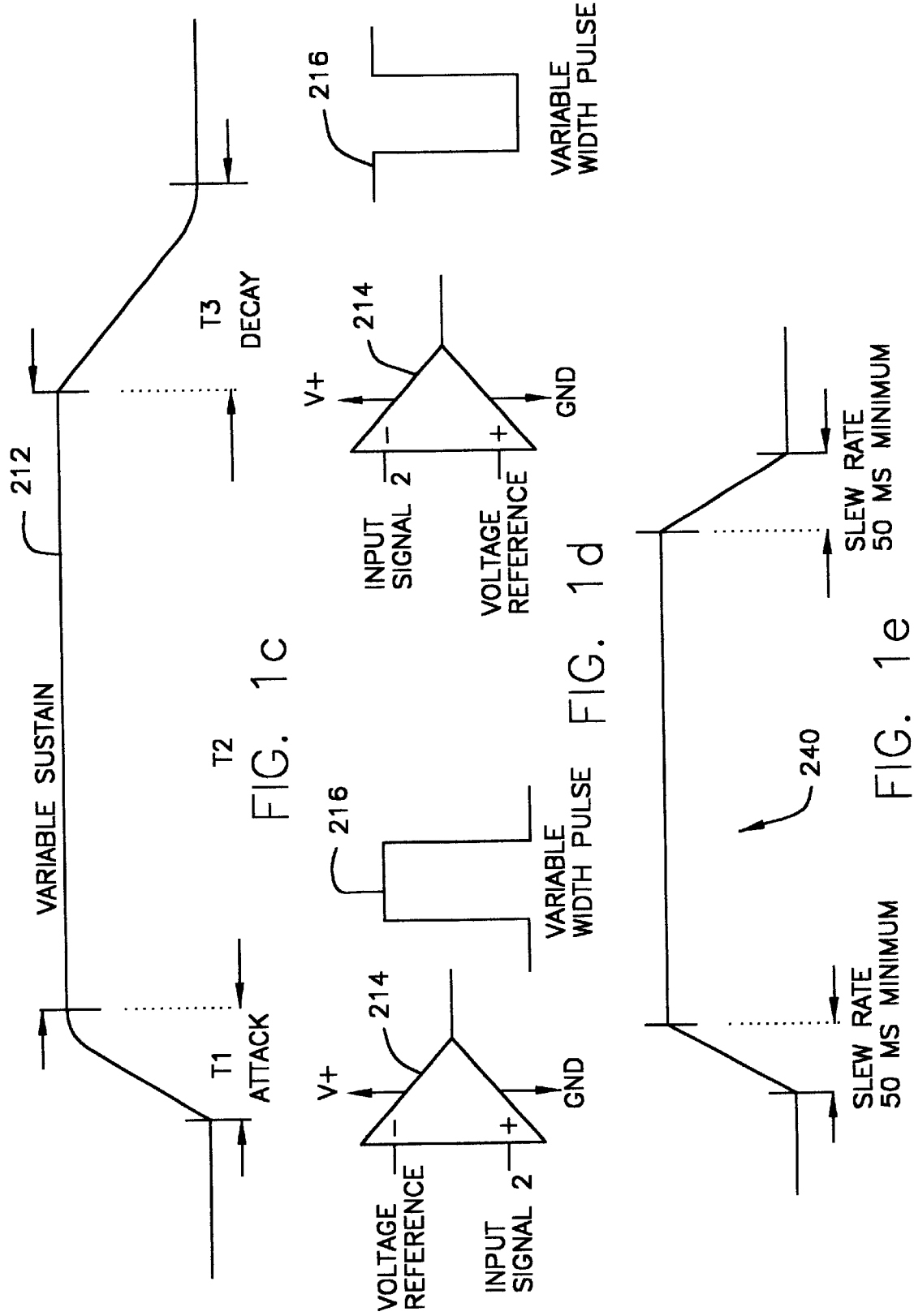

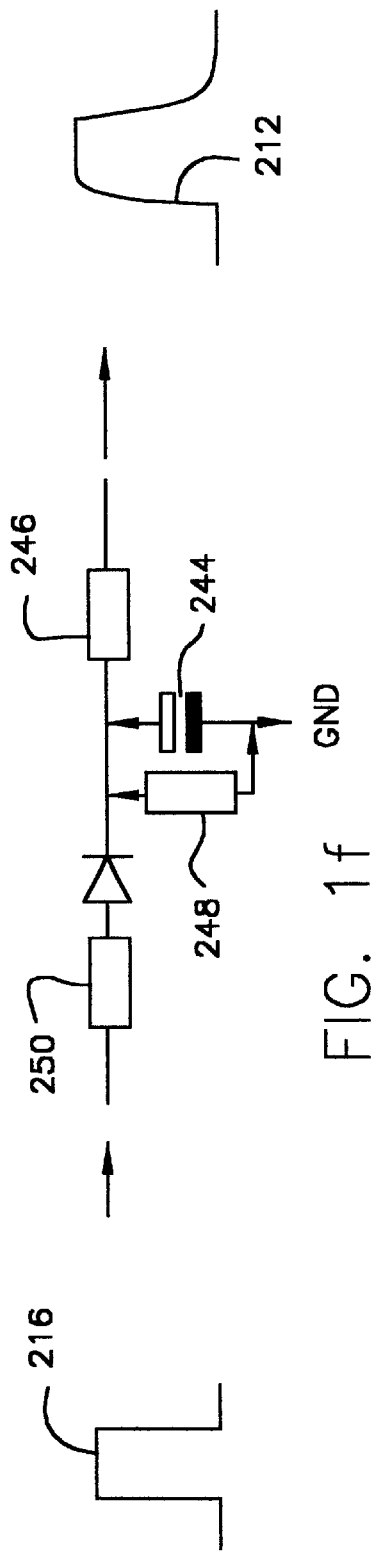
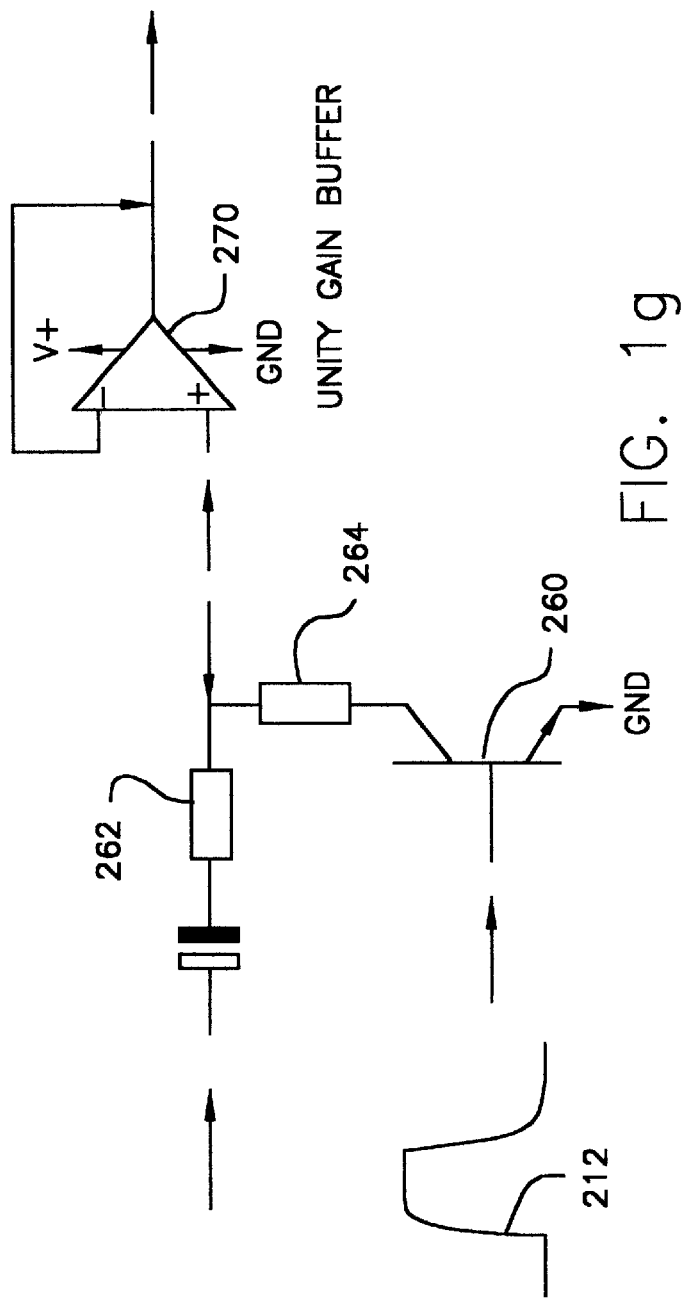
FIG. 1f
FIG. 1g

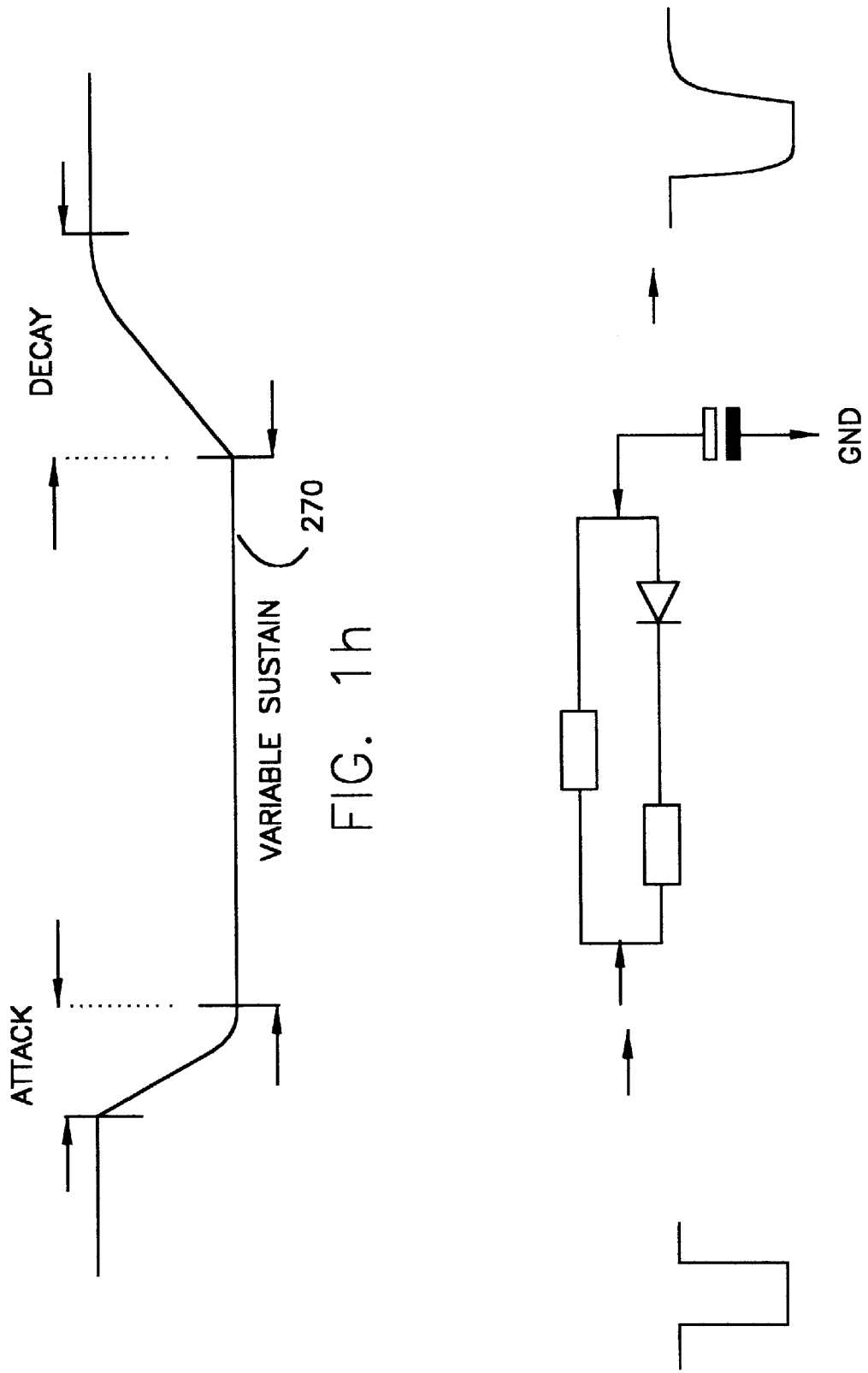

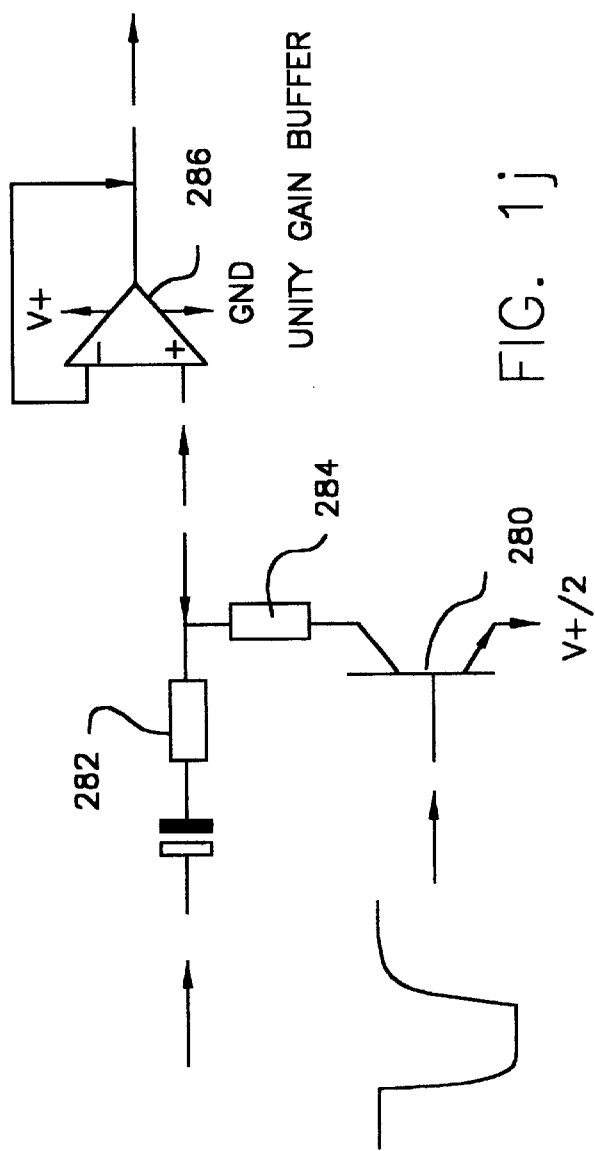
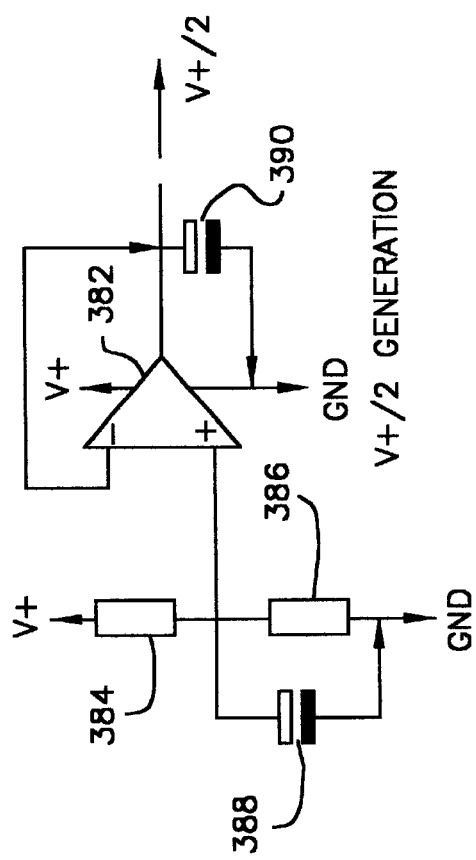

AMPLITUDE RANGE MATCHING SYSTEM

FIELD OF THE INVENTION

This invention relates to a signal processing system and more specifically to an amplitude range matching system.

BACKGROUND OF THE INVENTION

An amplitude range matching system, which can be implemented in analog or digital form, processes the amplitude range of an information signal which contains amplitude information within an amplitude range and frequency information within a frequency range. The lowest possible information signal amplitude may be defined as the lower limit of the information signal amplitude range, which the highest possible information signal amplitude may be defined as the upper limit of the information signal amplitude range. The information signal amplitude range is, therefore, the range over which the information signal amplitude can vary between its lower and upper limits, and is typically measured in Volts. Similarly the lowest possible information signal frequency may be defined as the lower limit of the information signal frequency range and the highest possible information signal frequency being defined as the upper limit of the information signal frequency range. The information signal frequency range is, therefore, the range over which the Information Signal frequency can vary between its lower and upper limits, and is typically measured in Hertz. Amplitude range matching systems are employed to improve the clarity of reception of the information signal by matching the processed information signal amplitude range to the optimum amplitude range of the information signal receptor, which may be human or electronic. Over this optimum amplitude range reception sensitivity is at a maximum and information signal amplitudes may be clearly received without causing distortion or damage to the receptor. This process does not affect the frequency content of the information signal within the information signal frequency range so that the processed information signal contains the same frequency content as the information signal.

A receptor which has a limited optimum amplitude range cannot receive all of the information contained within an information signal which has a larger amplitude range. Similarly, if a receptor has an optimum amplitude range which is larger than the information signal amplitude range then lack of reception sensitivity could result in the loss of the detailed information contained within the information signal during reception. Both these situations require a system which can match the information signal amplitude range to the optimum amplitude range of the receptor.

Many techniques have been developed to receive information within a defined frequency range. There are at least three main problems associated with receiving the information held within a defined amplitude range: (1) lack of reception clarity due to a poor signal to noise ratio; (2) loss of information; and (3) potential damage to the receptor. These problems are caused when the amplitude range of the information signal does not match with the optimum amplitude range of the receptor. For example, if a receptor has a fixed amplitude range it will not be able to receive all the information within a signal which has a larger amplitude range and may be damaged by the information signal. If a receptor has a fixed amplitude range which is much larger than the amplitude range of the information signal then detailed information may be lost due to the lack of sensitivity of the receptor as encountered in the United Kingdom Patent No. GB 2,224,413A. Human, electronic, electrical and mechanical receptors generally have a fixed optimum amplitude range over which they operate comfortably and at maximum sensitivity.

Prior art techniques employ linear gain variation arrangements to increase the low amplitude portion of an information signal. In such arrangements, however, the high amplitude portion of the information signal is amplified outside the upper limit of the optimum amplitude range of the receptor causing loss of information and possibly causing damage to the receptor. If the same linear gain variation is used to decrease the high amplitude portion of the information signal then the low amplitude portion of the information signal will be attenuated outside the lower limit of the optimum amplitude range of the receptor causing loss of information. Linear gain variation has the same effect on both the signal and the noise and cannot be used, therefore, to improve the signal to noise ratio in the processed information signal which results in a reduction in the reception clarity.

Automatic gain control and fast fourier analysis normalization techniques can be used for amplitude range matching but often introduce switching noise into the processed information signal, where switching noise, in the present context, is a sudden large change in the amplitude of the processed information signal due to a gain change which is not sufficiently controlled.

Averaging techniques which set the gain applied to the information signal based on the average of the information signal amplitude over a certain time period introduce a delay into the application of gain changes on the information signal. This may result in low amplitude signals being lost due to insufficient gain, high amplitude signals causing distortion or damage to the receptor due to excessive gain and the introduction of switching noise into the processed information signal due to a gain change being carried out too slowly.

Some prior art systems have employed compression techniques. However, such compression techniques can introduce distortion into the processed information signal due to excessive gain on low level information signals and excessive attenuation of high level information signals so that the detail in the processed information signal may be lost.

Thus there is a need for a system that matches the information signal amplitude range to the optimum amplitude range of the receptor, without introducing switching noise into the processed information signal, reducing reception clarity, causing loss of information or potential damage to the receptor. There is also a need for an amplitude range matching system that can be used to process information signals of any frequency range.

SUMMARY OF THE INVENTION

The present invention, according to one embodiment, relates to a method for matching the dynamic range of an information signal to the dynamic range of a receptor. The method comprises the steps of: monitoring the information signal; varying the gain of the information signal in response to the monitoring step so as to provide a gain adjusted information signal; generating a variable control signal having a frequency outside the frequency range of the information signal, in response to the monitoring step; combining the control signal with the gain adjusted information signal so as to provide a combined information signal; and providing a variable amplitude dependent gain to the combined information signal so as to provide an output signal that substantially matches the dynamic range of the receptor.

According to one embodiment, wherein prior to the step of generating a variable control signal, the method further comprises a first filtering step for filtering out frequencies outside the frequency range of the information signal. The method may also comprise the step of providing a linear amplification to the information signal.

According to still another embodiment of the invention, the combining step of the method further comprises the step of varying the ratio of the control signal and the gain adjusted information signal. This ratio may be varied so as to equal a ratio of 1:1. Furthermore, the step of providing a variable amplitude dependent gain may further comprise the step of subjecting the combined signal to a power of 1/n, wherein n is a positive number including a fraction, so as to provide a combination of variable compression and expansion factors. The method may also comprise a second filtering step for filtering out all frequencies outside the frequency range of said information signal, after which may be performed the step of providing a linear amplification.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects and advantages thereof, may best be understood by reference to the following detailed description when read with the accompanying drawings, in which:

FIGS. 1(c)–1(l) illustrate components of the system, in accordance with various embodiments of the present invention;

DETAILED DESCRIPTION OF THE DRAWINGS

Figure 1A:
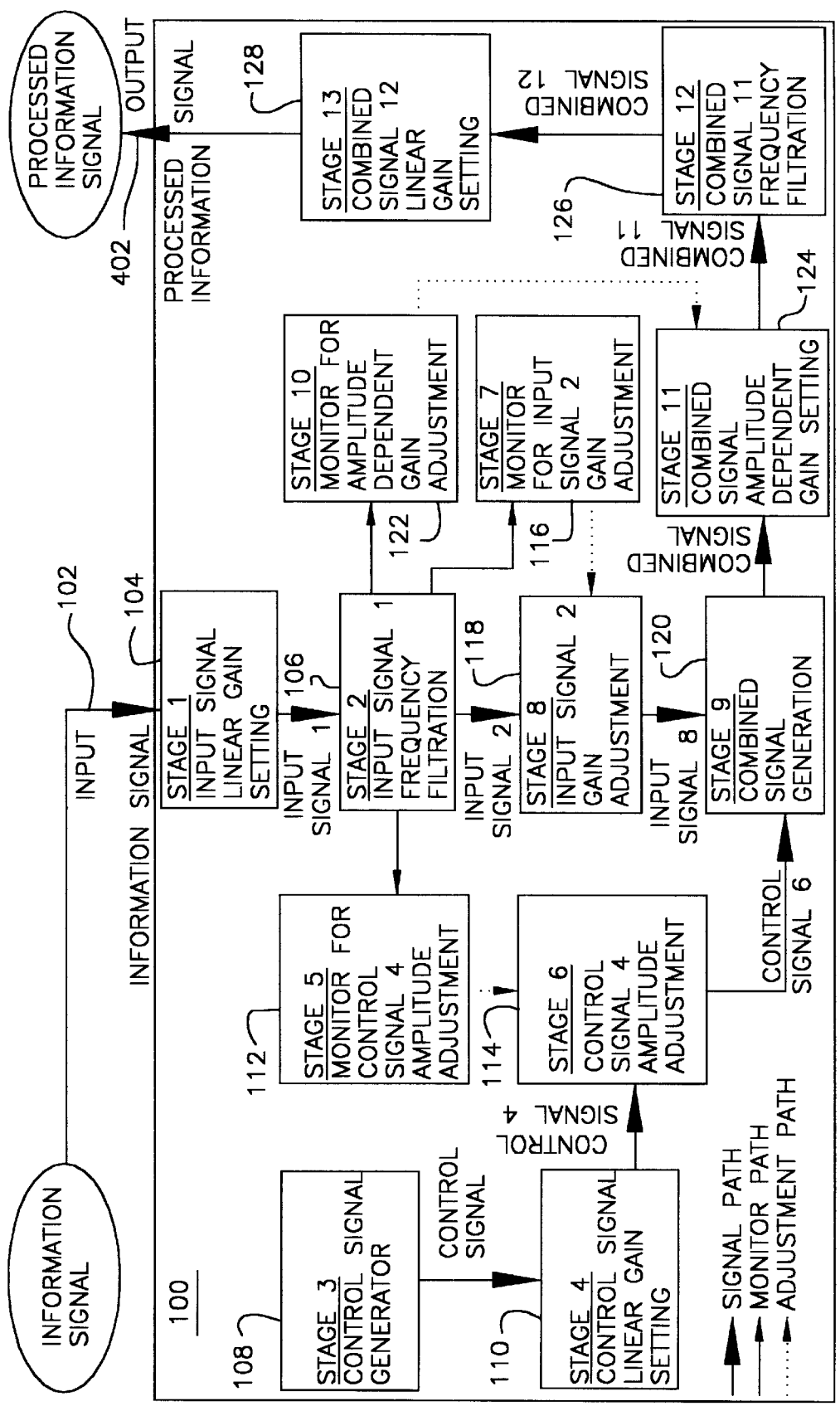
FIG. 1(a) illustrates an amplitude range processor, in accordance with one embodiment of the present invention.

FIG. 1(a) illustrates an amplitude range processor 100 in accordance with one embodiment of the present invention, although the invention is not limited in scope in that respect. Amplitude range processor 100 includes various components that may be implemented in either hardware or software arrangement or a combination of both depending on the system application and available resources.

In accordance with one embodiment of the invention, amplitude range processor includes various components referred herein as processing stages. The connection of these stages is illustrated in FIG. 1(a). The implementation of each stage may be altered to suit the application but the stage function and the overall system remain the same, as will be described in more detail below.

Referring to FIG. 1(a), amplitude range processor 100 is configured to receive an information signal 102 via an input port coupled to a linear gain setting stage 104, which in accordance with one embodiment of the invention is the first processing stage of processor 100. In a hardware implementation processor 100 can be preset for predetermined information signal amplitude and frequency ranges. In accordance with another embodiment of the invention preset stage settings can be stored in a central controller so that the user can select from a list of predetermined information signal amplitude and frequency ranges, as illustrated by FIG. 1(b).

Amplitude range processor 100 processes information signal 102 so as to provide an output signal 402 which has a dynamic range that substantially matches the dynamic range of a desired receptor, such as a human ear, or a transducer device.

Figure 1B:
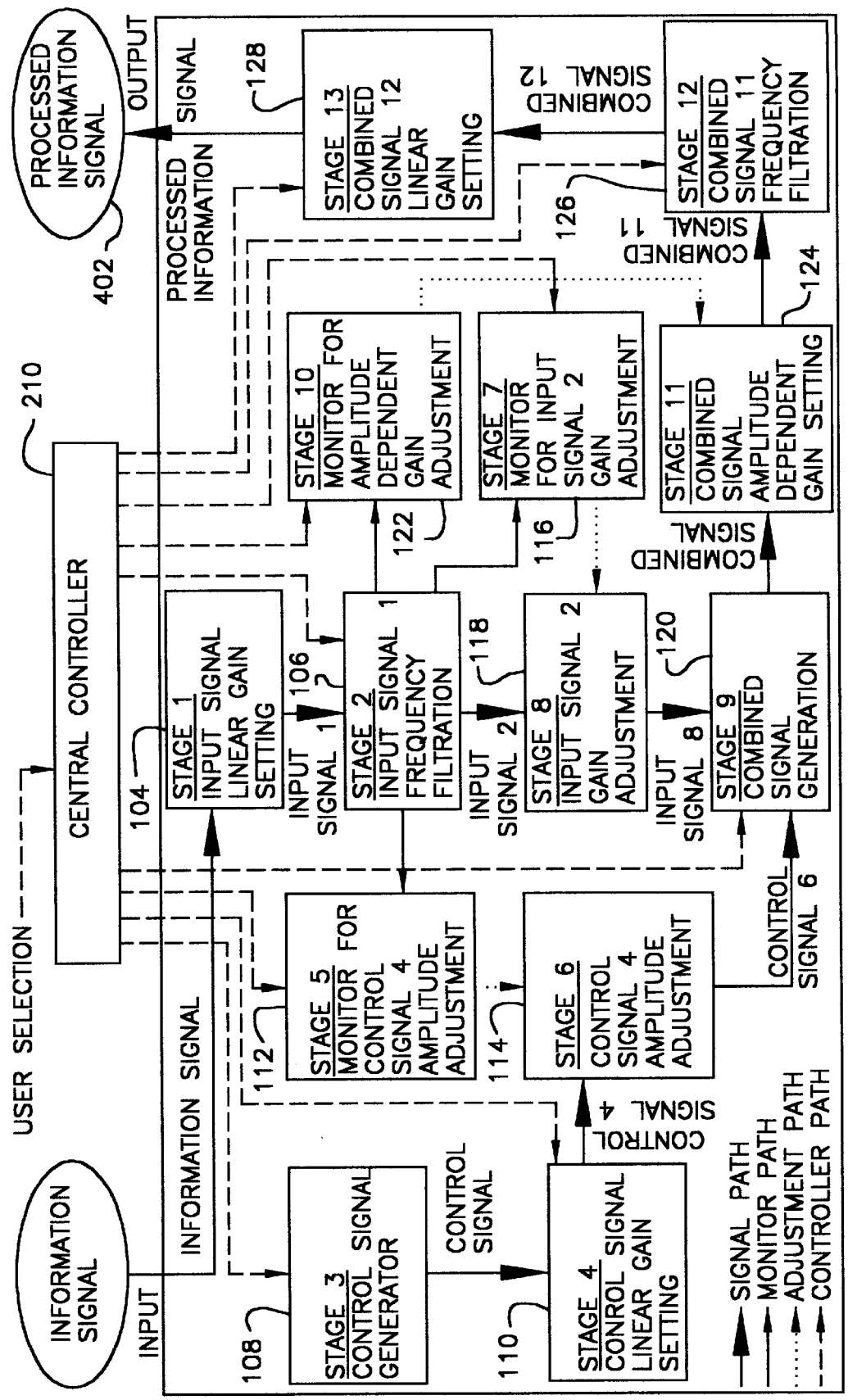
FIG. 1(b) illustrates the system wherein preset stage settings are stored in a central controller, in accordance with one embodiment of the present invention.

For purposes of the present discussion, the components illustrated in FIGS. 1(a) and 1(b) perform the same functions. However, as illustrated in FIG. 1(b), a central controller 210 receives user selection signals, in response to which it generates controller signals. The controller signals are coupled to various components of amplitude range processor 100 so as to vary the operating points of these components in accordance with a corresponding user application.

Information signal 102 is subjected by Stage 1 to a linear gain, which is not dependent on the amplitude of information signal 102, i.e. the same gain is applied to all information signal amplitudes. For a hardware implementation a voltage gain inverting amplifier may be used. The operation of a voltage gain inverting amplifier is well known and described, for example in Horowitz and Hill, 'The Art of Electronics' Cambridge University Press 1984 edition, Chapter 3—Feedback and Operational Amplifiers, Inverting Amplifier Section 3.04 and incorporated herein by reference. The linear gain applied by the linear gain setting stage 104 (Stage 1) on the information signal is set so that the upper amplitude limit of the processed information signal is the same as the upper limit of the optimum amplitude range of the receptor. The information signal is converted into Input Signal 1 by the action of the linear gain setting stage 104 (Stage 1).

As illustrated in FIG. 1(a), Input Signal 1 enters a frequency filtration stage 106, which is referred to as the second processing stage. The signal provided to stage 106 is subjected to sufficient band pass frequency filtration to remove all signals outside the information signal frequency range. Input Signal 1 is converted into Input Signal 2 by the action of filtration stage 106. Later stages of processing depend on the amplitude of Input Signal 2 so it is important that Input Signal 2 is not corrupted by signals outside the information signal frequency range. Voltage Controlled Voltage Source (VCVS) filters can be used for a hardware implementation giving the required lower and upper cut off frequencies and the roll-off characteristics of the stage 106 band pass frequency filter. The operation of a VCVS filter is well known and described, for example in Horowitz and Hill, 'The Art of Electronics' Cambridge University Press 1984 edition, Chapter 4—Active filters and Oscillators, VCVS filter Section 4.06 and incorporated herein by reference.

Frequency filter stage 106 includes four output ports each of which is respectively coupled to an input port of a monitoring stage 112, monitoring stage 116, gain adjustment stage 118 and monitoring stage 122.

The output signal of frequency filter stage 106, also referred to as Input Signal 2, enters gain adjustment monitoring stage 116, where its amplitude is monitored. When the Input Signal 2 amplitude exceeds a preset level 1a, stage 116 generates an adjustment signal instructing the gain adjustment stage 118 to adjust the gain applied to Input Signal 2. The preset level 1a is the reference level to one of the comparator inputs of a comparator circuit in stage 116 (Stage 7). The Input Signal 2 goes to the other input of the comparator and when it exceeds preset level 1a the adjustment signal is generated.

Gain adjustment stage 118 is configured to provide a signal envelope 212 that exhibits respectively attack, sustain and decay periods (T1, T2, T3), as illustrated in FIG. 1(c), which ensures that the gain adjustment does not cause switching noise to be introduced into the processed information signal. The attack, sustain and decay periods are dependent on the information signal frequency range. The attack time period must be sufficiently fast to be able to respond to signals at the upper limit of the information signal frequency range and sufficiently slow to avoid switching noise being introduced into the processed information signal, i.e. the frequency corresponding to the attack time period, 1 divided by the attack time period, must be below the lower limit of the information signal frequency range. The attack time "period" is a time which is greater than the period of the lower limit frequency of the information signal i.e. "period">1/(the lower limit frequency of the information).

The maximum attack time period occurs when the Input Signal 2 amplitude has reached preset level 1b, defined as 'voltage reference' in FIG. 1(d). The Input Signal 2 amplitude level required to initiate the minimum sustain time. The sustain must be applied while the Input Signal 2 amplitude is above the preset level 1b and must continue to be applied for the minimum sustain time period after the Input Signal 2 amplitude has dropped below the preset level 1b. Therefore, the minimum sustain time period must be sufficiently long to protect the receptor from distortion or damage due to high amplitude signals at the lower limit of the information signal frequency range but sufficiently fast to avoid unnecessary loss of reception of low amplitude signals while the minimum sustain is being applied.

The maximum decay time period occurs after a sustain has been applied. The decay time period must be sufficiently fast to avoid loss of reception of signals at the upper limit of the information signal frequency range and sufficiently slow to avoid switching noise being introduced into the processed information signal, i.e. the frequency corresponding to the decay time period, 1 divided by the decay time period, must be below the lower limit of the information signal frequency range. The "decay time period" is a time which is greater than the period of the lower limit frequency of the information signal i.e. "decay time period">1/(the lower limit frequency of the information).

For a hardware implementation an operational amplifier voltage comparator 214 as illustrated in FIG. 1(d), which can both source and sink current, can be used to generate a variable width pulse 216 which is then given the appropriate attack, sustain and decay envelope. The width of this pulse is dependent on the time the output signal of frequency filter stage 106 remains above the preset level 1b. The slew rate, or time to switch between levels, of the voltage comparator must be sufficiently slow so that it does not cause the processed information signal to become distorted due to excessive current drain of the supply voltage, as illustrated by plot 240 in FIG. 1(e). A capacitor 244, a diode 252 and two resistors, 248, and 250, with the appropriate values can be connected to form an envelope generator, as illustrated in FIG. 1(f), to convert the voltage comparator variable width pulse output signal 216 into the required gain adjustment signal 212. Any number of gain adjustment signals can be generated in the above manner by stage 116.

The gain adjustment signal generated by stage 116 enters stage 118 instructing it to adjust the gain applied to Input Signal 2. For a hardware implementation a transistor and two resistors 262, 264 could be used to form a voltage divider where the appropriate resistor is connected to ground via the transistor, as illustrated in FIG. 1(g). The transistor is gradually turned on for a decrease in gain or off for an increase in gain by the gain adjustment signal. Operational amplifiers such as 270 can be used to form unity gain buffers to separate each gain adjustment circuit if multiple gain adjustments are required by the application.

As well as carrying out the appropriate gain adjustments required by the application the action of stage 118 also ensures that the amplitude of its output signal referred to as the gain adjusted signal, or Input Signal 8 does not exceed the upper limit of the system amplitude range to avoid distortion or loss of information. The output signal of gain adjustment stage 118 enters a combined signal generation stage 120, referred to as Stage 9.

System 100 includes a control signal generator 108, referred to as Stage 3. The control signal generator generates a control signal, which only contains frequencies above the upper limit of the information signal frequency range, although the application is not limiting in scope. For example, control signal may have other frequency ranges, preferably outside the frequency range of the information signal. Although the control signal type will depend on the application, for ease of generation, filtration and amplitude adjustment a sine wave tone of a single frequency is recommended for the majority of applications. A hardware implementation may use a Wien bridge oscillator or a voltage controlled oscillator, although the control signal may not be a sine wave when using a voltage controlled oscillator. The operation of a Wien bridge oscillator is well known and described, for example, in Horowitz and Hill, 'The Art of Electronics' Cambridge University Press 1984 edition, Chapter 4—Active filters and Oscillators, Wien Bridge Oscillators Section 4.14 and incorporated herein by reference. The operation of a voltage controlled oscillator is well known and described, for example, in Horowitz and Hill, 'The Art of Electronics' Cambridge University Press 1984 edition, Chapter 4—Active filters and Oscillators, Voltage Controlled Oscillators Section 4.13, and incorporated herein by reference.

The control signal provided by control signal generator 108 is provided to a linear gain setting stage 110, referred to as stage 4. Gain setting stage 110 exhibits a linear gain, which converts the control signal generated by stage 108 to a control signal 4. The linear gain applied by Stage 4 sets the Control Signal 4 amplitude to the level required to avoid excessive amplification or attenuation being applied by Stage 11 when the information signal amplitude is at its lower limit, this will be explained in detail later. A voltage gain inverting operational amplifier of the same type as Stage 1 may be used for a hardware implementation where the linear gain is preset.

The output signal of frequency filter stage 106, also referred to as Input Signal 2, enters Stage 5, where its amplitude is monitored. When the Input Signal 2 amplitude exceeds a preset level 2a. The preset level 2a is the reference level to one of the comparator inputs of a comparator circuit in stage 112 (stage 5). The input Signal 2 goes to the other input of the comparator and when it exceeds preset level 2a the adjustment signal is generated. Stage 5 generates an amplitude adjustment signal instructing the amplitude adjustment stage 114 (Stage 6) to adjust the amplitude of Control Signal 4. Amplitude adjustment Stage 6 is configured to exhibit a signal envelope 270, having respectively an attack, sustain and decay period, as illustrated in FIG. 1(h), so that the amplitude adjustment does not cause switching noise in the processed information signal. The attack, sustain and decay period must adhere to the same requirements as those of Stage 8 described above.

For a hardware implementation an operational amplifier voltage comparator, which can both source and sink current, can be used to generate a variable width pulse which is then given the appropriate attack, sustain and decay envelope. The width of this pulse is dependent on the time the output signal of frequency filter stage 106 remains above the preset level 2b. The slew rate of the comparator must be as illustrated in FIG. 1(e). For a preset version a capacitor, a diode and two resistors with the appropriate values can be connected to form an envelope generator to convert the comparator square wave output signal into the required amplitude adjustment signal. A voltage controlled envelope generation integrated circuit can be used to convert the comparator square wave output signal into the required amplitude adjustment signal with the attack time, decay time, minimum sustain time and amplitude level which initiates a sustain set by the user for a user variable version. Any number of amplitude adjustment signals can be generated in the above manner by stage 5.

The gain adjustment signal generated by Stage 5 enters Stage 6 instructing it to adjust the amplitude of Control Signal 4 to produce the required Control Signal 6. For a hardware implementation a transistor 280 and two resistors 282, 284 could be used to form a voltage divider where the appropriate resistor is connected to the half voltage supply via the transistor, as illustrated by FIG. 1(j). The transistor is gradually turned on for a decrease in amplitude or off for an increase in amplitude by the amplitude adjustment signal. Operational amplifiers such as 286, can be used to form unity gain buffers to separate each amplitude adjustment circuit if multiple amplitude adjustments are required by the application. For a user variable version a voltage controlled amplifier could be used to carry out the required adjustment to the amplitude of the Control Signal.

Input Signal 8 is thus generated as a gain adjusted information signal as a result of the linear gain applied, and the frequency range filtered. Control Signal 6 has also been generated which contains the amplitude adjusted Control Signal. Input Signal 8 and Control Signal 6 enter stage 120 (Stage 9) where they are combined by adding their amplitudes in the ratio required by the application, usually 1:1 but the Input Signal 8 amplitude could be given more gain for very low amplitude information signals thus increasing the ratio, to generate the Combined Signal. The relative amplitudes of Input Signal 8 and Control Signal 6 contained in the Combined Signal is controlled by the action of Stage 9. A voltage summing operational amplifier circuit with appropriate resistor values to give the required ratio of Input Signal 8 and Control Signal 6 in the Combined Signal can be used for a hardware implementation. The operation of a voltage summing operational amplifier is well known and described, for example in Horowitz and Hill, 'The Art of Electronics' Cambridge University Press 1984 edition, Chapter 3—Feedback and Operational Amplifiers, Linear Circuits—Summing Amplifiers Section 3.09, and incorporated herein by reference.

The output signal of frequency filter stage 106, also referred to as Input Signal 2, enters monitoring stage 122, also referred to as Stage 10, which monitors the amplitude of input signal 2, and in response provides a dependent gain adjustment signal When the Input Signal 2 amplitude exceeds a preset level 3a. The preset level 3a is the reference level to one of the comparator inputs of a comparator circuit in stage 122 (stage 10). Then Input Signal 2 goes to the other input of the comparator and when it exceeds preset level 3a the amplitude dependent gain adjustment signal is generated. Stage 10 generates an amplitude dependent gain adjustment signal to adjust the amplitude dependent gain applied on the Combined Signal by Stage 11. Amplitude dependent gain adjustment Stage 10 is configured to exhibit respectively an attack, sustain and decay period, which is generated in the same way as that of Stage 8, to ensure that the amplitude adjustment does not cause switching noise in the processed information signal. Any number of amplitude dependent gain adjustment signals can be generated in the above manner by stage 122, referred to herein as Stage 10.

Stage 11 sets a variable amplitude dependent gain to the Combined Signal, i.e. a non-linear gain which is dependent on the amplitude of the Combined Signal. Any type of amplitude dependent gain could be used, however, for ease of implementation and flexibility raising the Combined Signal amplitude to a power is the preferred option for most applications. This is because raising the Combined Signal amplitude to the power n, where n=1, applies unity gain to the Combined Signal, whereas raising the Combined Signal amplitude to a power, n where n>1, applies amplitude expansion to the Combined Signal and raising the Combined Signal amplitude to the power 1/n (reciprocal of n), where n>1, applies amplitude compression to the Combined Signal. The higher the power above one the greater the amplitude expansion and the lower the power less than one (but not less than zero) the greater the amplitude compression. For expansion the higher the Combined Signal amplitude the higher the gain, whereas for compression the higher the Combined Signal amplitude the lower the gain resulting in the application of amplitude dependent gain. Thus by changing the power to which the Combined Signal amplitude is raised through the amplitude range of the information signal very large complex amplitude dependent gain changes can be applied to the Combined Signal.

Figure 1K:
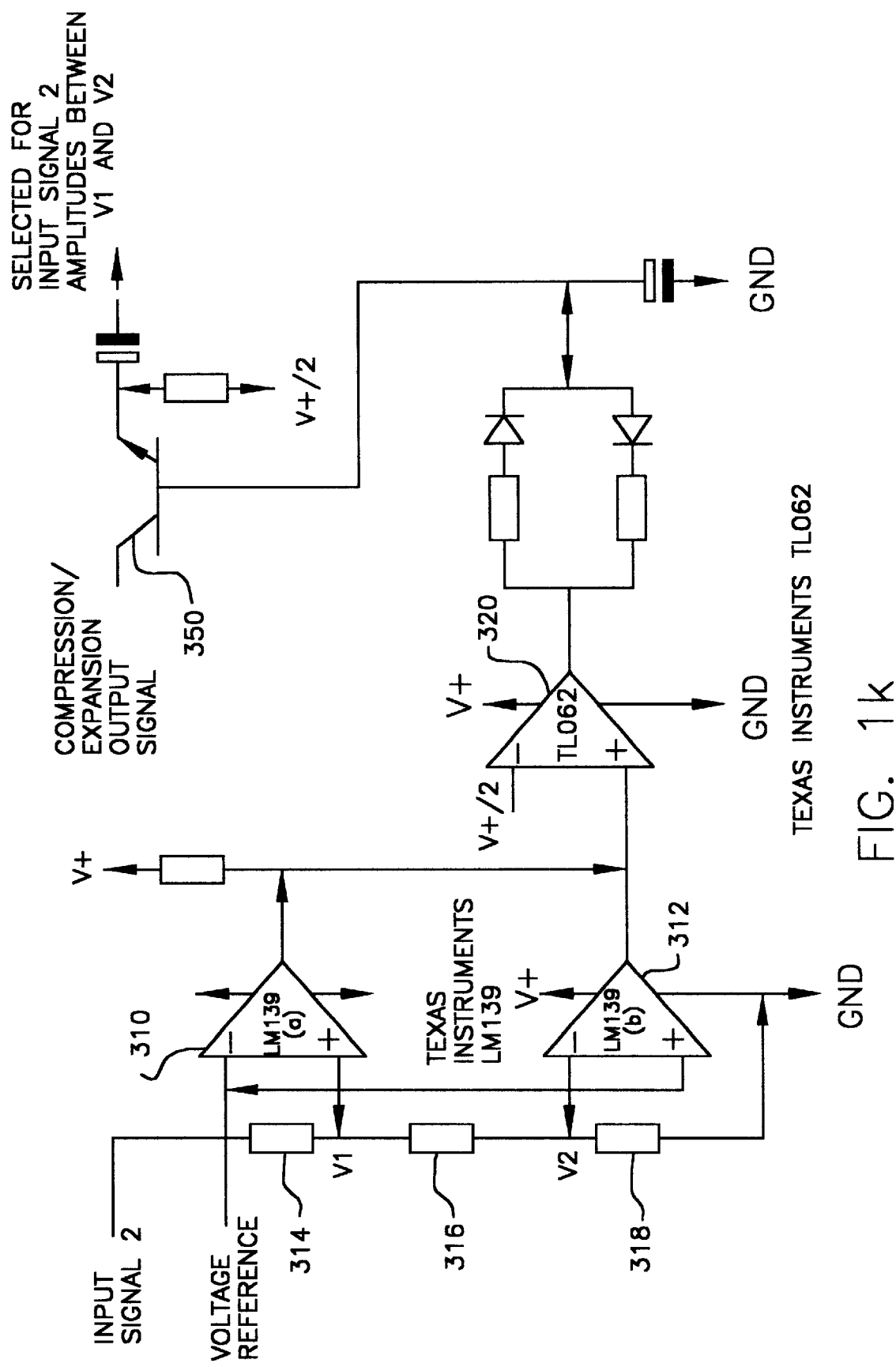

Very large complex gain changes applied to Input Signal 8 on its own may cause distortion and switching noise to be introduced into the processed information signal. However, in accordance with one embodiment of the invention, the presence of the Control Signal 6 amplitude in the Combined Signal controls the application of this amplitude dependent gain on Input Signal 8 and as Control Signal 6 only contains frequencies outside the information signal frequency range it can be easily filtered out once the amplitude dependent gain has been applied. The action of Stage 11 is explained in further detail below. For a hardware implementation compander integrated circuits can be used which can be set to expansion or compression, such as the Philips NE561 Compander integrated circuit which allows even number orders of compression or expansion to be applied, e.g. 2nd, 4th, 6th etc. Amplitude dependent gain adjustments can then be made using transistors to gradually switch in or out the relevant companders under the instruction of the amplitude dependent gain adjustment signals generated by Stage 10. The operation of Stage 10 as illustrated by FIG. 1(k) is explained hereinafter.

Input Signal 2 is monitored by two voltage comparator open collector operational amplifiers, formed using a dual Texas Instruments LM139 integrated circuit.

The common output of the collector comparators forms a variable width pulse which is high when the input Signal 2 amplitude is between the levels V1 and V2, set using the resistors 314, 316, and 318 shown. The comparators drive a third comparator 320 which has a minimum slew rate of 50 ms, as illustrated by FIG. 1(e), formed using a Texas Instruments TL062 integrated circuit.

The TL062 output drives an envelope generator circuit, which is similar to that illustrated by FIG. 1(i). It is noted that FIG. 1(i) shows one diode, whereas FIG. 1(k) shows two diodes. FIG. 1(i) is an updated version of a more general circuit to provide a amplitude dependent gain selection signal with the appropriate attack, sustain and decay, similar to that shown in FIG. 1(c) where the attack and decay time periods should typically be the same duration.

Selection transistor 350 is thus gradually switched on for Input Signal 2 amplitudes between V1 and V2 and gradually switched off for all other Input Signal 2 amplitudes. The emitter terminal of transistor 350 is biased by a voltage source having an amplitude equal to one half of the voltage source V that drives the envelope generator circuit. An example of a half voltage generator 380 is illustrated in FIG. (1).

Thus the required amplitude dependent gain can be selected for any Input Signal 2 amplitude range by using the circuitry illustrated by FIG. 1(k) for a hardware implementation.

The processing carried out by Stages 1 to 11 will now be explained in detail with reference to FIGS. 1, 2, 3, 4, 5, 6, 7 and 8. The following Stage Processing Settings used to generate FIGS. 2, 3, 4 and 5 were chosen to help with the detailed explanation.

Stage Processing Settings Used to Generate FIGS. 2, 3, 4 and 5

The linear gain of Stage 1 has been set so that the Input Signal 1 amplitude varies over the appropriate range, i.e. the upper limit of the Input Signal 1 amplitude range has been set by the action of Stage 1 so that the Combined Signal amplitude varies over the range illustrated by the relevant figures. Stage 2 has been set so that Input Signal 2 only contains frequencies within the information signal frequency range. Stage 3 has been set to generate a sine wave Control Signal of a single frequency which is three times the upper limit of the information signal frequency range. Stages 4, 5 and 6 have been set to keep the Control Signal 6 amplitude at zero, i.e. to switch Control Signal 6 off, so that the Combined Signal only contains Input Signal 8 amplitudes. Stage 7 has been set so that the Input Signal 2 gain of Stage 8 is not adjusted. Stage 9 is set so that it applies a unity linear gain to Input Signal 8 and a unity linear gain to Control Signal 6 and adds their amplitudes together, i.e. their amplitudes are added in the ratio 1:1 by Stage 9. Stage 10 has been set so that the amplitude dependent gain of Stage 11 is not adjusted.

Figure 2:
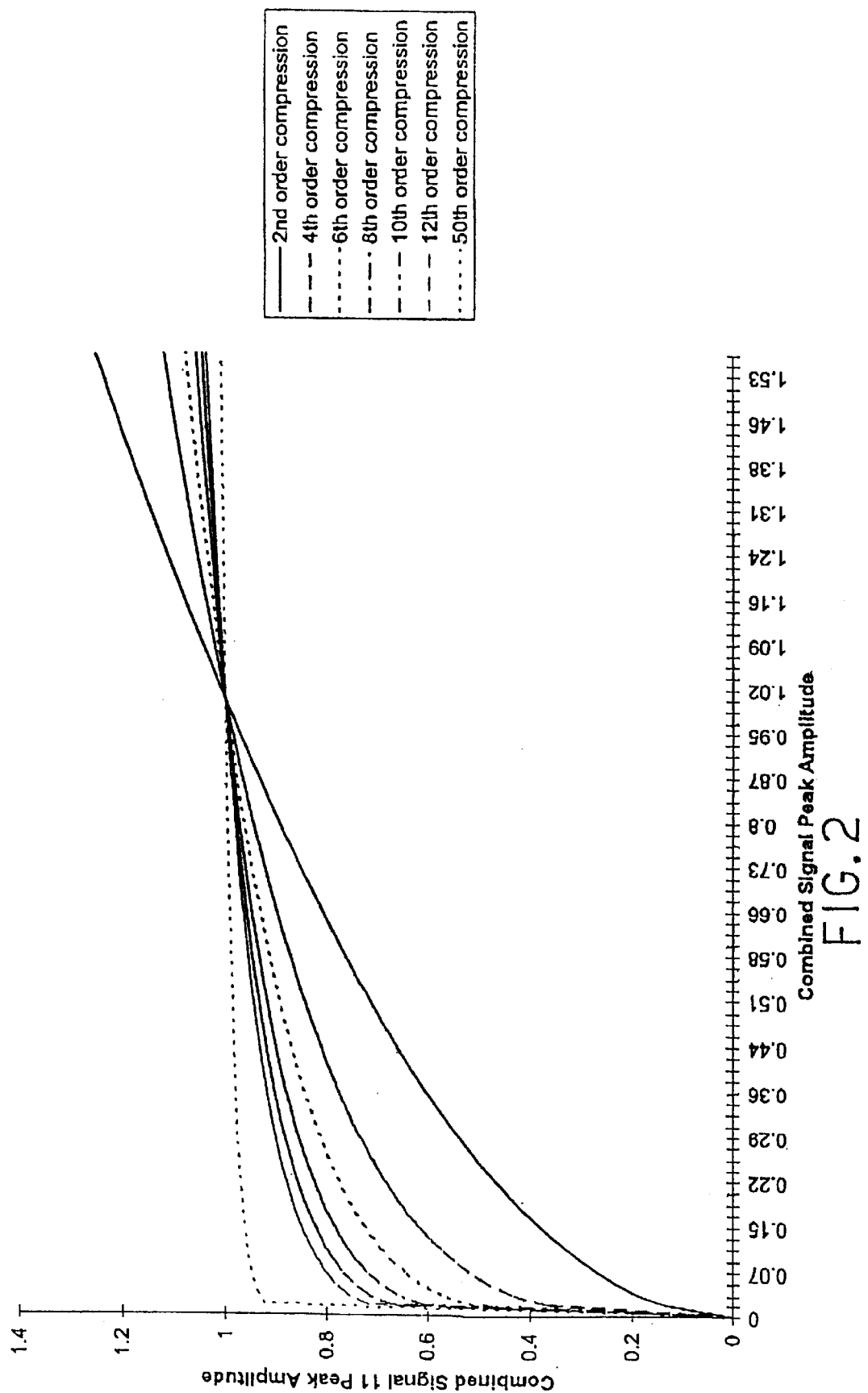
FIG. 2 is a graph that illustrates the effect of various orders of compression on the combined signal, in accordance with one embodiment of the present invention.

FIG. 2 illustrates the effect of various orders of compression on the Combined Signal with Control Signal 6 switched off and Stage 11 set to compression only. Thus, a 2nd order compression raises the Combined Signal amplitude to the power ½, a 4th order compression raises the amplitude to the to the power ¼ etc. Under compression the Combined Signal amplitudes which are less than 1 are amplified and the Combined Signal amplitudes which are greater than 1 are attenuated producing a Combined Signal 11 which has a smaller dynamic range than the Combined Signal generated at Stage 9. As the rate of compression is increased the amplitude range of Combined Signal 11 is reduced and tends toward zero for high order compression, e.g. 50th order. Thus the order or rate of compression can be chosen to provide the required reduction in the amplitude range of Combined Signal 11 to suit the application. However, the higher the rate of compression the higher the amplification on low level amplitudes of Combined Signal which may result in distortion in the Combined Signal 11.

Figure 3:
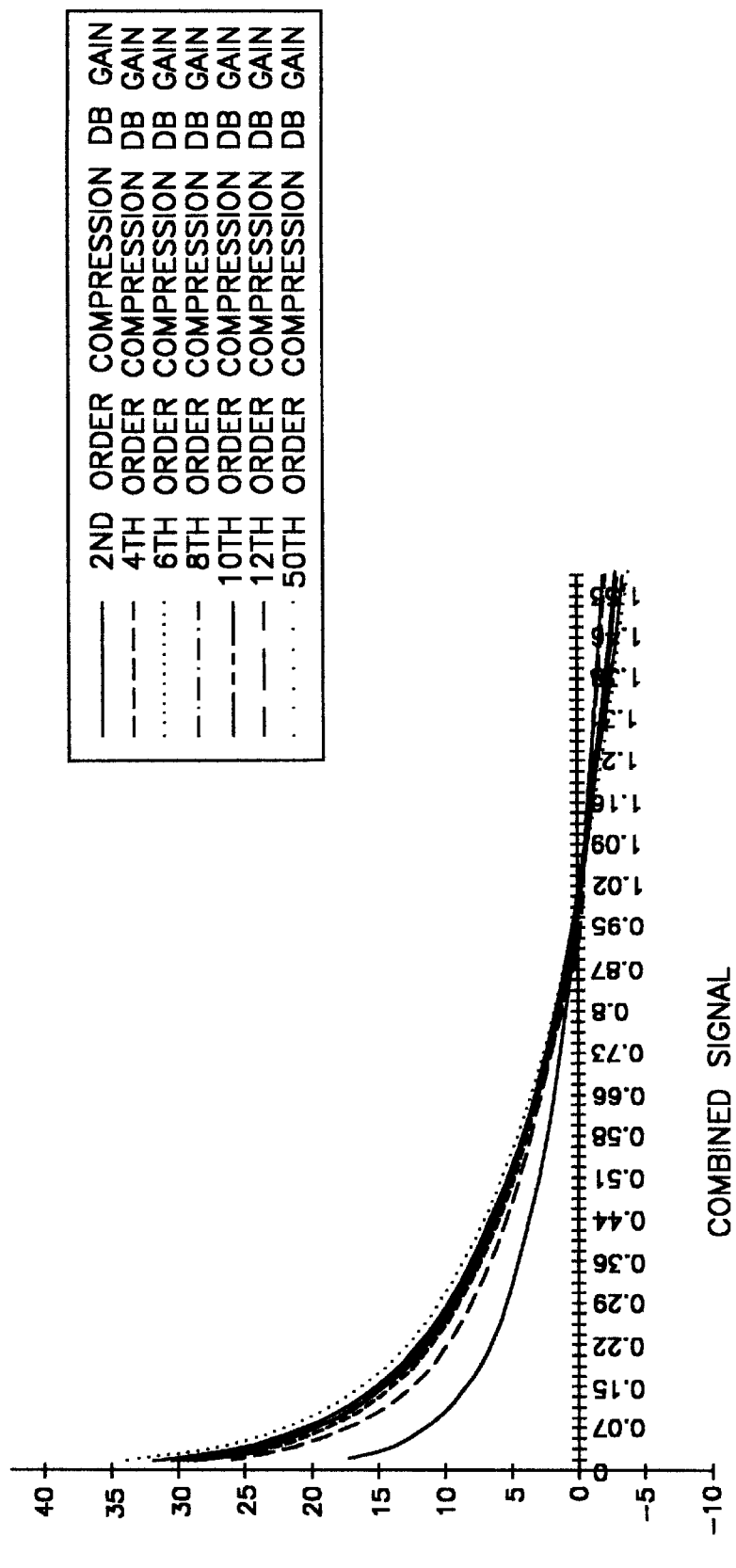
FIG. 3 is a graph that illustrates the same conditions as FIG. 2 but in terms of dB gain, in accordance with one embodiment of the present invention.

FIG. 3 illustrates the same conditions as for FIG. 2 but in terms of dB gain. Combined Signal amplitudes approaching zero are given very large amplification and the amplification is then relatively reduced as the Combined Signal amplitude increases. Thus if the Combined Signal only contains a low amplitude signal (LAS) then the amplitude of the LAS will be much higher in Combined Signal 11. However, if the Combined Signal contains both a LAS and a higher amplitude signal (HAS) then the level of amplification on the LAS will be reduced and, as a result, the amplitude of the will be reduced in the Combined Signal 11. As the amplitude of the HAS increases the relative reduction in amplification on the LAS will be increased. Also as the rate of compression is increased the rate of relative reduction in the amplitication on the LAS will be increased as the HAS amplitude increases. Therefore, the higher the amplitude of the HAS relative to the LAS amplitude the more the relative reduction in the LAS amplitude in the Combined Signal 11. Hence, the highest amplitude signal in the Combined Signal will be enhanced, relative to all other signals, in the Combined Signal 11.

Figure 4:
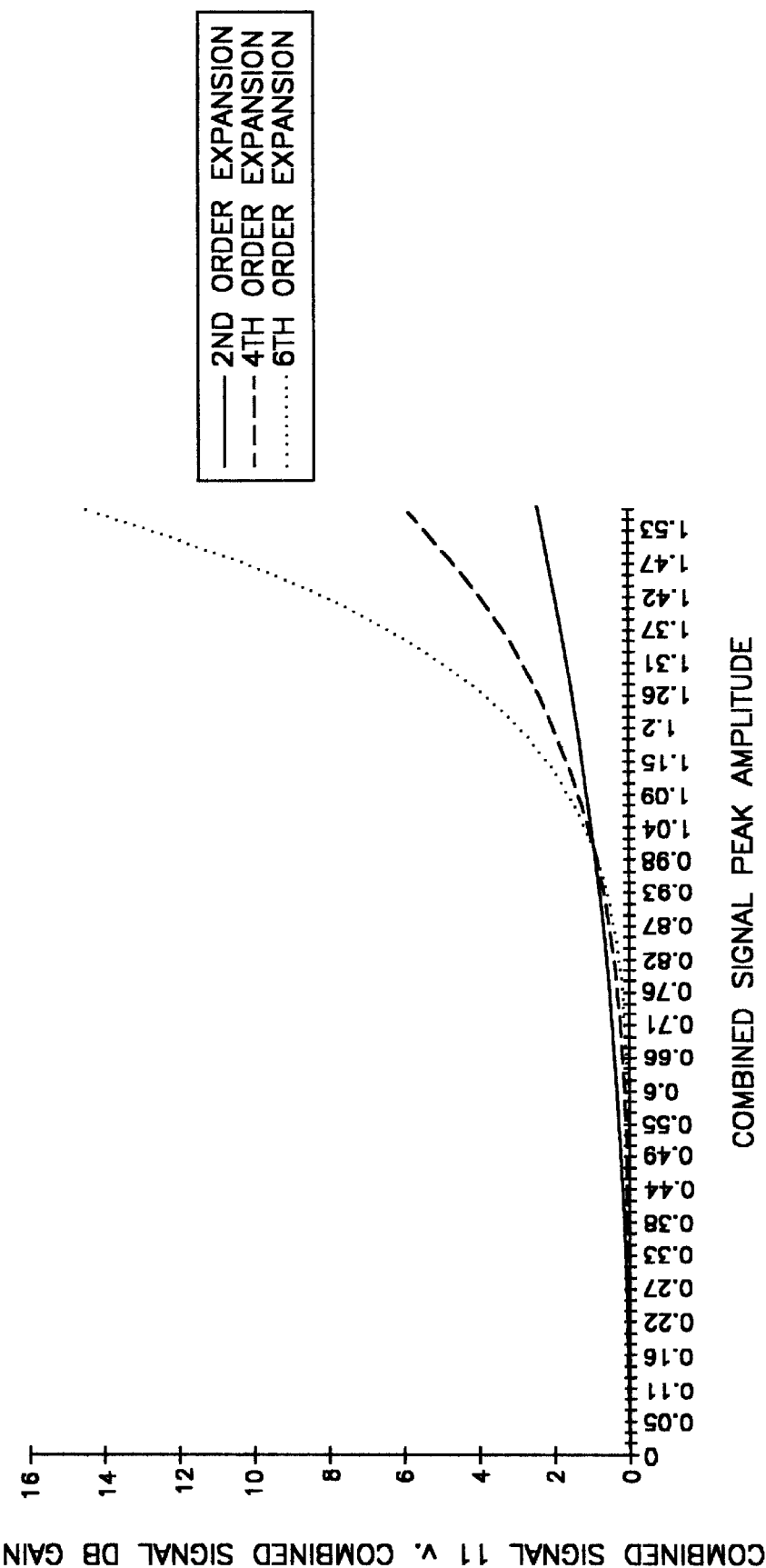
FIG. 4 is a graph that illustrates the effect of various orders of expansion on the combined signal, in accordance with one embodiment of the present invention.

FIG. 4 illustrates the effect of various orders of expansion on the Combined Signal with Control Signal 6 switch off and Stage 11 set to expansion only. A 2nd order expansion raises the Combined Signal amplitude to the power 2. A 4th order expansion raises the amplitude to the power 4 etc. Under expansion the Combined Signal amplitude which are less than 1 are attenuated and the Combined Signal amplitudes which are greater than 1 are amplified producing a Combined Signal 11 which has a larger amplitude range than the Combined Signal provided by Stage 9. As the rate of expansion is increased the amplitude range of Combined Signal 11 is increased. Thus the order or rate of expansion can be chosen to provide the required increase in the dynamic range of Combined Signal 11 to suit the appliance on. However, the higher the rate of expansion the higher the amplification on high level amplitudes of Combined Signal which may result in distortion in the Combined Signal 11.

Figure 5:
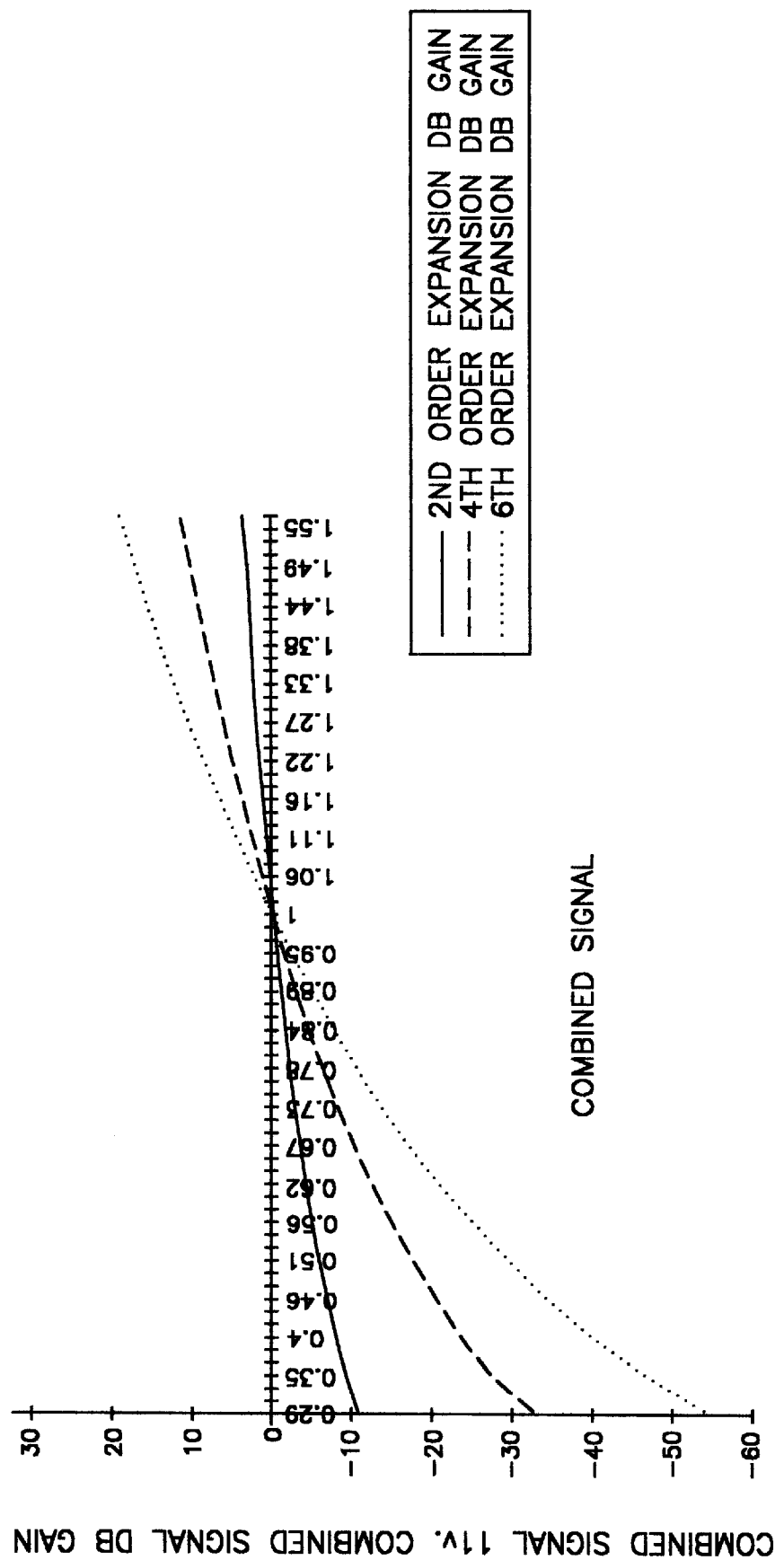
FIG. 5 is a graph that illustrates the same conditions as for FIG. 4 but in terms of dB gain, in accordance with one embodiment of the present invention.

FIG. 5 illustrates the same conditions as for FIG. 4 but in terms of dB gain. Combined Signal amplitudes approaching zero are given very large attenuation and the attenuation is then a relatively reduced as the Combined Signal amplitude increases. Thus if the Combined Signal only contains a low amplitude signal (LAS) then the amplitude of the LAS will be much lower in Combined Signal 11, however, if the Combined Signal contains both a LAS and a higher amplitude signal (HAS) then the level if attenuation on the LAS will be reduced and the amplitude of the LAS will be increased in the Combined Signal 11. As the amplitude of the HAS increases the relative reduction in attenuation on the LAS will be increased. Also as the rate of expansion is increased the rate of relative reduction in the attenuation in the LAS will be increased as the HAS amplitude increases. Therefore, the higher the amplitude of the HAS relative to the LAS amplitude the more the relate increase in the LAS amplitude in the Combined Signal 11. Hence the lowest amplitude signal in the Combined Signal will be enhanced, relative to all other signals, in the Combined Signal 11.

Figure 6:
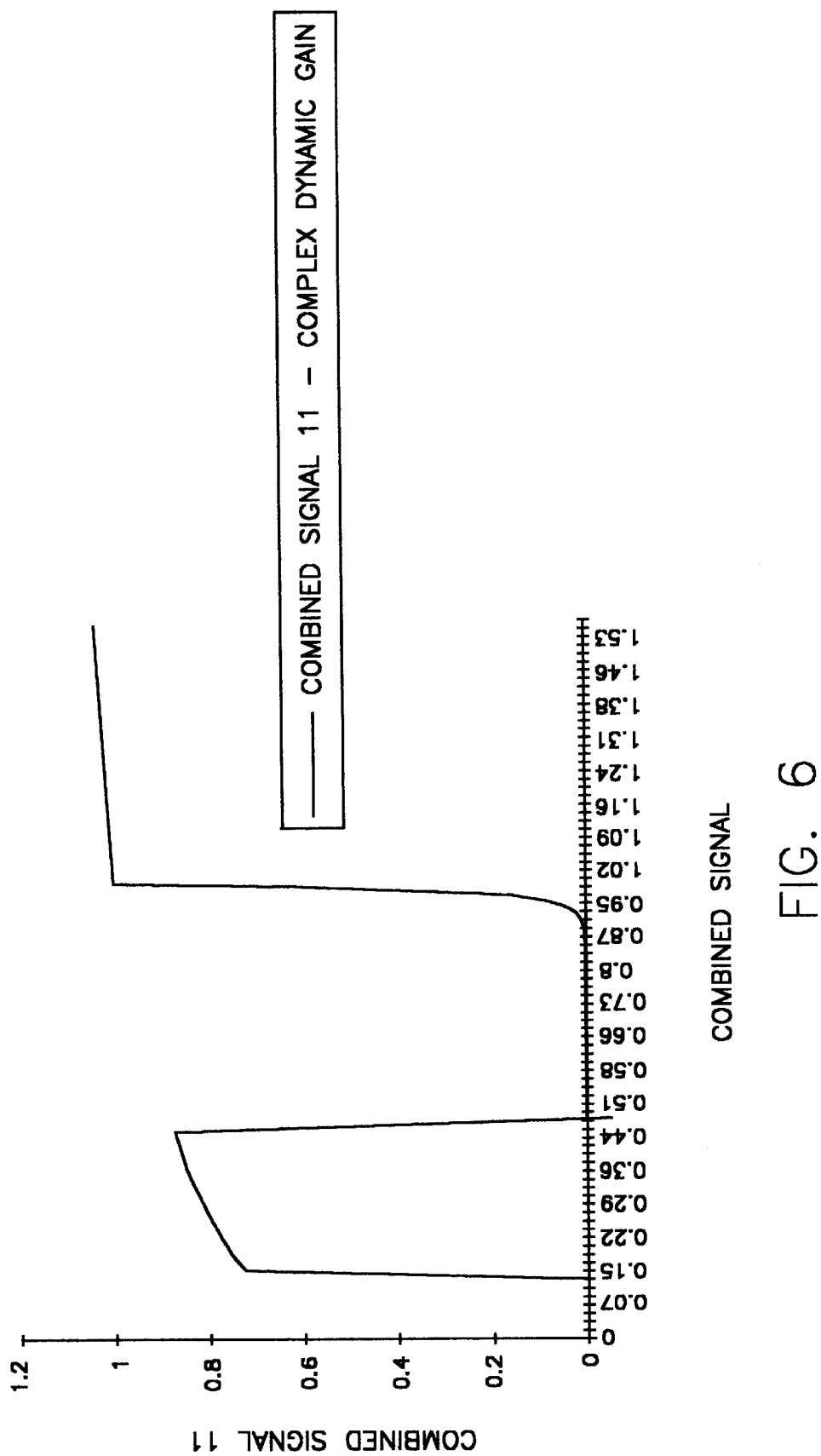
FIG. 6 is a graph that illustrates the effect of applying complex amplitude dependent gain on the combined signal, in accordance with one embodiment of the present invention.

Stage Processing Settings Used to Generate FIG. 6

Stage 10 was set to instruct Stage 11 to carry out the amplitude dependent gain on the Combined signal to generate the Combined Signal 11 illustrated in FIG. 6. All other Stage Processing Settings were the same as those used to generate FIG. 2, FIG. 3, FIG. 4 and FIG. 5.

FIG. 6 illustrates the effect of applying complex amplitude dependent gain, for example, both compression and expansion, on the Combined Signal with Control Signal 6 switched off. Any combination of expansion and compression rates can be selected to be applied on any Combined Signal amplitude range by Stage 11 under the instruction of Stage 10. FIG. 6 shows Combined Signal amplitudes under 0.1456, level A, being subjected to high order expansion, e.g. 50th order, so that they do not appear in Combined Signal 11. Combined Signal amplitudes between 0.1456 and 0.5096, level A and B respectively, are subjected to compression to provide a required Combined Signal 11 amplitude range. Combined Signal amplitudes between 0.5096 and 0.8736, level B and C, are subjected to a high order expansion. Combined Signal amplitudes above 0.8736, level D, are subjected to a high order compression to avoid distortion in Combined Signal 11. Therefore, complex amplitude gain can be used to emphasize or filter a range of Combined Signal amplitudes. Referring to FIG. 6 the Combined Signal amplitude range A to B has been filtered, range B to C has been emphasized and range C to D has been filtered. The Combined Signal amplitude range, rate of emphasis or filtration and Combined Signal 11 amplitude range can be selected to suit the application.

Any number of Combined Signal amplitude ranges can be chosen for emphasis or filtration as long as preferably a condition exists such that the Combined Signal amplitude is less than 1. This does not restrict the use of complex amplitude dependent gain, because the linear gain setting of Stage 1 and the gain adjustment of Stage 8 can alter the Combined Signal amplitude range as required.

Advantageously, any changes in the amplitude dependent gain over the emphasized Combined Signal amplitude range must be carried out with an attack, sustain and decay to ensure that the amplitude dependent gain adjustment does not cause switching noise to be introduced into the processed information signal.

So far the system has been d ascribed with the Control Signal 6 switched off. The action of the Control Signal 6 will now be described in detail using FIG. 7.

Figure 7:
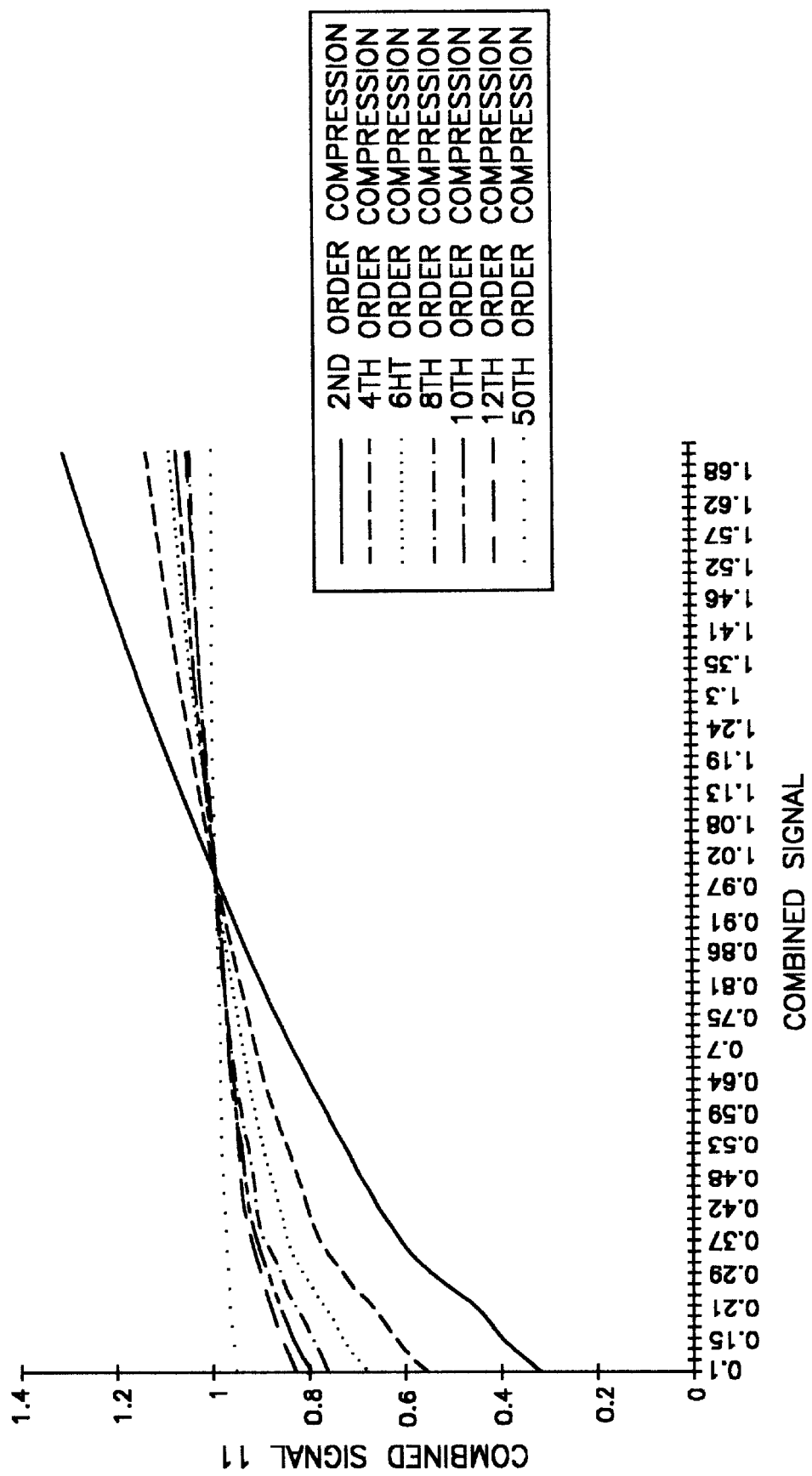
FIG. 7 is a graph that illustrates the effect of various orders of compression on the combined signal, in accordance with one embodiment of the present invention.

Stage Processing Settings Used to Generate FIG. 7

Stage 5 is set to instruct Stage 6 to generate the Control Signal 6 amplitude, the effects of which are illustrate in FIG. 7. All other Stage Processing Settings are the same as those used to generate FIG. 2, FIG. 3, FIG. 4 and FIG. 5.

FIG. 7 illustrates the effect of various orders of compression on the Combined Signal provided by Stage 9 with Stage 5 monitoring the Input Signal 2 amplitude and instructing Stage 6 to gradually adjust the Control Signal 6 amplitude from 0.1 to 0.15 over the Combined Signal amplitude range 0.209 to 0.368, range A to B. It is important to change the control Signal 6 amplitude gradually both in terms of level and time to avoid unwanted sudden large changes in the gain applied to the Combined Signal resulting in switching noise in Combined Signal 11. This gradual change may be linear or exponential both in terms of level and time. Stage 5, therefore, instruct Stage 6 to generate a change in the Control Signal 6 amplitude which has an attack, sustain and decay which is dependent on the application. The sustain has a linear relationship to the difference between the actual amplitude of Input Signal 2 and the Input Signal 2 trigger amplitude corresponding to Combined signal amplitude B i.e. the higher the Input Signal 2 amplitude is above the trigger B Input Signal 2 amplitude the longer the sustain. By adding the Control Signal 6 amplitude to the Input Signal 8 amplitude the Combined Signal amplitude cannot drop below the level A even if the Input Signal 8 amplitude is zero. Control Signal 6, therefore, can be used to set the maximum amplification experienced by Input Signal 8 thus avoiding distortion in the Combined Signal 11 due to excessive amplification of low level amplitudes of the Combined Signal. The lower limit of the Combined Signal 11 amplitude range can thus be set by the Control Signal 6 amplitude.

Referring to FIG. 3, if a Control Signal 6 amplitude is set so that the Combined Signal amplitude is 1.0 then the Input Signal 8 will be subjected to an effective gain of 1 by Stage 11. If Control Signal 6 is now reduced the Combined Signal amplitude will reduce even though the Input Signal 8 amplitude remains the same. As the Control Signal 6 amplitude is reduced the effective amplification on the Input Signal 8 is increase. If the Control Signal 6 amplitude is increased, however, the Combined Signal amplitude will increase even though the Input Signal 8 amplitude remains the same. As the Control Signal 6 amplitude is increased the effective amplification on the Input Signal 8 amplitude is reduced, i.e. the Input Signal 8 amplitude is relatively attenuated. The amplitude of the Control Signal 6 can be varied at each level of Input Signal 2 amplitude thereby selecting the amount of amplification or attenuation the Input Signal 8 amplitude is subjected to by Stage 11. Similarly if the amplitude dependent gain of Stage 11 is expansion rather than compression then, referring to FIG. 5, if a Control Signal 6 amplitude is set so that the Combined Signal amplitude is 1.0 then the Input Signal 8 will be subjected to an effective gain of 1 by Stage 11. If Control Signal 6 is now reduced the Combined Signal amplitude will reduce even though the Input Signal 8 amplitude remains the same. As the Control Signal amplitude is reduced the effective amplification on the Input Signal 8 is reduced. If the Control Signal 6 amplitude is increased, however, the Combined Signal amplitude will increase even though the Input Signal 8 amplitude remains the same. As the Control Signal 6 amplitude is increased the effective amplification on the Input Signal 8 amplitude is increased, i.e. the Input Signal 8 amplitude is relatively amplified. The amplitude of the Control Signal 6 can be varied at each level of Input Signal 2 amplitude thereby selecting the amount of amplification or attenuation the Input Signal 8 amplitude is subjected to by Stage 11.

Figure 8:
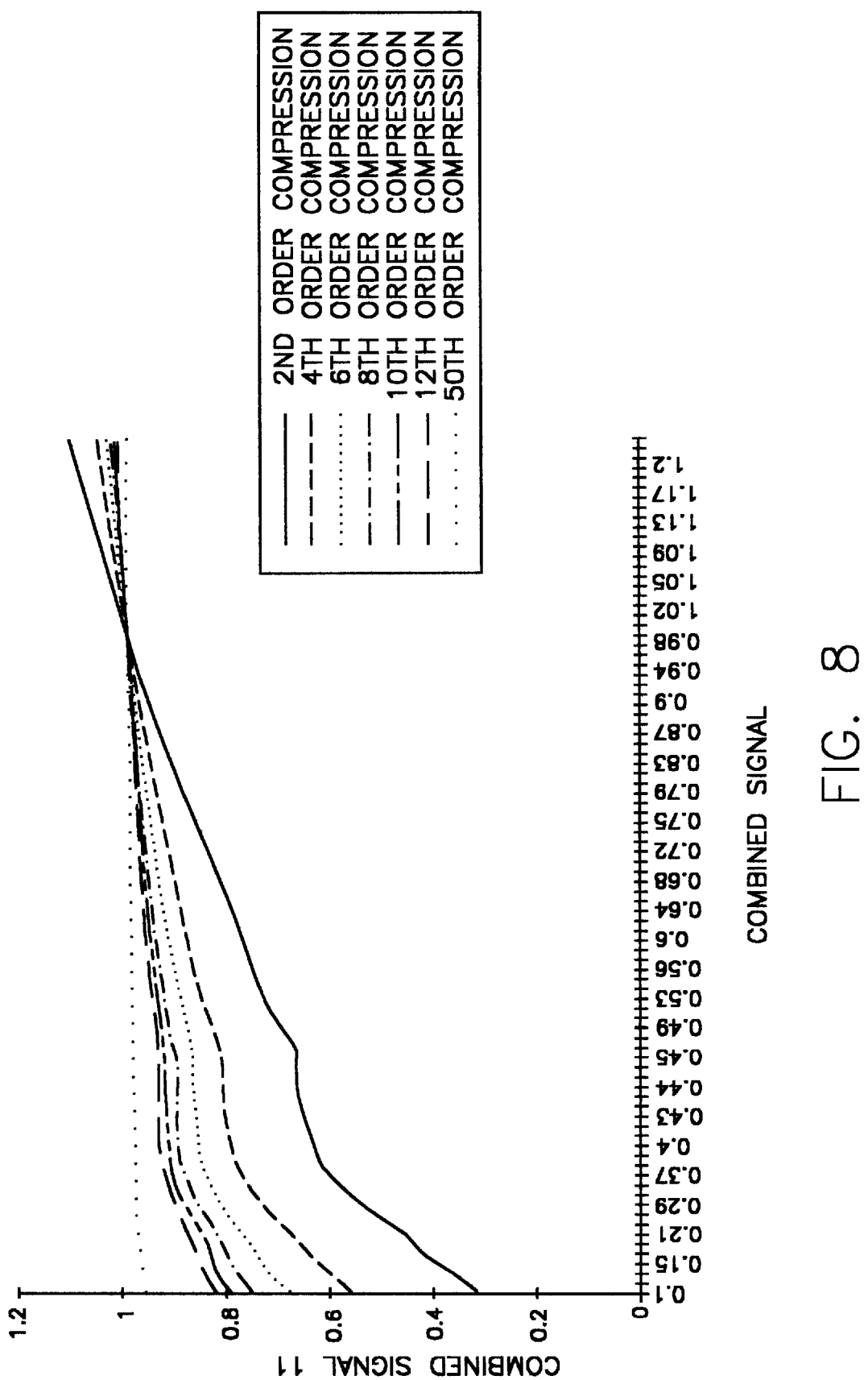
FIG. 8 is a graph that illustrates the effect of various orders of compression on the combined signal, in accordance with another embodiment of the present invention.

Stage Processing Settings Used to Generate FIG. 8

Stage 7 was set to instruct Stage 8 to generate the an adjustment in the Input Signal 2 gain resulting in the Combined Signal 11 illustrated by FIG. 8. All other Stage Processing Settings were the same as those used to generate FIG. 7.

FIG. 8 illustrates the effect of various orders of compression on the Combined Signal with Stage 7 monitoring the Input Signal 2 amplitude and instructing Stage 8 to gradually adjust the Input Signal 2 gain from 1.0 to 0.7 over the Combined Signal amplitude range 0.368 to 0.452, range B to C. The information signal has an amplitude which is unpredictable so that large fast swings in the Input Signal 2 amplitude are possible. Adjustments to the gain on Input Signal 2 are dependent on the Input Signal 2 amplitude. It is advantageous, therefore, to adjust the Input Signal 2 gain gradually both in terms of level and time to avoid unwanted sudden large changes in the gain applied to the Input Signal 2 amplitude resulting in switching noise in Input Signal 8. This gradual change may be linear or exponential both in terms of level and time. Stage 7, therefore, instructs Stage 8 to generate an adjustment to the Input Signal 2 gain which has an attack, sustain and decay which is dependent on the application. The sustain has a linear relationship to the difference between the actual amplitude of Input Signal 2 and the Input Signal 2 trigger amplitude corresponding to Combined Signal amplitude C i.e. the higher the Input Signal 2 amplitude is above the trigger C Input Signal 2 amplitude the longer the sustain. Any number of adjustments to the Input Signal 2 gain may be made over any Combined Signal amplitude range.

Thus the action of stages 1 to 11 have set the upper and lower limits of the amplitude range of Combined Signal 11.

The processing carried out by Stages 1 to 11 have thus been explained in detail with reference to FIGS. 1, 2, 3, 4, 5, 6, 7 and 8.

Stages 12 and 13 will now be explained in detail.

Figure 9:
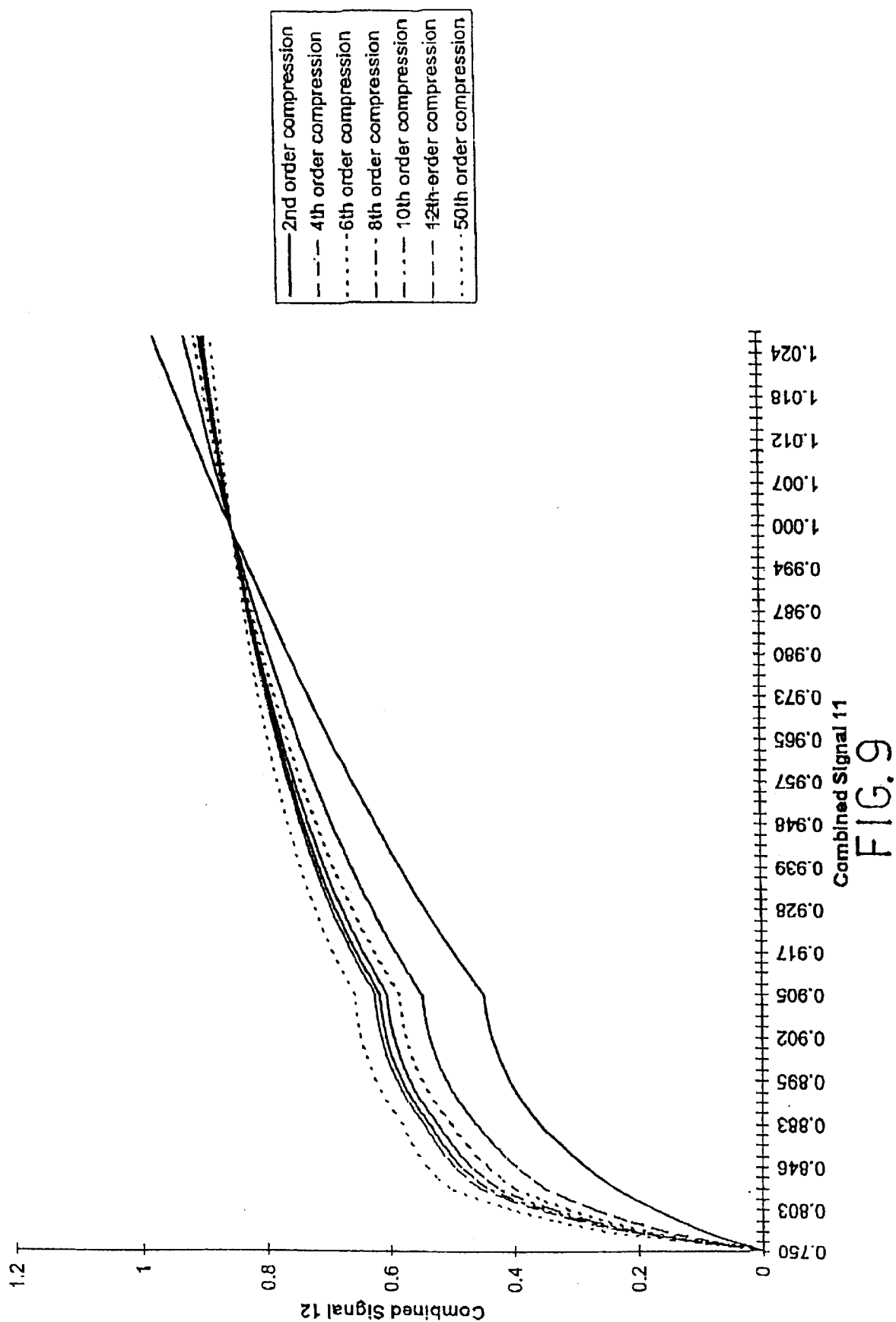
FIG. 9 is a graph that illustrates the effect of various orders of compression on the combined signal, in accordance with one embodiment of the present invention.

The same Stage Processing Settings used to generate FIG. 8 were used to generate FIG. 9.

Combined Signal 11 enters a frequency filtration Stage 126, referred to as the twelfth processing stage (Stage 12). The signal provided to Stage 12 is subjected to sufficient band pass frequency filtration to remove all signals outside the information signal frequency range. Combined Signal 11 is converted into Combined Signal 12 by the action of filtration Stage 12. This is done to remove Control Signal 6 frequency components from Combined Signal 12 as Control Signal 6 is no longer required. As Control Signal 6 only contains frequencies outside the information signal frequency range the action of Stage 12 does not result in a loss of information. A Voltage Controlled Voltage Source filter, as outlined in the Stage 2 description, can be used for a hardware implementation giving the required lower and upper cut off frequencies and the roll-off characteristics of the Stage 12 band pass frequency filter.

FIG. 9 illustrates the action of Stage 12 with a Stage 9 gain of ×1.0 on the Input Signal 8 amplitude and the dynamic gain of Stage 11 being various orders of compression as shown. It is important to remember that the information signal is dynamic and unpredictable so that FIG. 9 cannot be used as a look up table to set the gain on the Input Signal 8 amplitude without using Control Signal 6 in Stage 11 processing. If large fast changes in gain are used by a look up table to compensate for sudden changes in Input Signal 8 amplitude switching noise is introduced into the system. Look up tables or normalization during fast fourier analysis are most useful for stored predictable information signals but are inadequate for unpredictable real time—real world information signals. When using the Control Signal 6 amplitude to set the dynamic gain on the Input Signal 8 amplitude during Stage 11 processing fast large changes in the Control Signal 6 amplitude do not introduce switching noise because Control Signal 6 is outside the information signal frequency range and can, therefore, be frequency filtered out of Combined Signal 12 by the action of Stage 12. As Control Signal 6 only contains frequencies higher than the information signal frequency range the Control Signal 6 amplitude will always be able to control the amount of dynamic gain the Input Signal 8 amplitude is subjected to by Stage 11 no matter how fast or by how much the information signal amplitude changes. Changes in the Control Signal 6 amplitude can also be given any time envelope, attack—sustain—decay, required by an application to ensure that changes in gain applied to the Input Signal 8 amplitude are carried out gradually. The Control Signal 6 amplitude, therefore, allows the dynamic gain applied to the Input Signal 8 amplitude by Stage 11 to be continuously controlled without introducing switching noise, distortion or loss of information.

Figure 10:
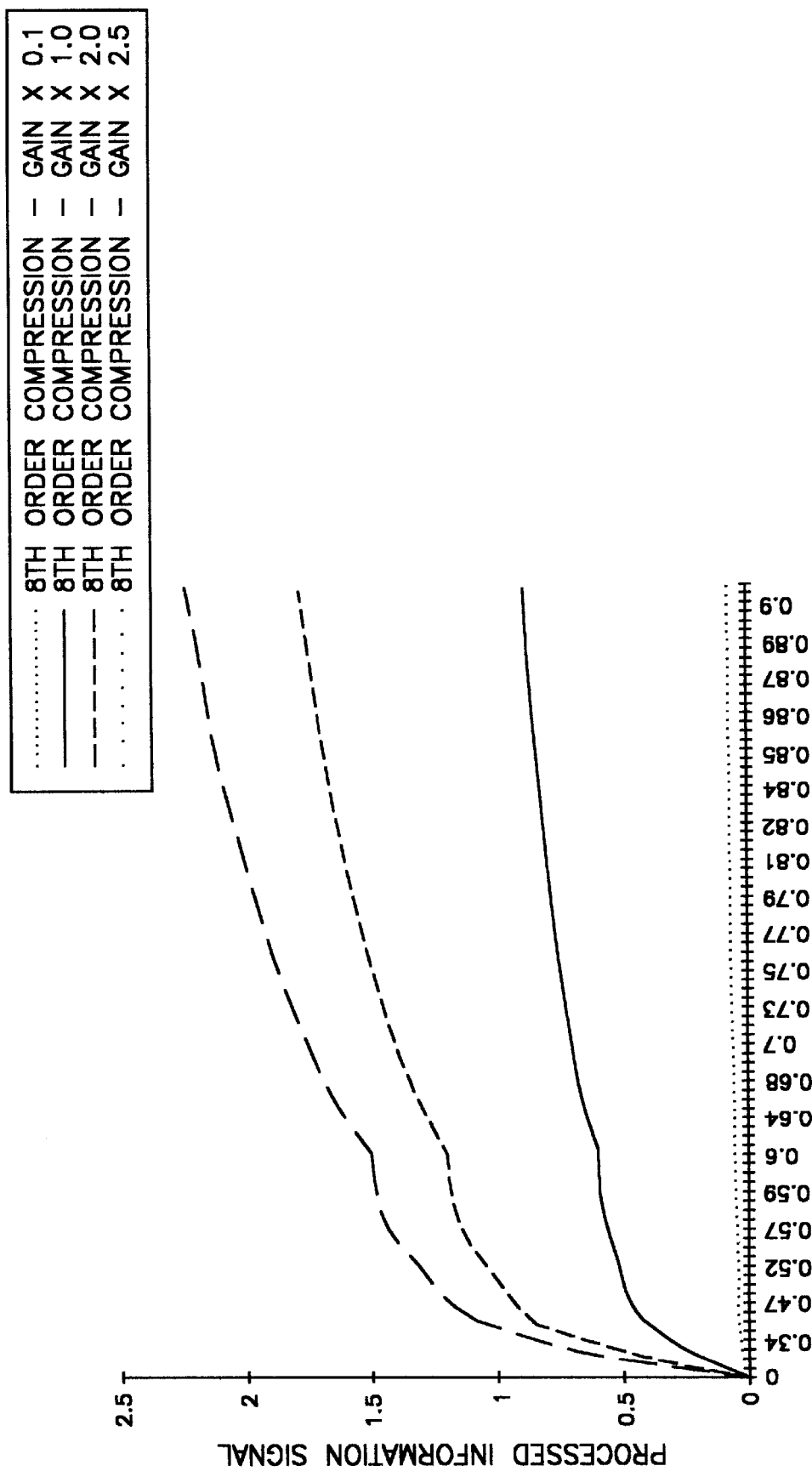
FIG. 10 is a graph that illustrates the effect of various orders of compression and gain on the combined signal, in accordance with one embodiment of the present invention.

The same Stage Processing Settings used to generate FIG. 8 were used to generate FIG. 10 except that Stage 10 provides an instruction signal to Stage 11 to carry out only 8th order compression on the Combined Signal amplitude and Stage 13 is set to the static gain of ×0.1,×1.0,×2.0,×2.5.

Combined Signal 12 is subjected by Stage 13 to a linear gain, which is not dependent on the amplitude of Combined Signal 12, i.e. the same gain is applied to all information signal amplitudes. For a hardware implementation a voltage gain inverting operational amplifier may be used, as outlined in the description relating to Stage 1. The linear gain applied by the linear gain setting Stage 13 on the Combined Signal 12 may be used to set the upper amplitude limit of the output signal of Stage 13, and is preferably at the same level as the upper amplitude limit of the of the optimum amplitude range of the receptor. Combined Signal 12 is converted into the processed information signal by the action of linear gain setting Stage 13. FIG. 10 illustrates the effect of Stage 13 on Combined Signal 12 where the Combined Signal has been subjected to 8th order compression by Stage 11.

The amplitude range of the information signal has thus been matched to the required processed information signal amplitude range, which is the optimum amplitude range of the receptor, by the action of Stages 1 to 13.

The individual action of each stage has thus been described. The overall action of Stages 1 to 13 on the information signal in order to produce a processed information signal will now be described with reference to FIGS. 11 to 30.

Figure 11:
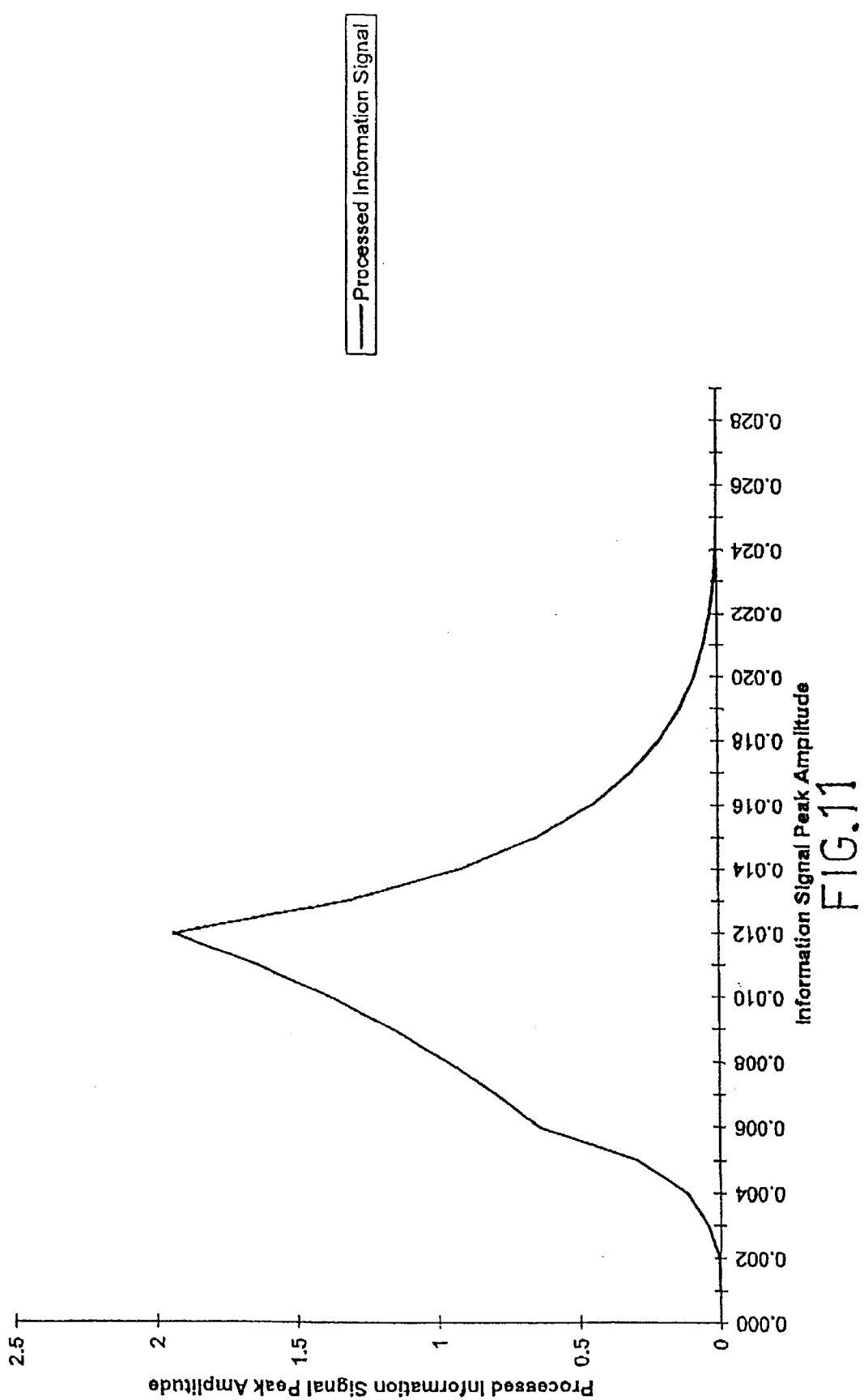
FIG. 11 is a graph that illustrates the processed information signal peak amplitude and information signal dB level in accordance with one embodiment of the present invention.

FIG. 11 shows a processed information signal verses information signal peak amplitude response. The response contains the features required to demonstrate in detail the action of the Stages 1 to 13. It is appreciated that the information signal could represent light (visible, infra red, ultra violet), sound, pressure, motion, stored data etc. As such the present invention can process any information signal that contains amplitude information. In the present context, it is assumed that the information signal peak amplitudes shown in FIG. 11 correspond to dB levels shown in FIG. 12, where the dB levels relate to the appropriate light, sound, pressure etc. reference depending on the application.

Figure 12:
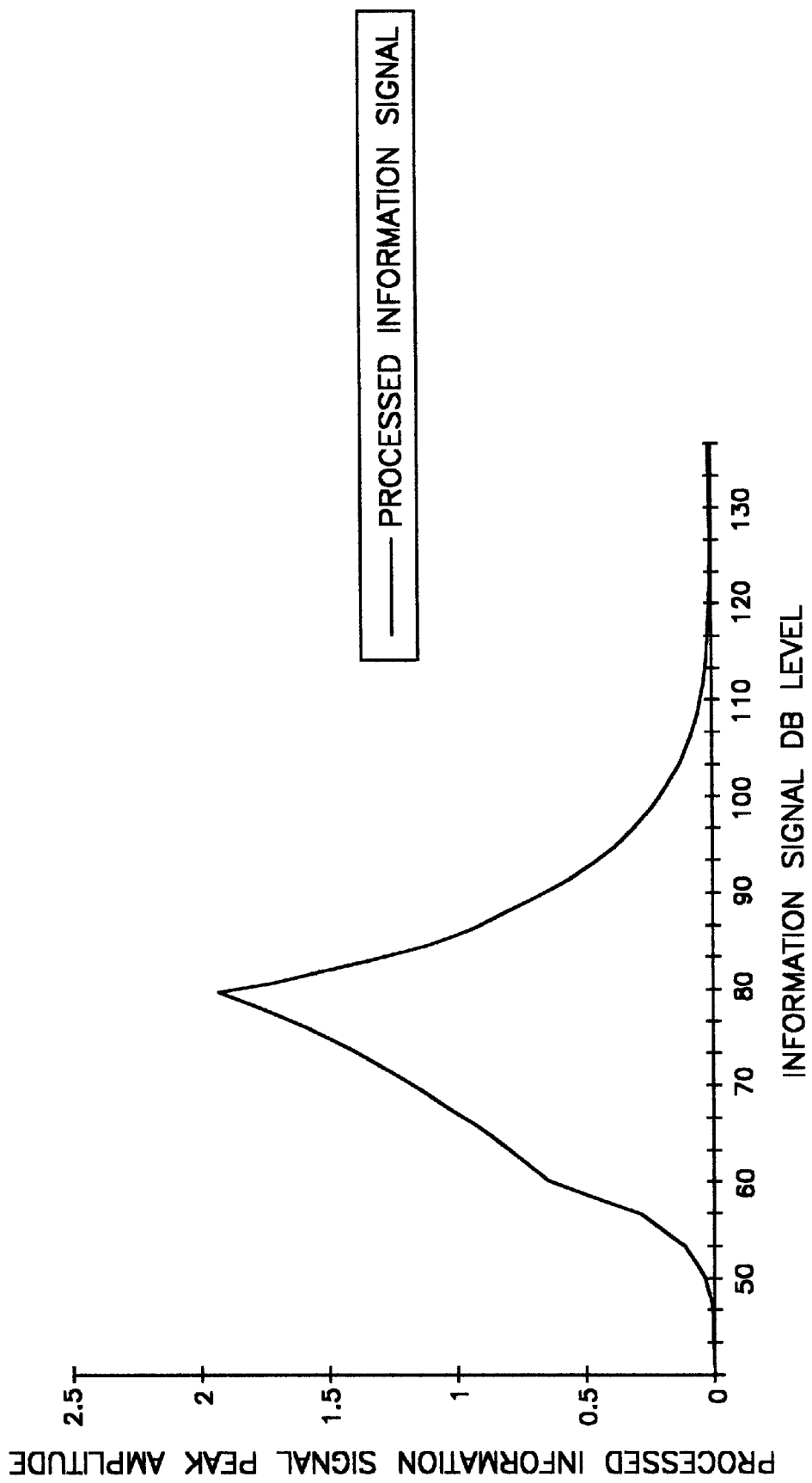
FIG. 12 is a graph that illustrates the processed information signal and information signal peak amplitudes in accordance with one embodiment of the present invention.

Referring to FIG. 12, information signal amplitudes in the range of 60 dB to 80 dB have been 'emphasized' and all other information signal amplitudes have been 'filtered' in the processed information signal. The emphasis and filtration between 50 dB and 120 dB is complex and will be explained in detail hereinafter.

Figure 13:
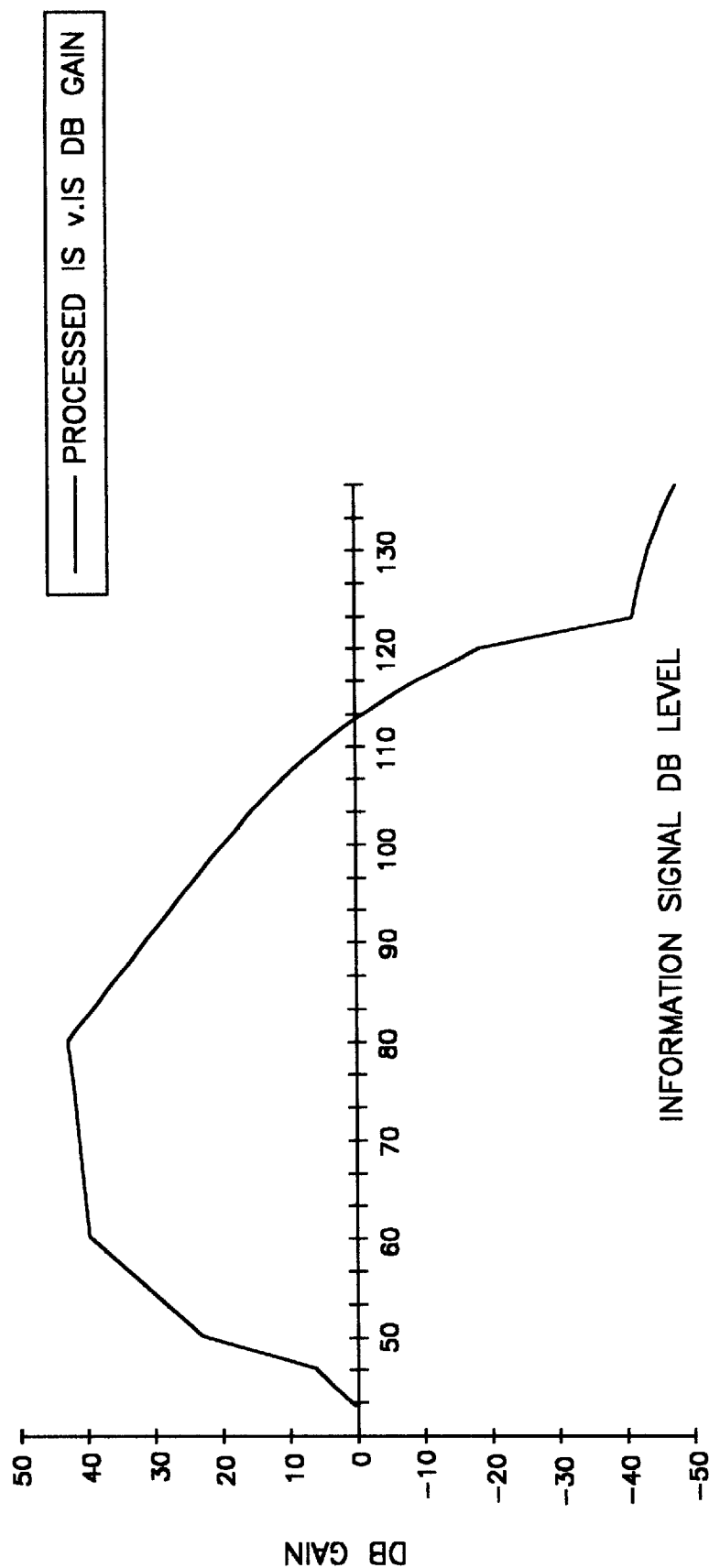
FIG. 13 is a graph that illustrates a processed information signal and information signal dB gain response, in accordance with one embodiment of the present invention.

The processed information signal verses information signal dB gain response required to generate the required processed information signal is shown by FIG. 13. Information signals between 60 dB and 80 dB are given a gradual increase in dB gain with information signals between 50 dB and 60 dB given a gradual decrease in gain and the rate of decrease in gain increasing below 50 dB. Information signals between 80 dB and 120 dB are also given a gradual decrease in gain with the rate of decrease in gain increasing below 100 dB. It is advantageous that all gain changes experienced by the information signal be carried out gradually both in terms of rate of change and time, as previously outlined.

Figure 14:
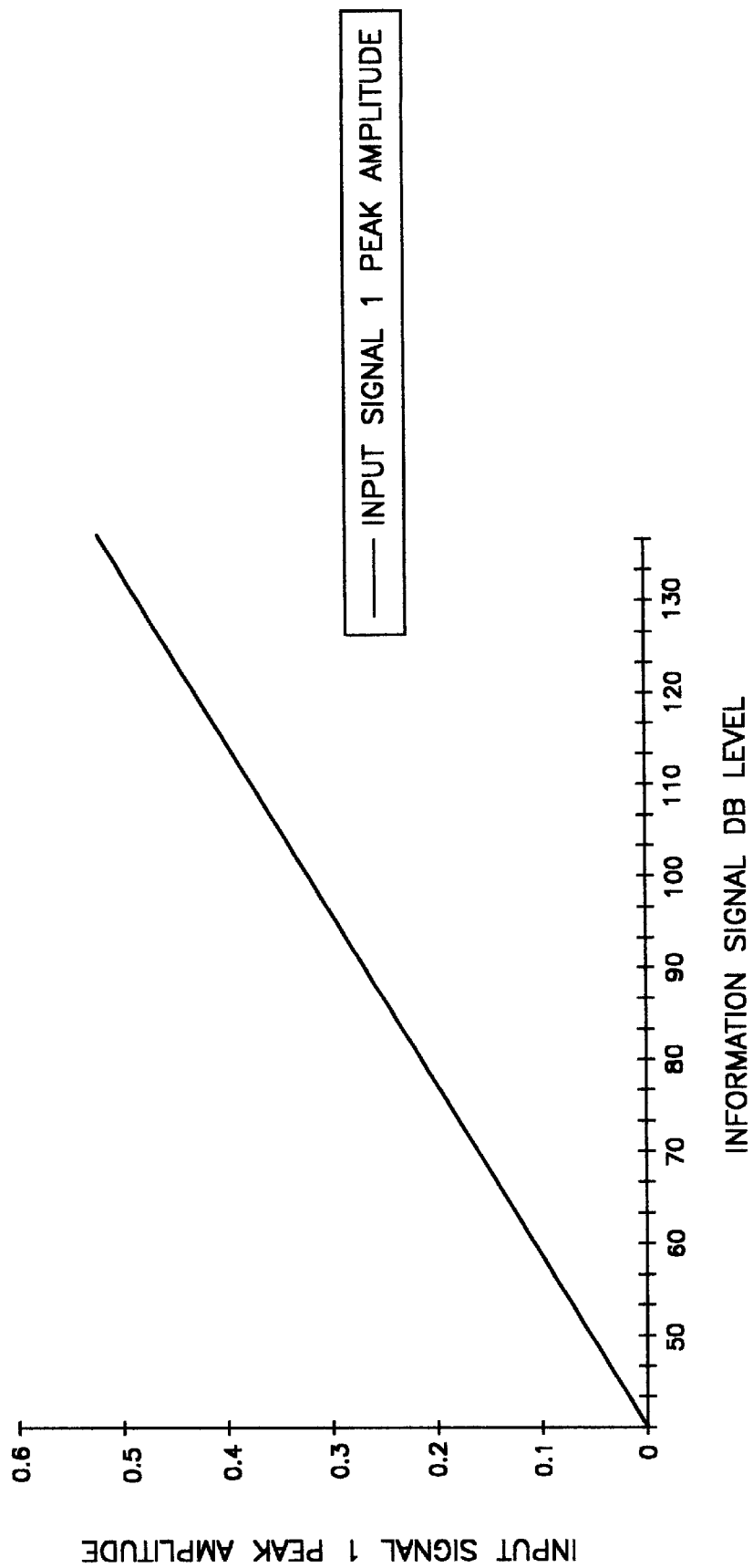
FIG. 14 is a graph that illustrates an information signal dB level and input signal 1 peak amplitude response, in accordance with one embodiment of the present invention.
Figure 15:
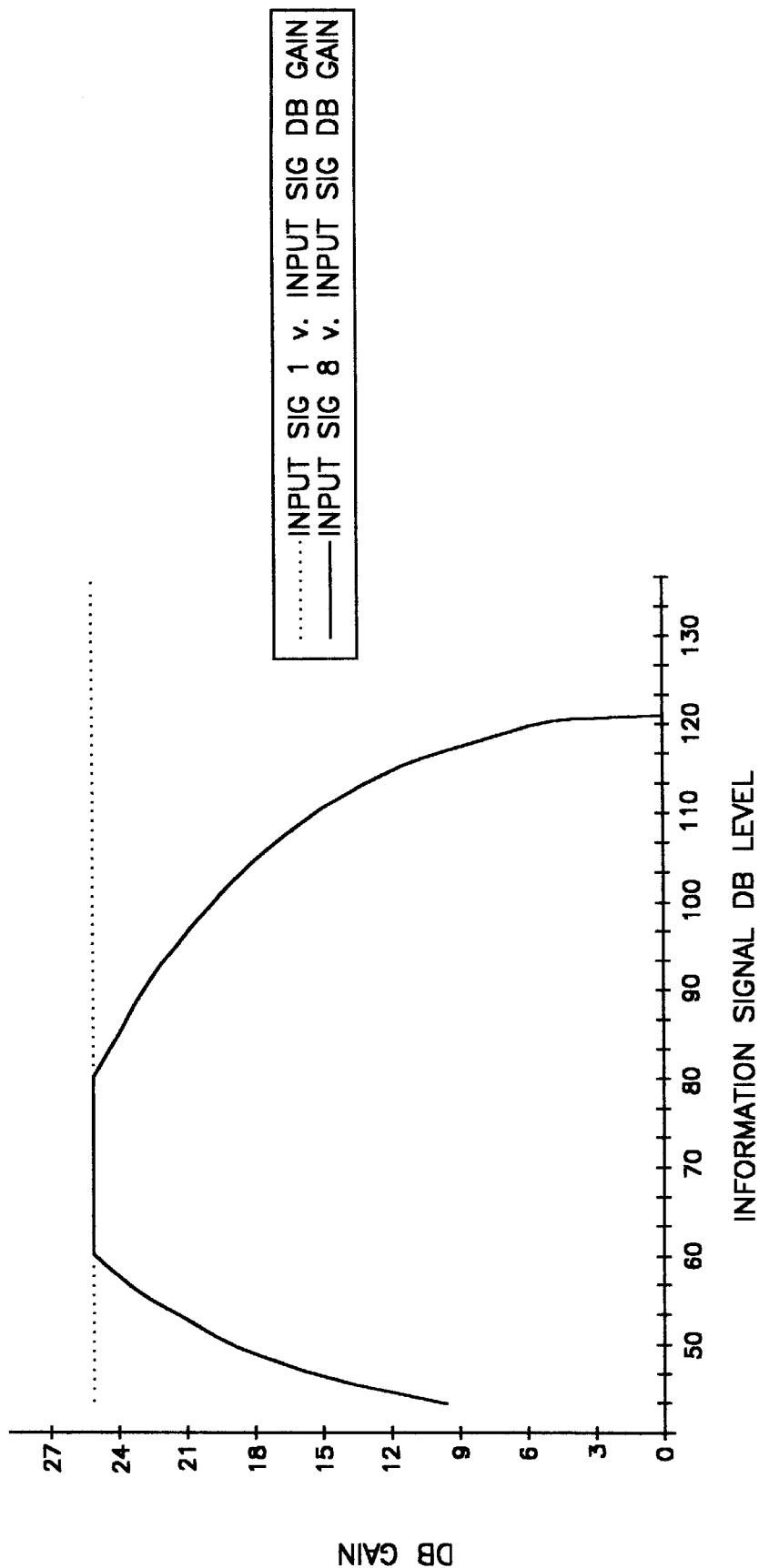
FIG. 15 is a graph that illustrates input signal and information signal dB gain responses, in accordance with one embodiment of the present invention.

With reference to FIG. 13 Stage 1 sets the linear gain to generate the Input Signal 1 verses information signal response shown in FIG. 14. The Input Signal 1 verses information signal dB gain response is shown in FIG. 15 where a straight line indicates a linear dB gain. Stage 2 carries out the appropriate frequency filtration to remove all signals with a frequency outside the information signal frequency range. FIG. 15 also illustrates the Input Signal 8 verses information signal dB gain response where Information Signal dB levels between 60 dB and 80 dB are given the linear gain supplied by Stage 1 with information signal dB levels below 60 dB given a gradual decrease in gain as are information signal dB levels above 80 dB. The rate of change of gain does not change between 50 dB and 60 dB or between 80 dB and 120 dB.

Figure 16:
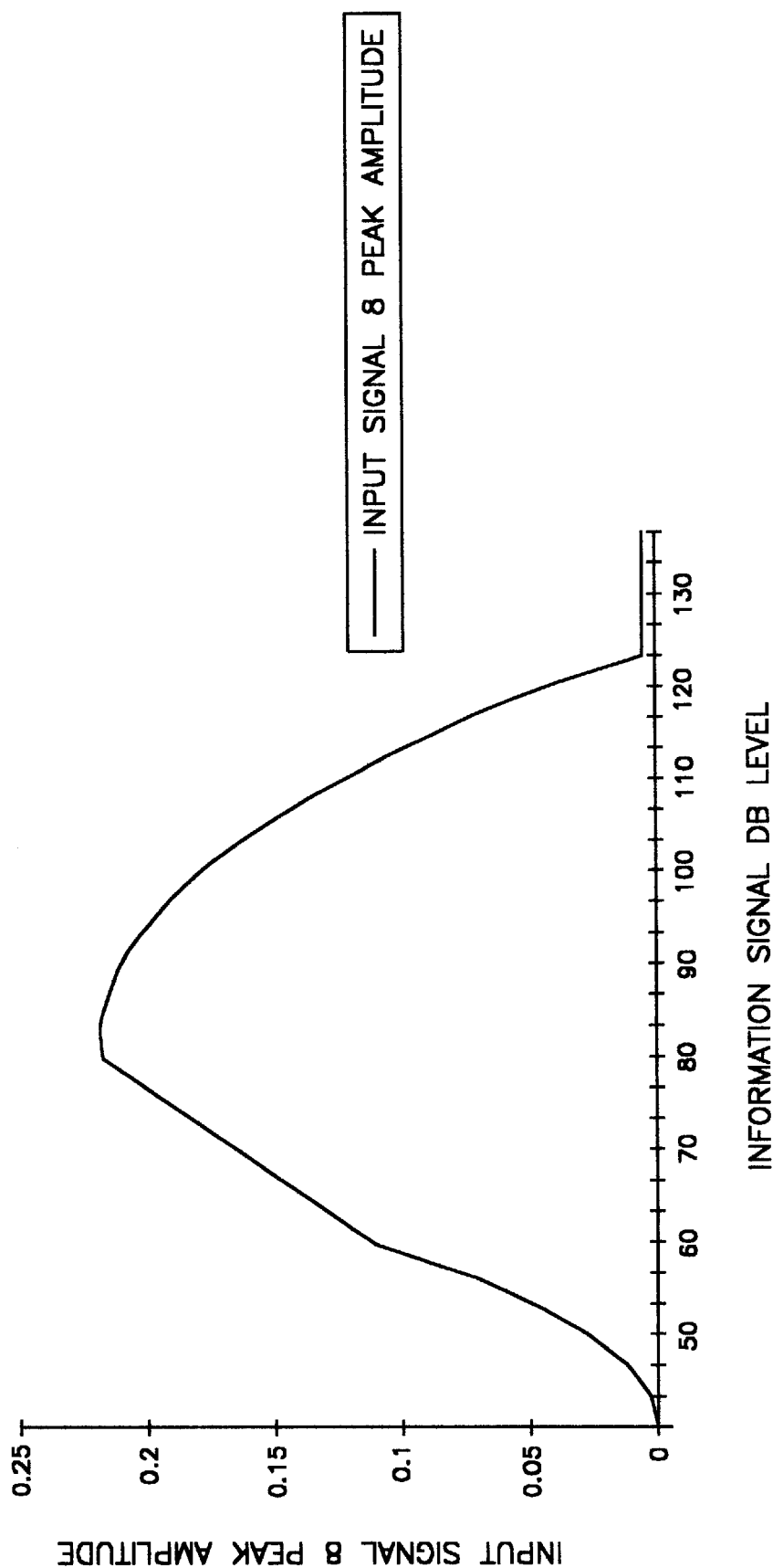
FIG. 16 is a graph that illustrates an input signal 8 peak amplitude and information signal dB level response, in accordance with one embodiment of the present invention.

FIG. 16 shows the Input Signal 8 peak amplitude versus information signal dB gain response which reflects the linear gain carried out by Stage 1 between information signal dB levels of 60 dB and 80 dB and the gain adjustments carried out by Stage 8 described above.

Figure 17:
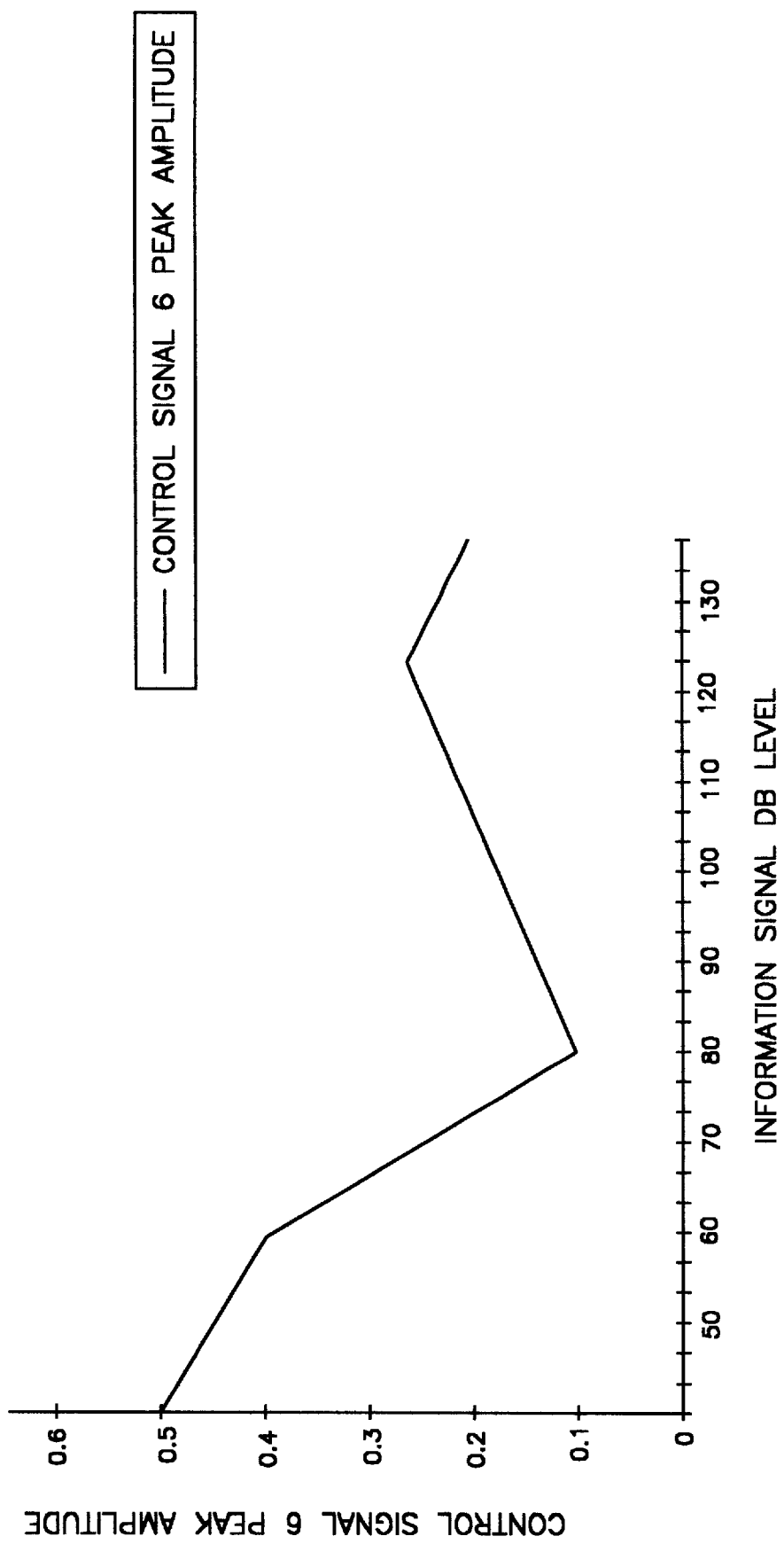
FIG. 17 is a graph that illustrates a control signal 6 peak amplitude and information signal dB level response, in accordance with one embodiment of the present invention.

Stages 3, 4, 5 and 6 generate the Control Signal 6 peak amplitude verses information signal response shown in FIG. 17. Here Control Signal 6 is a single frequency sine wave signal where the frequency of Control Signal 6 is outside the frequency range of the information signal. The Control Signal 6 peak amplitude decreases for information signals below 80 dB with the rate of decrease increasing between 60 dB and 80 dB. The Control Signal 6 peak amplitude increases for information signals between 80 dB and 120 dB and then decreases above 120 dB.

Figure 18:
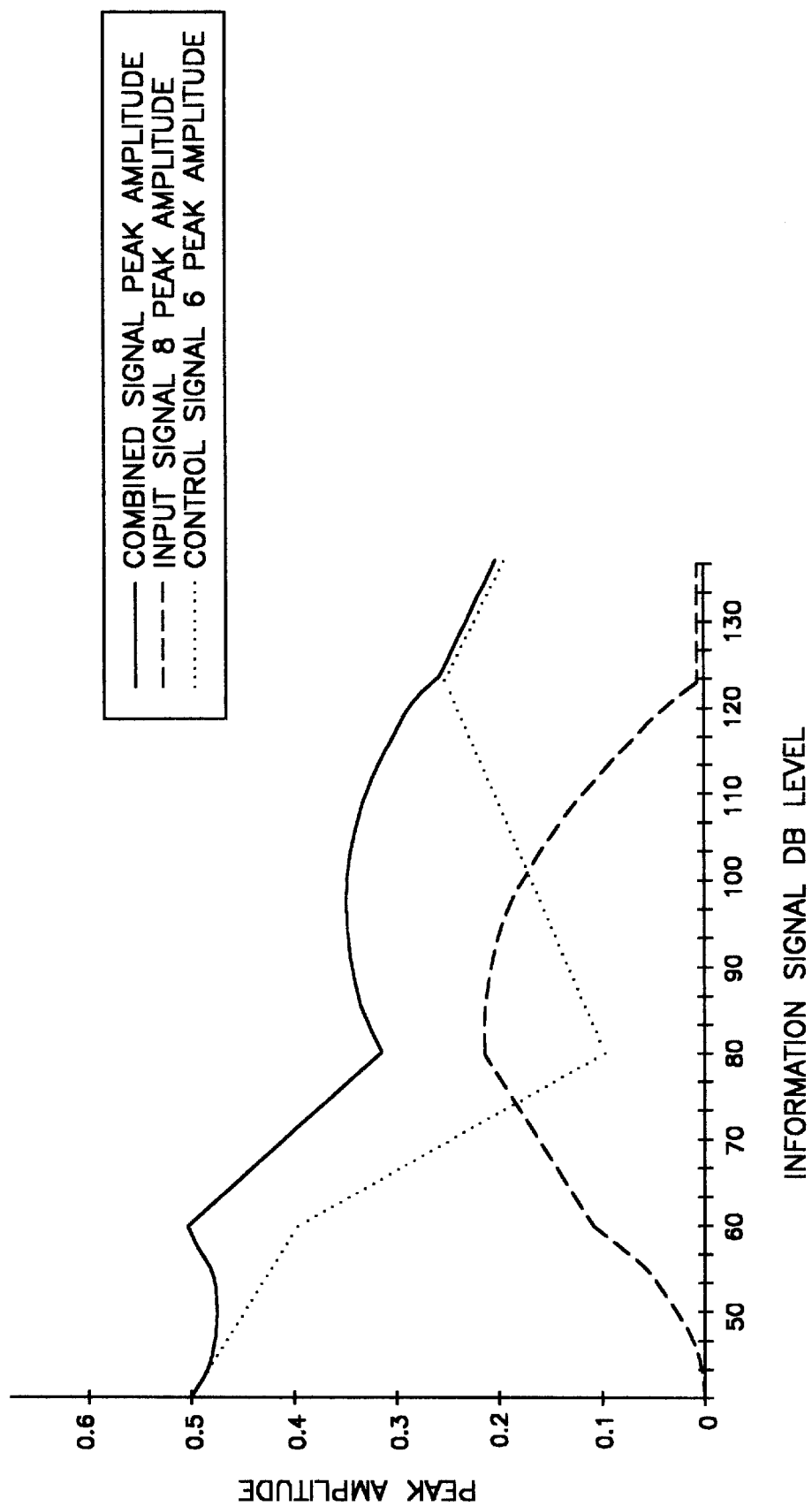
FIG. 18 is a graph that illustrates peak amplitude and information signal dB level responses, in accordance with one embodiment of the present invention.

FIG. 18 shows the Combined Signal provided by Stage 9 verses Information Signal dB level response where the action of Stage 9 adds the peak amplitudes of Input Signal 8 and Control Signal 6 in a certain ratio, in this case 1:1 to form the Combined Signal. For information signals below 60 dB the Combined Signal gradually decreases and then gradually increases because the rate of increase of the Input Signal 8 peak amplitude is configured to be greater than the rate of decrease in the Control Signal 6 peak amplitude. Between 60 dB and 80 dB the Combined Signal peak amplitude gradually decreases even though the Input Signal 8 peak amplitude is increasing. This is because the rate of increase of the Input Signal 8 peak amplitude is configured to be less than the rate of decrease of the Control Signal 6 amplitude. Similarly, the Combined Signal peak amplitude increases between 80 dB and 100 dB even though the Input Signal 8 peak amplitude decreases and between 100 dB and 120 dB the Combined Signal 6 peak amplitude decreases at a slower rate than the Input Signal 8 peak amplitude. For information signals above 120 dB the Combined Signal peak amplitude follows the Control Signal 6 peak amplitude as the Input Signal 8 peak amplitude remains at a low level. Thus the Combined Signal peak amplitude can be controlled by the Control Signal 6 peak amplitude independent of the Input Signal 8 peak amplitude.

Figure 19:
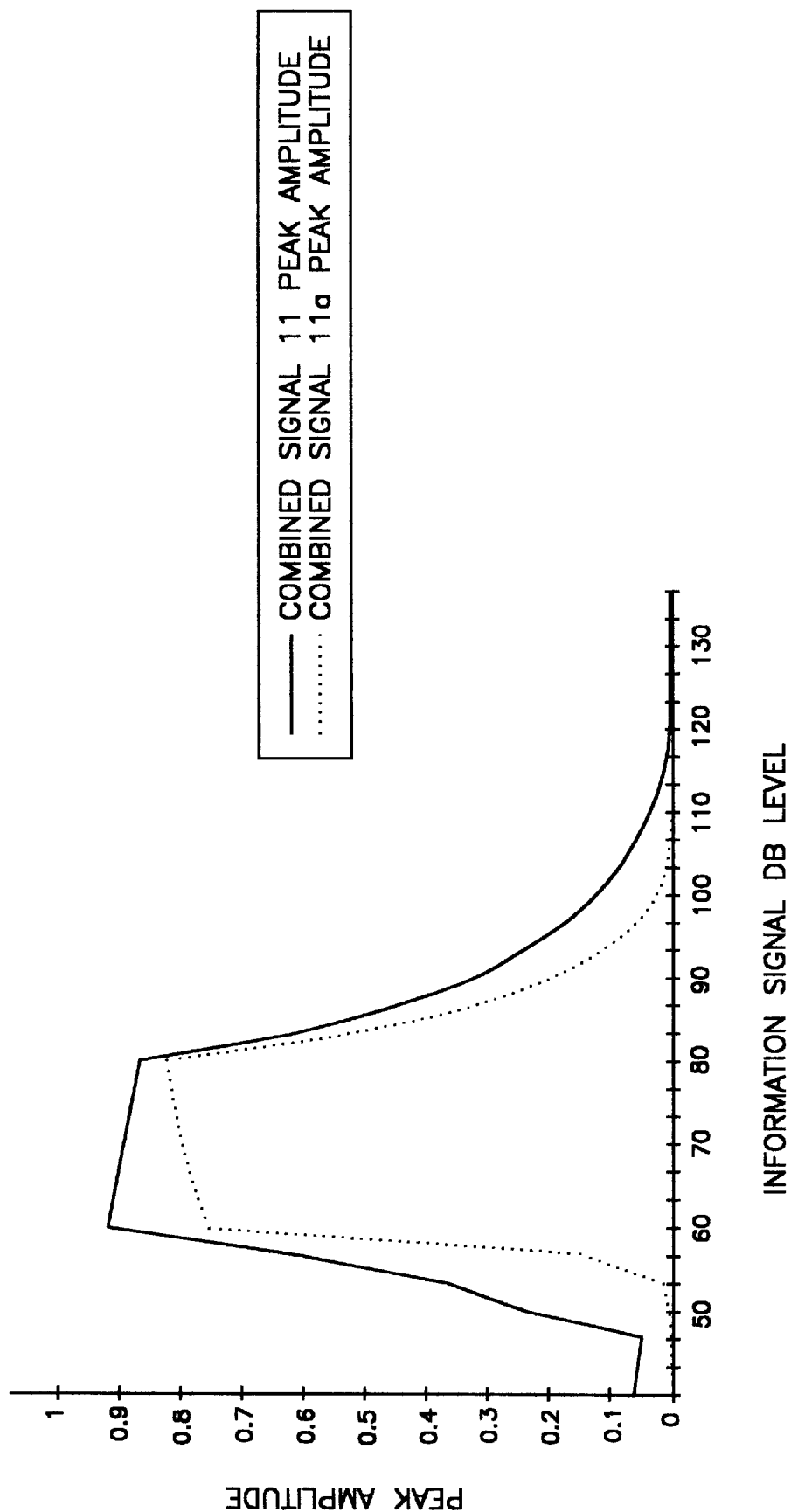
FIG. 19 is a graph that illustrates the combined signal 11 peak amplitudes and information signal dB level response, in accordance with one embodiment of the present invention.

FIG. 19 shows the affect of the action of Stages 10 and 11 where Stage 10 instructs Stage 11 to carry out 4th order expansion on the Combined Signal by raising the Combined Signal peak amplitude to the power of 4 for information Signals less than 50 dB gradually changing to 8th order compression between 50 dB and 60 dB, by gradually reducing the power from 4 to 0.125. 8th order compression is applied to the Combined Signal peak amplitude by Stage 11 between 60 dB and 80 dB and then gradually changing to 4th order expansion between 80 dB and 120 dB, by gradually increasing the power from 0.125 to 4, with 4th order expansion being applied to information signals above 120 dB. FIG. 19 also shows for comparison the effect of the same Stage 11 processing with the Control Signal 6 switched off so that its peak amplitude remains at zero. As a result, Stage 11 processing is applied to Input Signal 8 peak amplitude, illustrated by the Combined Signal 11 a peak amplitude verses information signal dB level response. It is noted that the presence of Control Signal 6 in the Combined Signal controls the effect of the amplitude dependent gain applied by Stage 11 on Input Signal 8.

Figure 20:
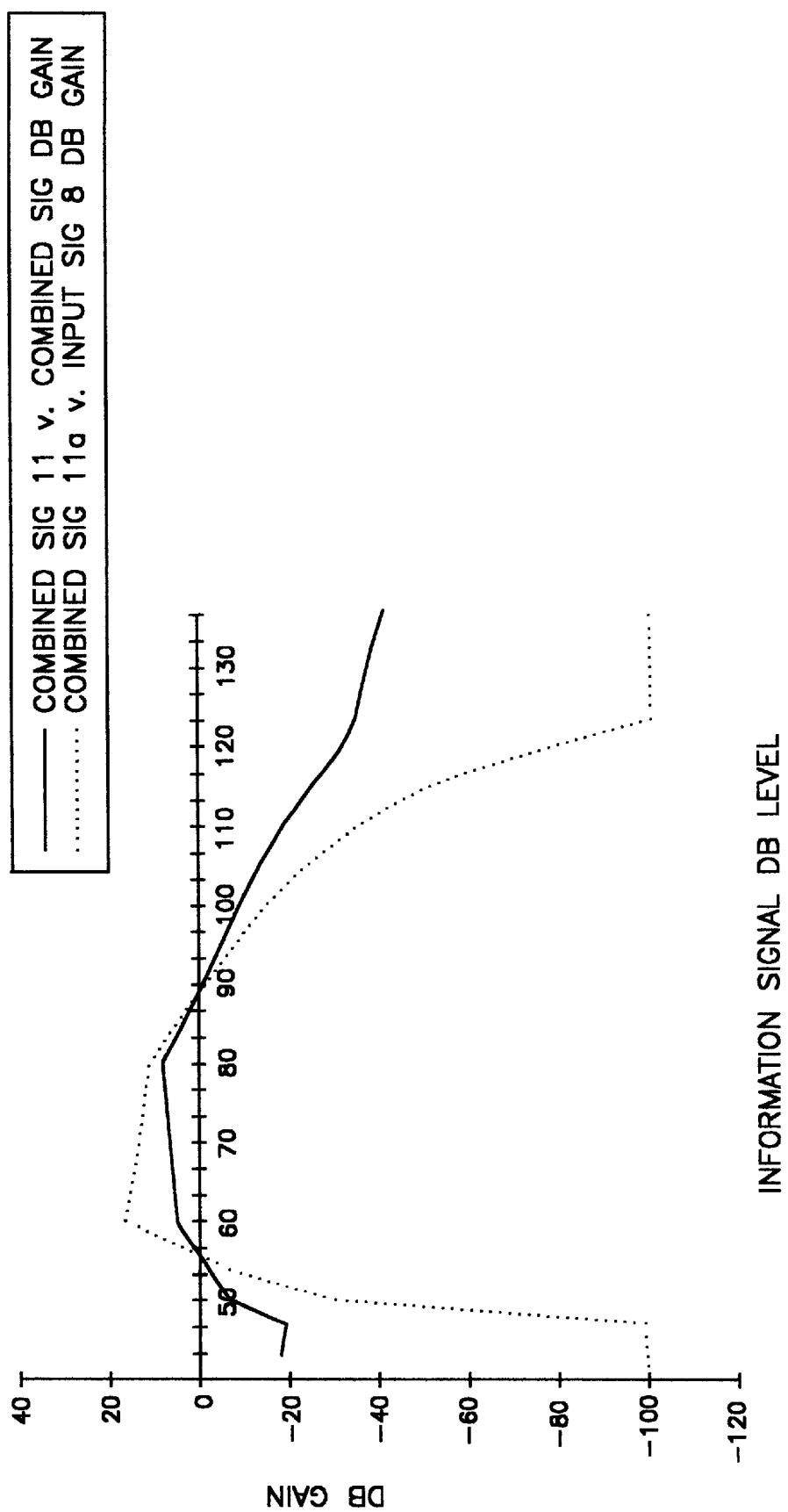
FIG. 20 is a graph that illustrates the information signal dB level and the dB gain, in accordance with one embodiment of the present invention.

The amplitude dependent gain applied by Stage 11 to Combined Signal and Combined Signal 'a', where Control Signal 6 is switched off, is also illustrated by FIG. 20, which shows the Combined Signal 11 verses Combined Signal dB gain response and the Combined Signal 11 a verses Input Signal 8 dB gain response. The presence of Control Signal 6 changes the gain from negative to positive for information signals between 60 dB and 80 dB. This is because the Combined Signal peak amplitude decreases due to the presence of Control Signal 6 even though Input Signal 8 peak amplitude is increasing, see FIG. 18. Between 60 dB and 80 dB Stage 11 is carries out 8th order compression so a decrease in Combined Signal peak amplitude results in an increase in gain, see FIG. 3. Thus Input Signal 8 experiences an increase in gain for information signals between 60 dB and 80 dB whereas if Control Signal 6 was not present in the Combined Signal then Input Signal 8 would experience a decrease in gain for information signals between 60 dB and 80 dB. For information signals below 60 dB and above 80 dB the presence of Control Signal 6 reduces the rate of decrease in gain making the change more gradual, even though the amplitude dependent gain applied by Stage 11 is the same for both responses. Signal attenuations of greater than −100 dB results in the signal gradually disappearing into thermal circuit noise for analog implementations and have not been plotted to reflect this. Digital implementations are not restricted in this way.

Once Combined Signal 11 is generated, Control Signal 6 is no longer required, and therefore, Stage 12 carries out frequency filtration on Combined Signal 11 to remove Control Signal 6. As a result, Combined Signal 12 only contains frequencies within the information signal frequency range.

Figure 21:
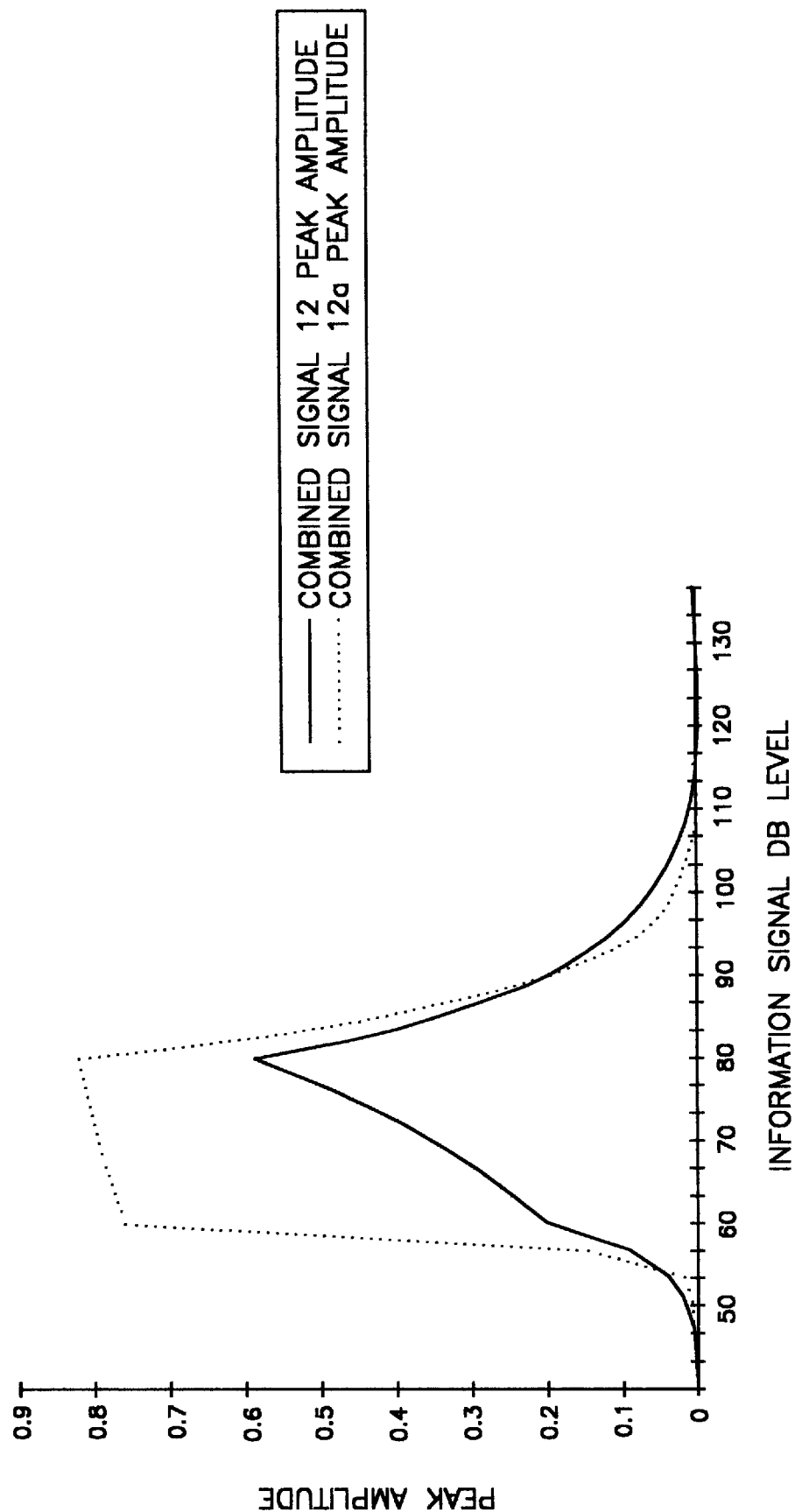
FIGS. 21 and 22 are graphs that illustrate the peak amplitudes of various signals, in accordance with one embodiment of the present invention.

FIG. 21 shows the Combined Signal 12 and Combined Signal 12a, with Control Signal 6 switched off, peak amplitude verses information signal dB level responses. The Combined Signal 12a response has a rapid change in peak amplitude when Stage 11 amplitude dependent gain changes from expansion to compression between 50 dB and 60 dB information signals and from compression to expansion for information signals between 80 dB and 90 dB. This may introduce switching noise in the processed information signal.

The presence of Control Signal 6 allows such complex amplitude dependent gain to be used by smoothing out the changes in gain from expansion to compression as shown in the Combined Signal 12 peak amplitude response. Stage 11 applies an 8th order compression to both combined signals. However, the presence of Control Signal 6 changes the amplitude dependent gain experienced by the Input Signal 8 component of the Combined Signal from compression to expansion with the rate of change in gain being controlled by Control Signal 6. Control signal 6 is used in a similar way to change expansion into compression by reducing the Combined Signal amplitude as the Input Signal 8 amplitude increases, while the rate of change in gain is also being controlled by Control Signal 6 in this case.

Figure 22:
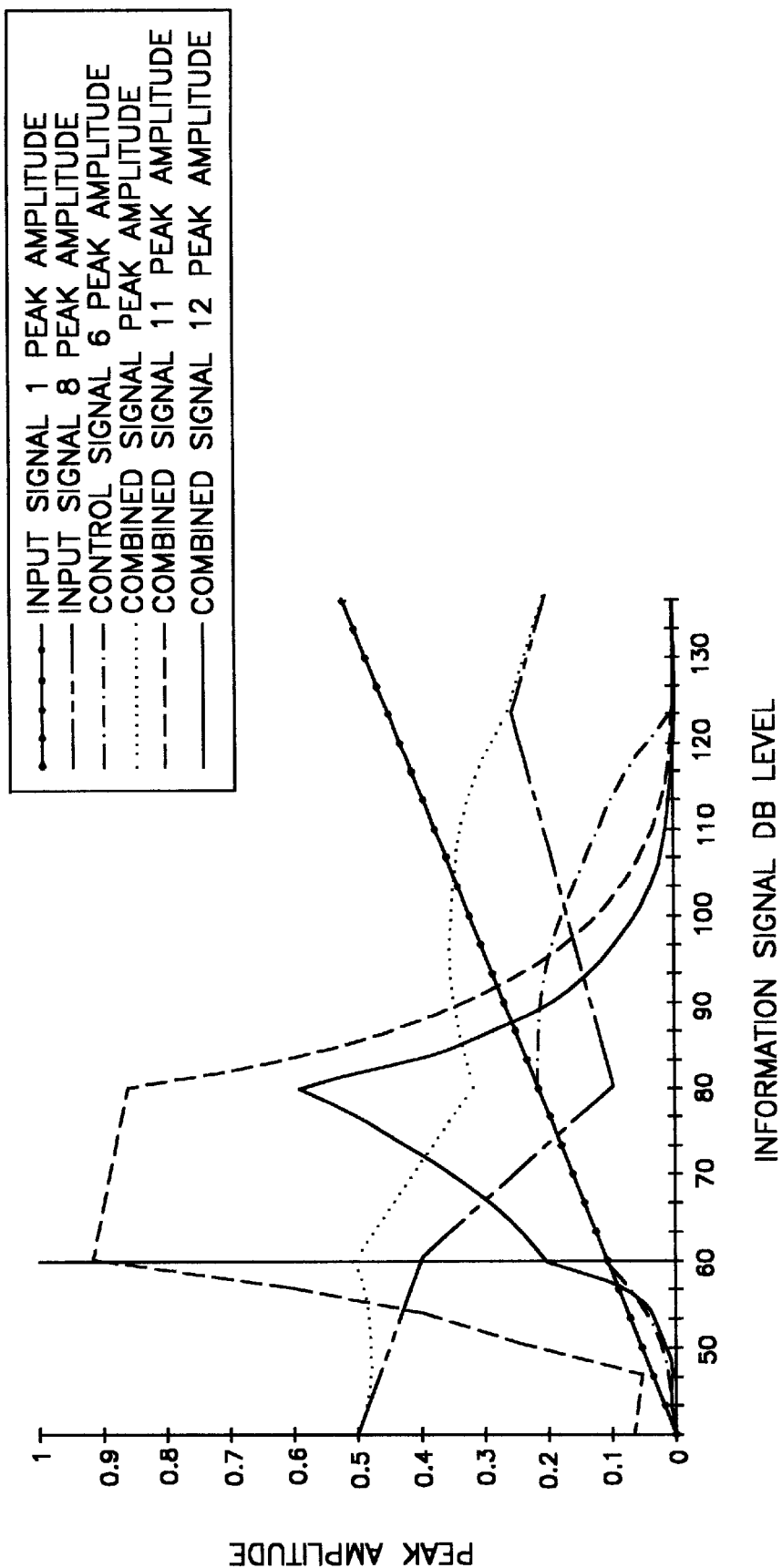

FIG. 22 shows the peak amplitudes of output signals from Stages 1, 6, 8, 9, 11 and 12 verses information signal dB level.

Figure 23:
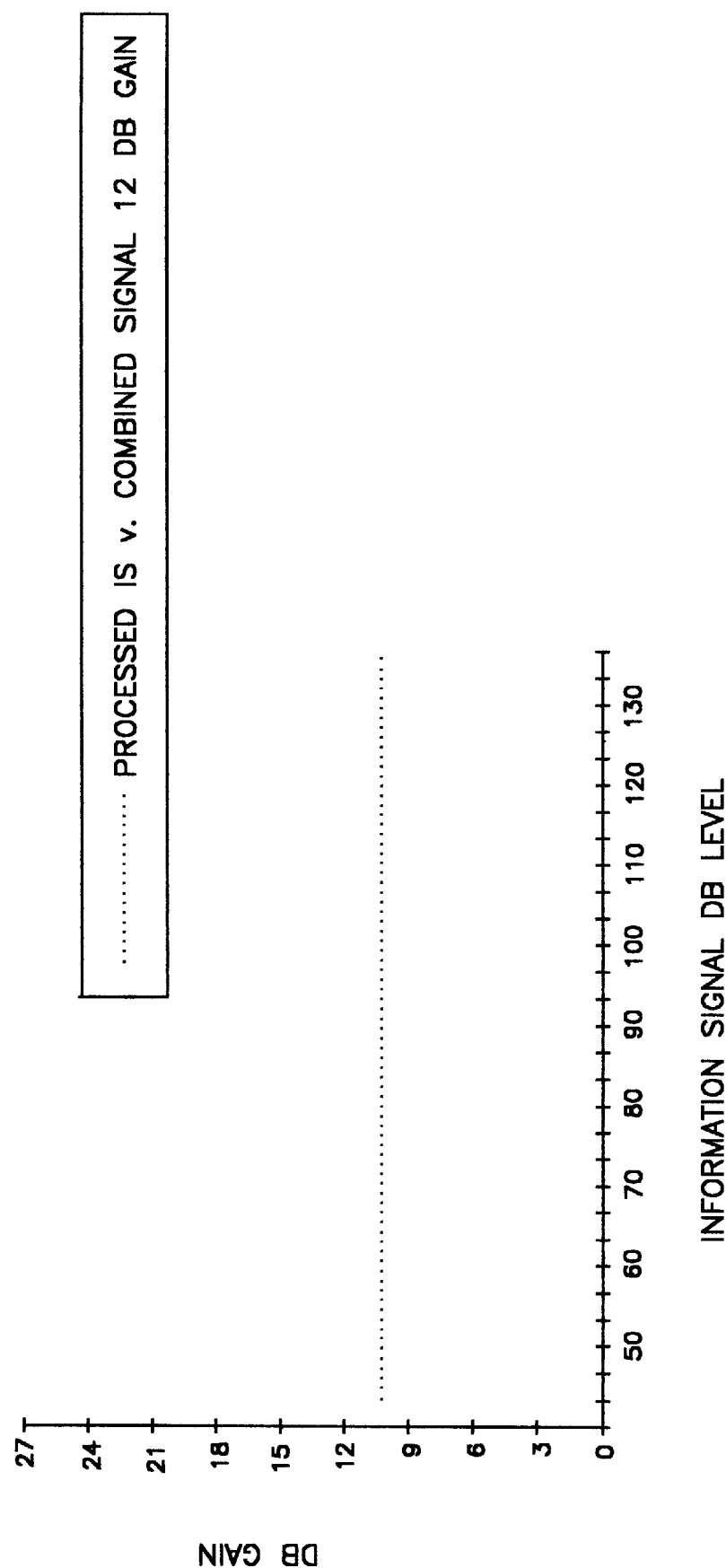
FIG. 23 is a graph that illustrates linear gain when applied to the Combined Signal 12, in accordance with one embodiment of the present invention.
Figure 24:
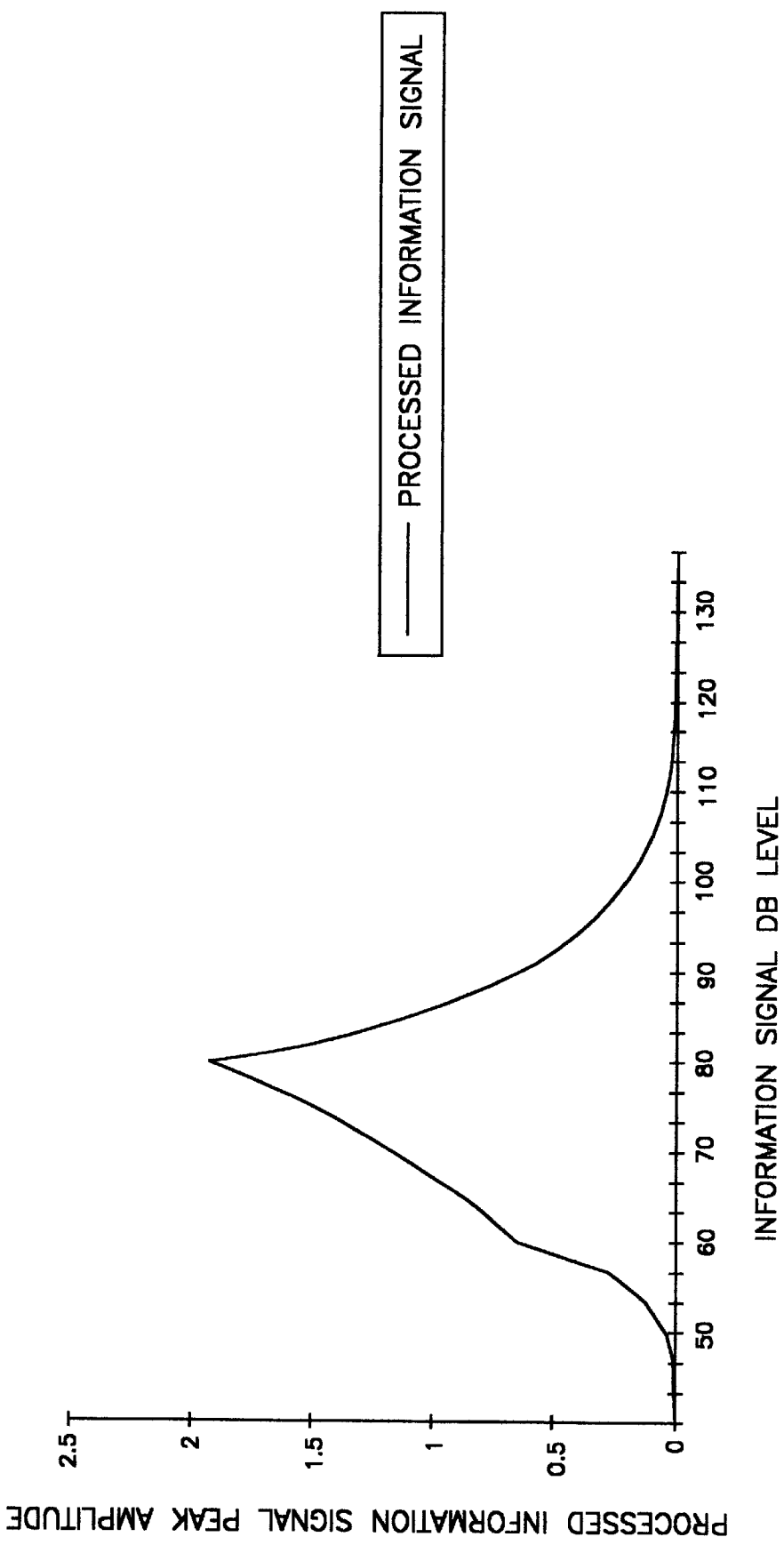
FIG. 24 is a graph that illustrates peak amplitudes of the processed information signal, in accordance with one embodiment of the present invention.
Figure 25:
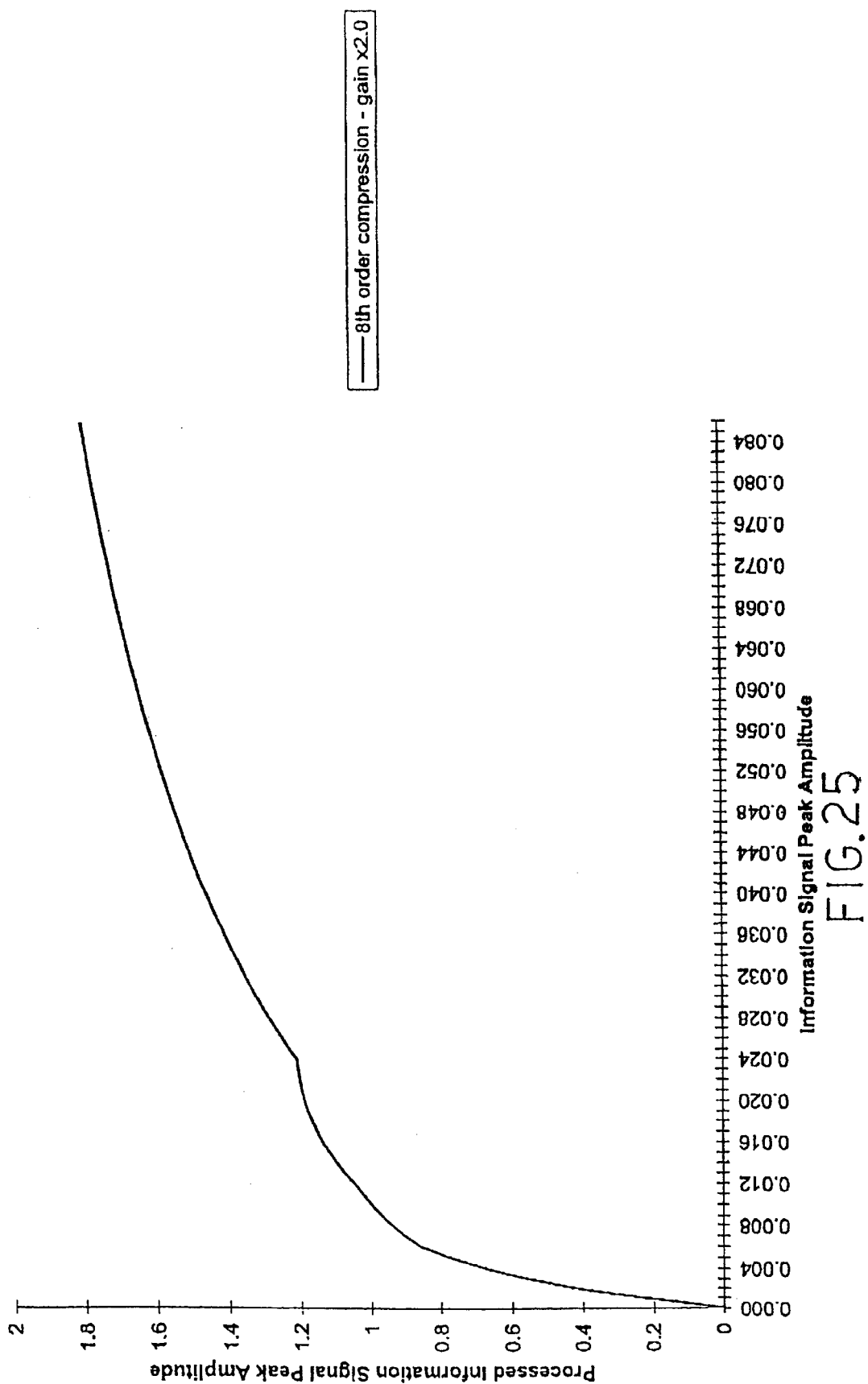
FIGS. 25–32 are graphs that illustrate peak amplitudes, signal dB levels, etc. when the system substantially matches the human speech information signal amplitude range from the audio microphone transducer to the optimum amplitude range of a computer receiving a human speech information signal, in accordance with various embodiments of the present invention.

Linear gain is applied by Stage 13 to Combined Signal 12, as shown in FIG. 23, 20 to produce the required processed information signal shown in FIG. 24, which is the same response as shown in FIG. 12.

The present invention, implemented in analog or digital form can thus be used to generate any required processed information signal peak amplitude verses information signal dB level response without introducing switching noise into the processed information signal even if complex amplitude dependent gain of high order compression and expansion is used. Control Signal 6 can change the amplitude dependent gain experienced by the information signal from compression to expansion controlling the rate of change of gain and the maximum and minimum gain levels independent of the action of Stage 11 which can apply a combination of unity gain, by raising the Combined Signal amplitude to the power one, or to other powers for a required compression and expansion of any order required.

Although the above is a general example to illustrate the detailed overall action of Stages 1 to 13, it is appreciated that the principles of the present invention can be employed, for example, in a system with a microphone transducer of suitable sensitivity to provide an information signal with the same peak amplitude and dB levels shown in FIGS. 11 and 12 respectively. Thus, the settings shown in this example could represent normal human speech dB levels at a distance of 18 inches (450 mm or one arms length approximately) from the microphone. A typical example may be a human speech to computer desk top or monitor integrated microphone application.

Specific embodiments of the invention will now be described by way of example with reference to the accompanying system block diagram of FIG. 1(a).

EXAMPLE 1

A system to match the dynamic range of human speech information signals from an audio microphone transducer to the optimum dynamic range of a computer receiving the human speech information signal, i.e. Human Speech to Text application.

The human speech information signal from an audio microphone transducer, of any directionality or sensitivity, could be in analog or digital form. The system, therefore, would be implemented in analog or digital form as appropriate. Referring to FIG. 1(a), assuming a microphone transducer with a sensitivity of −67 dB (0 dB=1 V/ibar, 1 kHz ) is used to produce the information signal, Stage 1 is set to give a static gain of ×18.2. This sets the upper limit of the Input Signal 1 amplitude to be correct for the action of Stage 11. If the microphone transducer signal were amplified before entering Stage 1 the linear gain setting would be reduced accordingly, e.g. ×10 amplification would require a linear gain setting of ×1.82. Similarly if the microphone transducer had a different sensitivity the linear gain would be altered to compensate.

Stage 2 carries out at least 40 dB/decade band pass filtration on Input Signal 1 with the upper and lower break points of 10,000 Hz and 100 Hz for an analog implementation. For digital implementation Stage 2 carries out band pass filtration on Input Signal 1 with the upper and lower break points of 10,000 Hz and 100 Hz with an attenuation of at least 40 dB at 14,000 Hz and 15 Hz. The action of Stage 2 removes any signals outside the information signal frequency range.

Stage 3 generates a Control Signal which is a sine wave tone of a single frequency of 60 kHz for analog implementation and 14.7 kHz for digital implementation with a sampling rate of 44.1 kHz or one third the sampling rate for higher sampling rates. Remember that the Control Signal must only contain frequencies above the upper limit of the information signal frequency range.

Stage 4 is configured to set the Control Signal 4 amplitude to 0.1.

Stage 5 is configured to instruct Stage 6 to adjust the Control Signal 6 amplitude from 0.1 to 0.15 between Input Signal 2 levels of 0.209 and 0.368, corresponding to 70 dB and 80 dB information signal levels respectively. This amplitude change must occur with a 40 ms attack time, a minimum sustain of two seconds for a three second continuous Input Signal 2 level of at least 0.452, 90 dB information signal level, and a 120 ms decay time.

Stage 7 is configured to instruct Stage 8 to adjust the Input Signal 42 gain from 1.0 to 0.7 between Input Signal 2 levels of 0.368 and 0.452, corresponding to 80 dB and 90 dBI information signal levels respectively. This gain change must occur with a 40 ms attack time, a minimum sustain of two seconds for a three second continuous Input Signal 2 level of at least 0.452, 90 dB information signal level, and a 120 ms decay time.

Stage 9 adds the amplitudes of Input Signal 8 and Control Signal 6 in the ratio of 1:1 to produce the Combined Signal.

Stage 10 is configured to instruct Stage 11 to carry out 8th order compression, raise the amplitude to the power ⅛, on the Combined Signal. This is done because 8th order compression ensures that the processed information signal dynamic range is sufficiently large to avoid distortion over the whole information signal dynamic range and sufficiently small to protect the receptor from large information signal amplitudes.

Stage 12 carries out at least 40 dB/decade low pass filtration on Combined Signal 11 with a break point of 10,000 Hz for an analog implementation. If digital implementation is required Stage 12 carries out low pass filtration on Combined Signal 11 with a break point of 10,000 Hz and an attenuation of at least 40 dB at 14,000 Hz. The action of Stage 12 removes any signals of a frequency above the information signal frequency range, i.e. it removes the Control Signal 6 frequency component from Combined Signal 12.

Stage 13 sets a gain ×2.0 to produce a line level, maximum peak amplitude of approximately 2.0, processed information signal or ×0.1 to produce a microphone level, maximum peak amplitude of approximately 0.1, processed information signal. It is recommended that a line level processed information signal is used to maximize the clarity of the processed information signal.

Thus in the accordance with one embodiment of the present invention, system 100, substantially matches the human speech information signal amplitude range from the audio microphone transducer to the optimum amplitude range of a computer receiving a human speech information signal.

The processing carried out in this example is illustrated by FIGS. 25 to 32. For the line level gain setting the information signal peak amplitude v. processed information signal peak amplitude, information signal dB level v. processed information signal peak amplitude, information signal peak amplitude v. processed information signal/information signal dB gain and the information signal dB level v. processed information signal/information signal dB gain responses are illustrated by FIGS. 25, 26, 27 and 28 respectively. For the microphone level gain setting the information signal peak amplitude v. processed information signal peak amplitude, information signal dB level v. processed information signal peak amplitude, information signal peak amplitude v. processed information signal 1 information signal dB gain and the information signal dB level v. processed information signal/information signal dB gain responses are illustrated by FIGS. 29, 30, 31 and 32 respectively.

Figure 26:
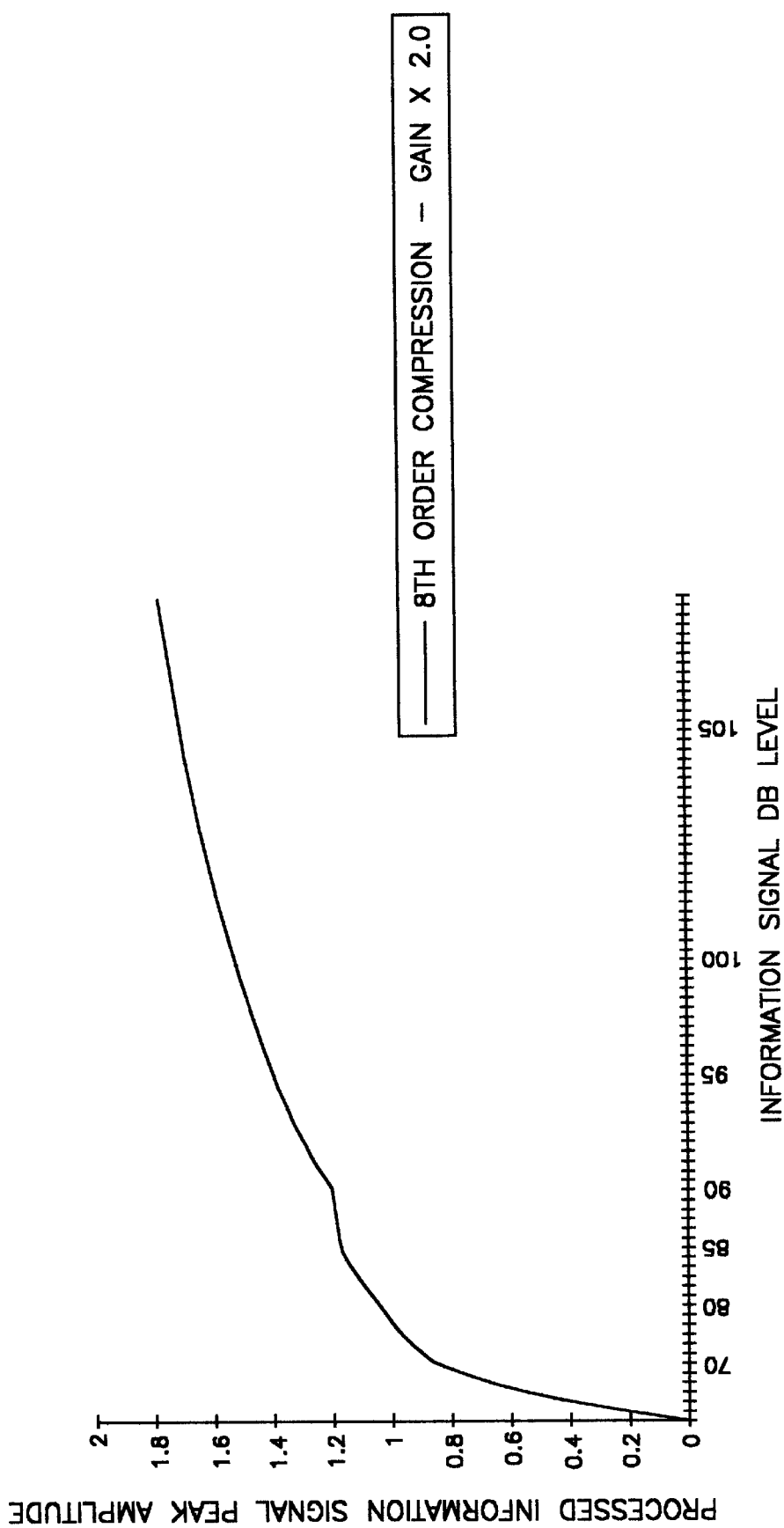
Figure 27:
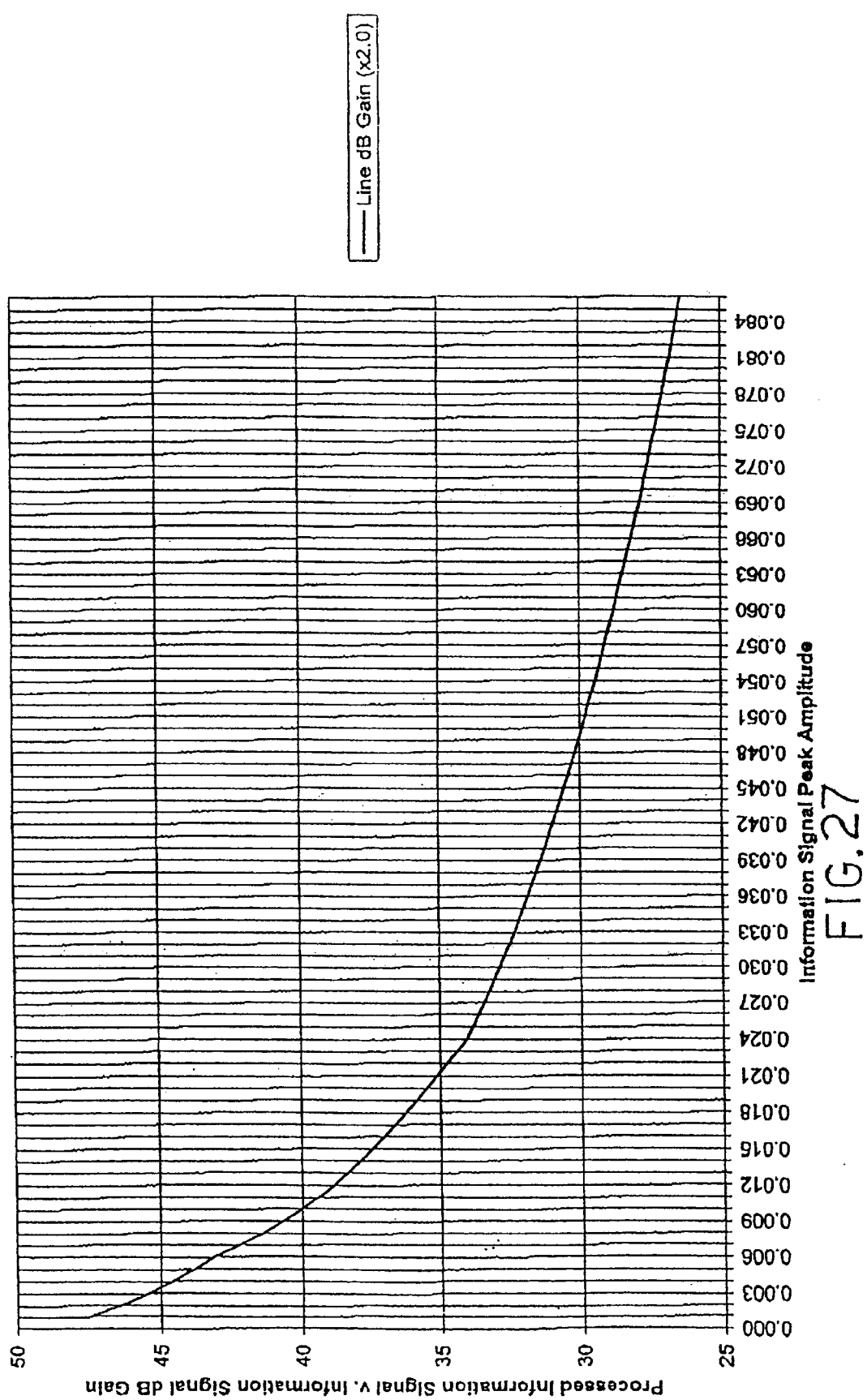

Referring to FIG. 26, processed information signal peak amplitudes are controlled below 2.0, matched for 5 Volt analog to digital conversion or 5 Volt digital to analog conversion, for all information signal dB levels.

Figure 28:
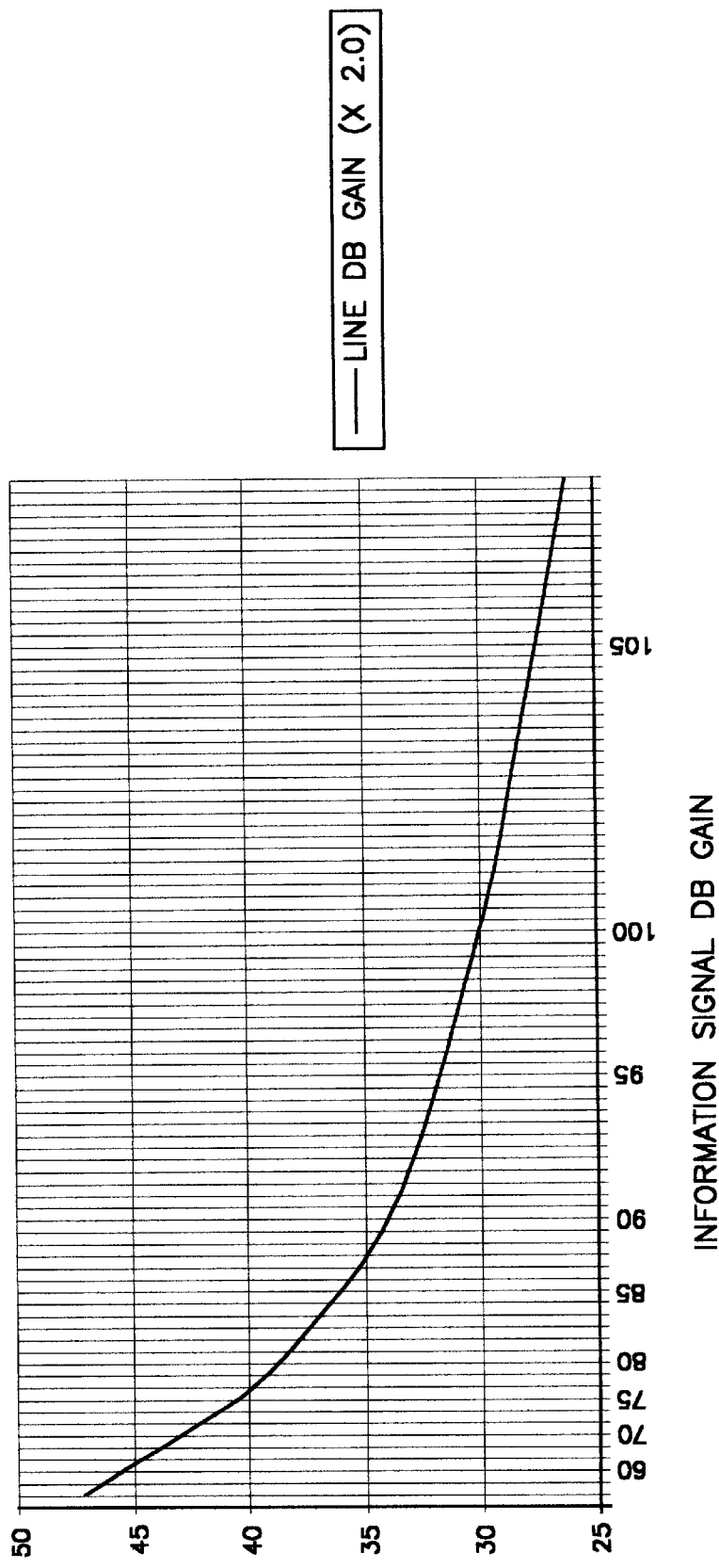
Figure 29:
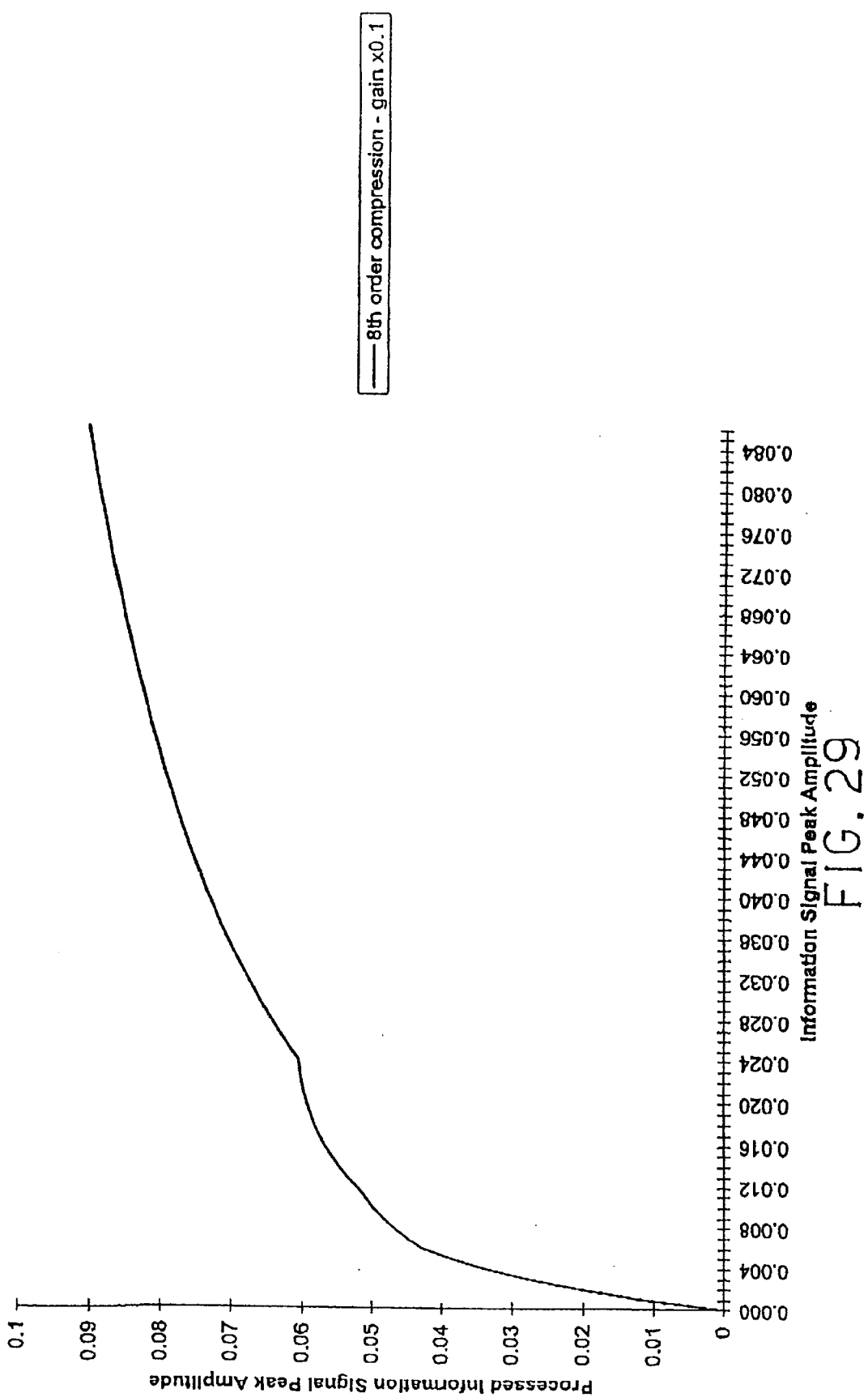
Figure 30:
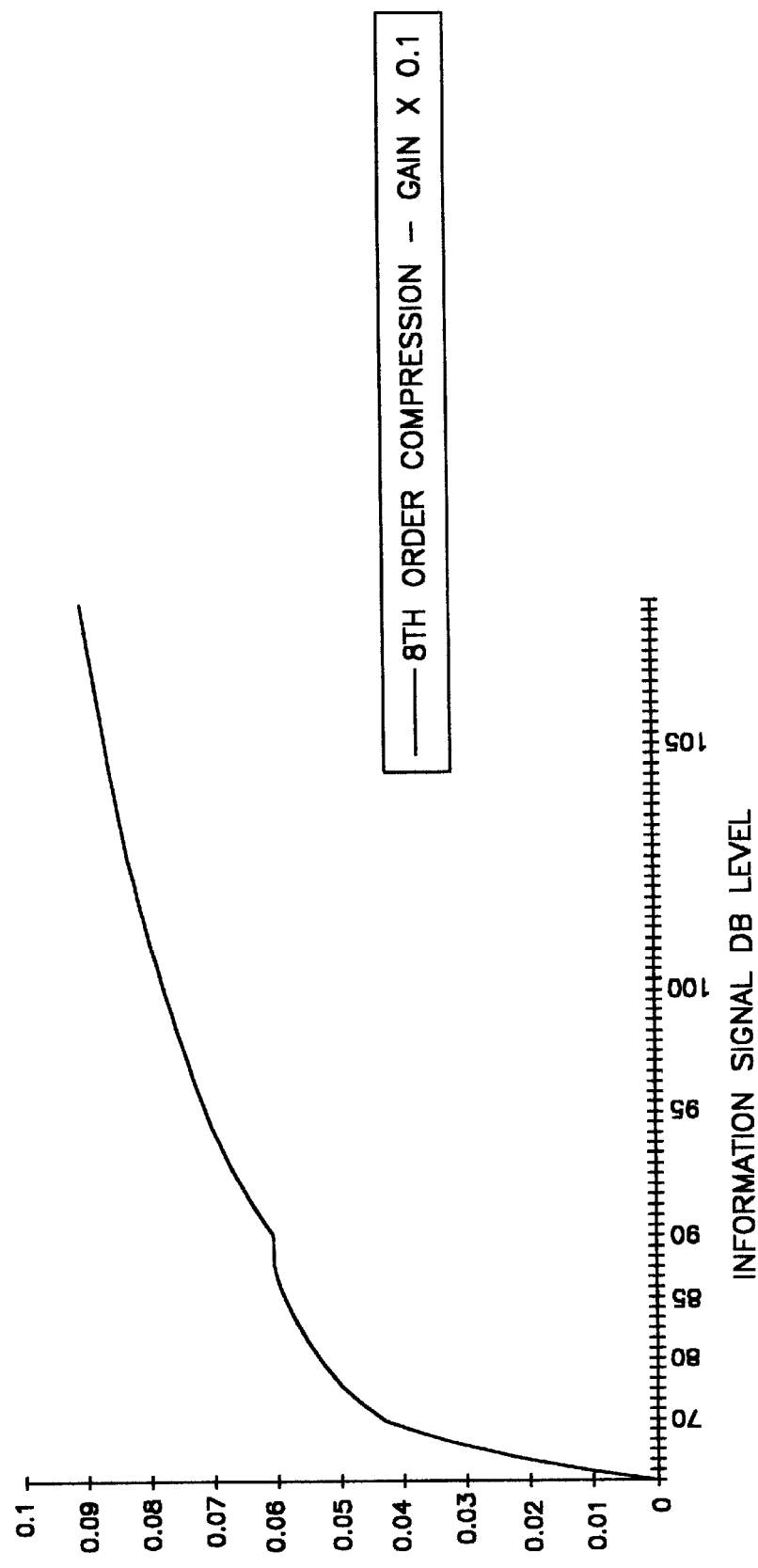
Figure 31:
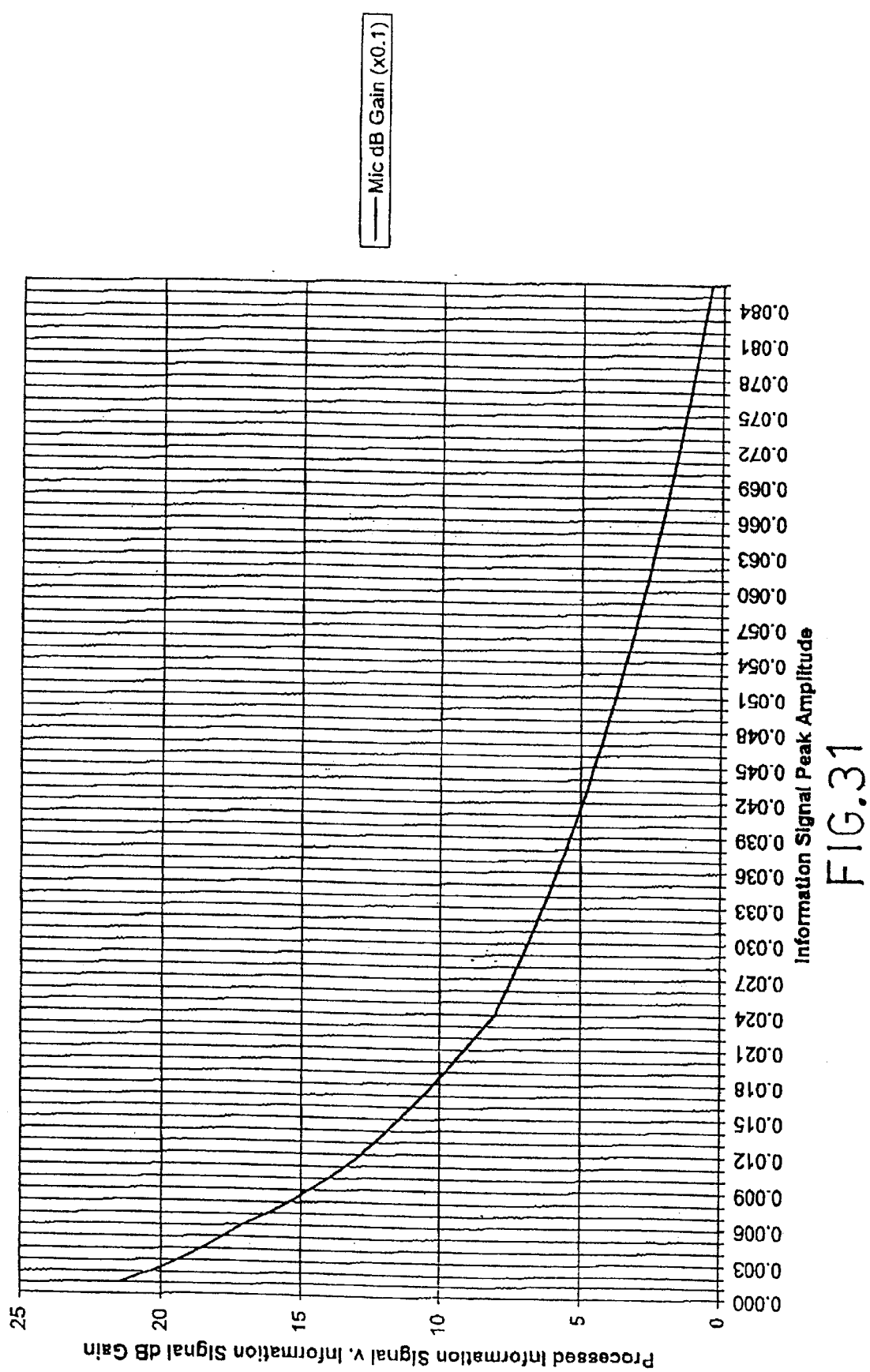
Figure 32:
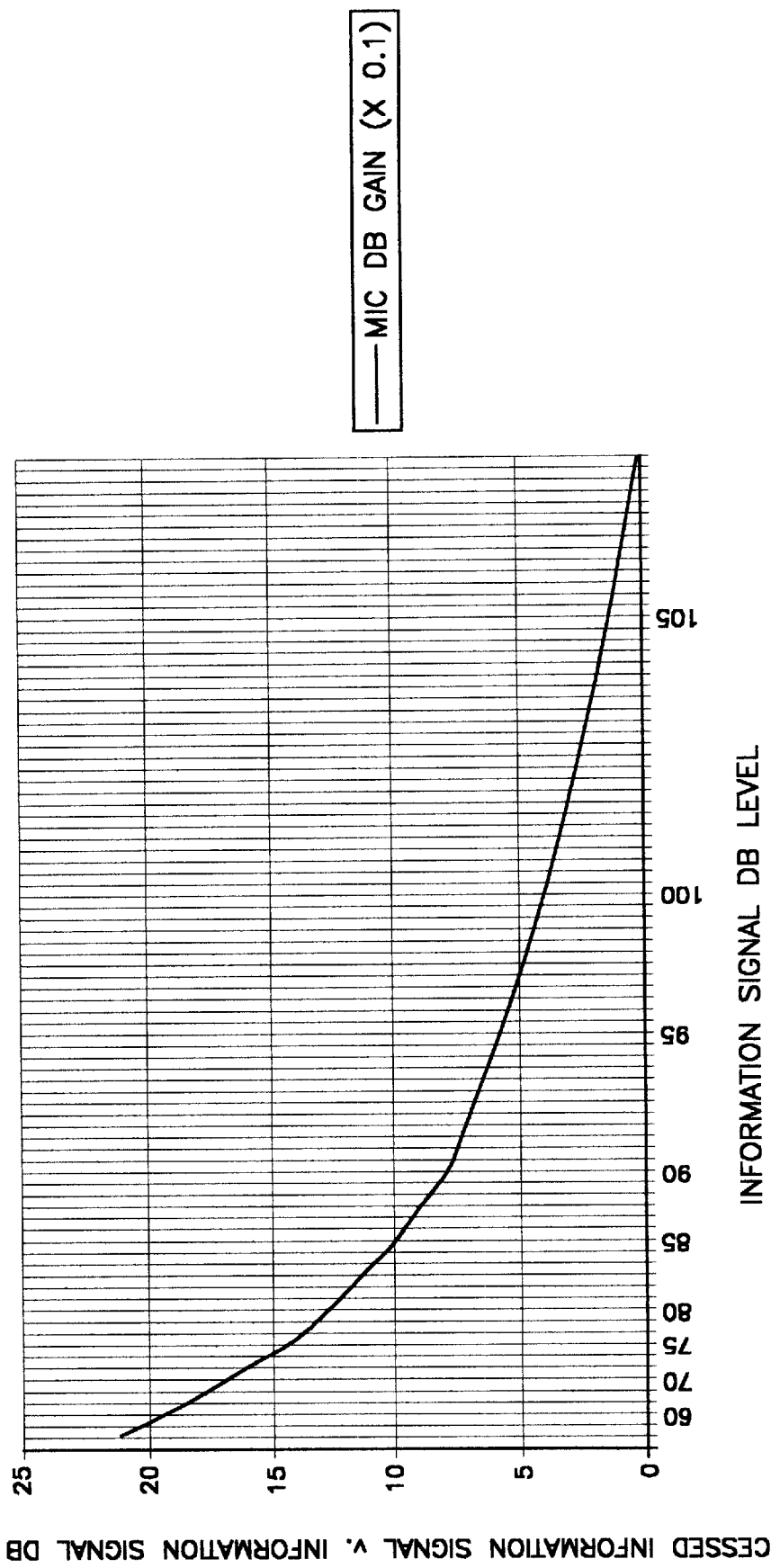

The above stage variable settings compensate for a moving sound source over a listening zone distance of approximately four meters. Referring to FIG. 28 information signal dB levels below 90 dB are given an increased gain relative to information signal dB levels above 90 dB. The lower the information signal dB level below 90 dB the higher the gain so as a sound source moves away from an omnidirectional microphone transducer the system compensates for the resultant drop in information signal dB level. For this example the human speech information signal amplitude range between 60 dB and 90 dB, a 30 dB amplitude range, has been reduced to the 11.4 dB processed information signal amplitude range shown in FIG. 28.

However, the stage variable settings can be fine tuned to select any listening zone distance over which the system will compensate, e.g. one meter from a unidirectional microphone transducer for desktop use or three inches from a noise canceling highly directional microphone transducer for use in very high noise environments such as aircraft cockpits.

EXAMPLE 2

A system to match the dynamic range of audio speech information signals from a computer to the optimum dynamic range of a human receiving the computer speech information signal, i.e. Text to Speech application.

The speech information signal from a computer could be in analog or digital form. The system, therefore, would be implemented in analog or digital form as appropriate.

Referring to FIG. 1(*a*), assuming the computer produces a line level speech information signal, Stage 1 is set to provide a static gain of ×1.0. This sets the upper limit of the Input Signal 1 amplitude to be correct for the action of Stage 11. If the computer produces a microphone level speech information signal, Stage 1 could be set to give a static gain of ×18.2.

Stage 2 carries out at least 40 dB/decade band pass filtration on Input Signal 1 with the upper and lower break points of 10,000 Hz and 100 Hz for an analog implementation. For digital implementation Stage 2 carries out band pass filtration on Input Signal 1 with the upper and lower break points of 10,000 Hz and 100 Hz with an attenuation of at least 40 dB at 14,000 Hz and 15 Hz. The action of Stage 2 removes any signals outside the information signal frequency range.

Stage 3 generates a Control Signal which is a sine wave tone of a single frequency of 60 kHz for analog implementation and 14.7 kHz for digital implementation with a sampling rate of 44.1 kHz or one third the sampling rate for higher sampling rates. The Control Signal preferably contains frequencies above the upper limit of the information signal frequency range.

Stage 4 is configured to set the Control Signal 4 amplitude to 0.2.

Stage 5 is configured to instruct Stage 6 to adjust the Control Signal 6 amplitude from 0.2 to 0.3 between Input Signal 2 levels of 0.209 and 0.368, corresponding to 70 dB and 80 dB information signal levels respectively. This amplitude change must occur with a 40 ms attack time, a minimum sustain of two seconds for a three second continuous Input Signal 2 level of at least 0.452, 90 dB information signal level, and a 120 ms decay time.

Stage 7 is configured to instruct Stage 8 to adjust the Input Signal 2 gain from 1.0 to 0.7 between Input Signal 2 levels of 0.368 and 0.452, corresponding to 80 dB and 90 dB information signal levels respectively. This gain change preferably occurs with a 40 ms attack time, preferably a minimum sustain of two seconds for a three second continuous Input Signal 2 level of at least 0.452, 90 dB information signal level, and a 120 ms decay time.

Stage 9 adds the amplitudes of Input Signal 8 and Control Signal 6 in the ratio of 1:1 to produce the Combined Signal.

Stage 10 instructs Stage 11 to carry out 8th order compression, raise the amplitude to the power $\frac{1}{8}$, on the Combined Signal. This is done because 8th order compression ensures that the processed information signal amplitude range is sufficiently large to avoid distortion over the whole information signal amplitude range and sufficiently small to protect the receptor from large information signal amplitudes.

Stage 12 carries out at least 40 dB/decade low pass filtration on Combined Signal 11 with a break point of 10,000 Hz for an analog implementation. If digital implementation is required Stage 12 carries out low pass filtration on Combined Signal 11 with a break point of 10,000 Hz and an attenuation of at least 40 dB at 14,000 Hz. The action of Stage 12 removes any signals of a frequency above the information signal frequency range, i.e. it removes the Control Signal 6 frequency component from Combined Signal 12.

Stage 13 sets a gain ×2.0 to produce a line level processed information signal.

Thus in accordance with the present invention dynamic range matching system 100 matches the speech information signal amplitude range from a computer to the optimum amplitude range of a human ear receiving the speech information signal.

Figure 33:
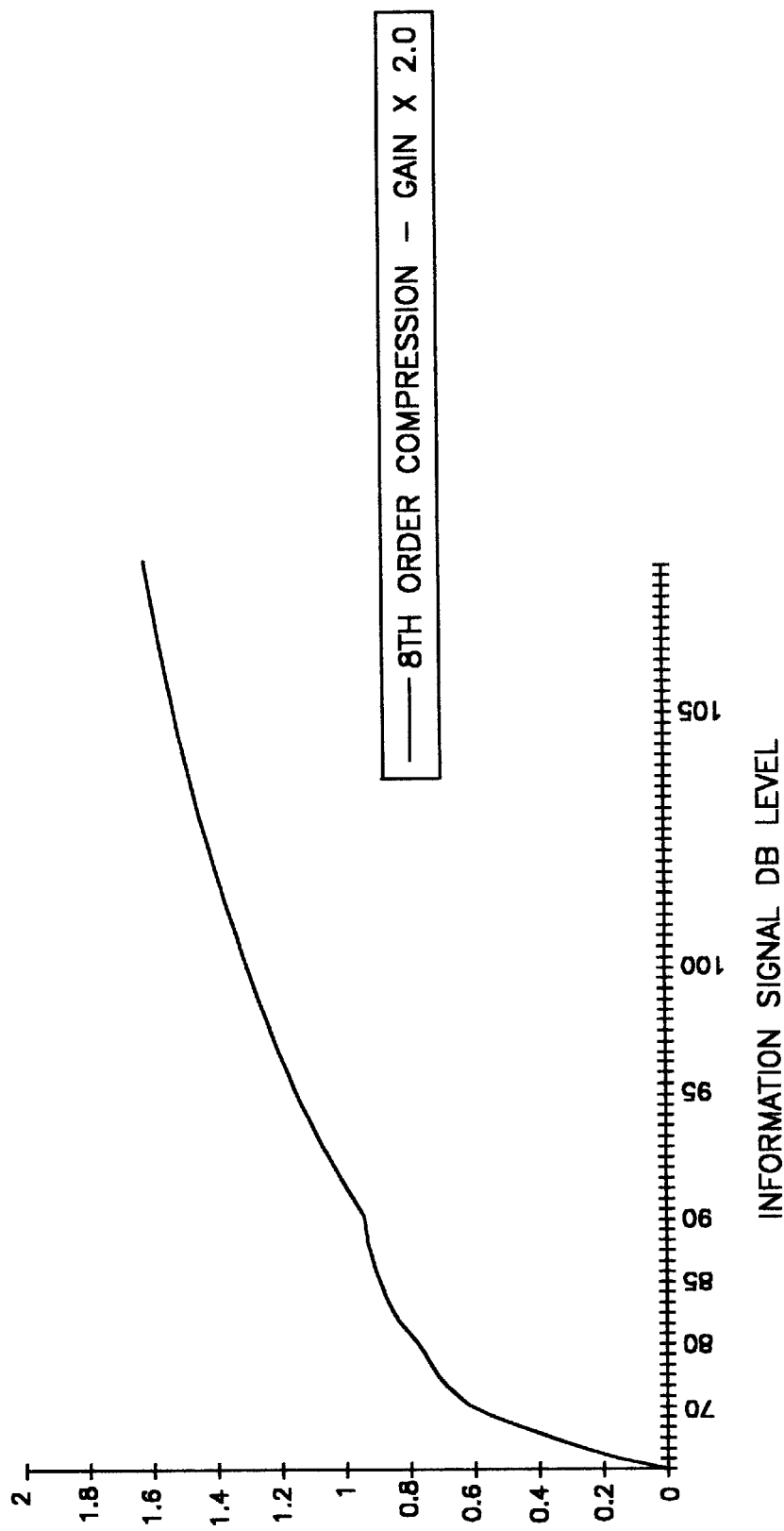
FIG. 33 is a graph that illustrates processed information signal peak amplitudes, in accordance with one embodiment of the present invention.
Figure 34:
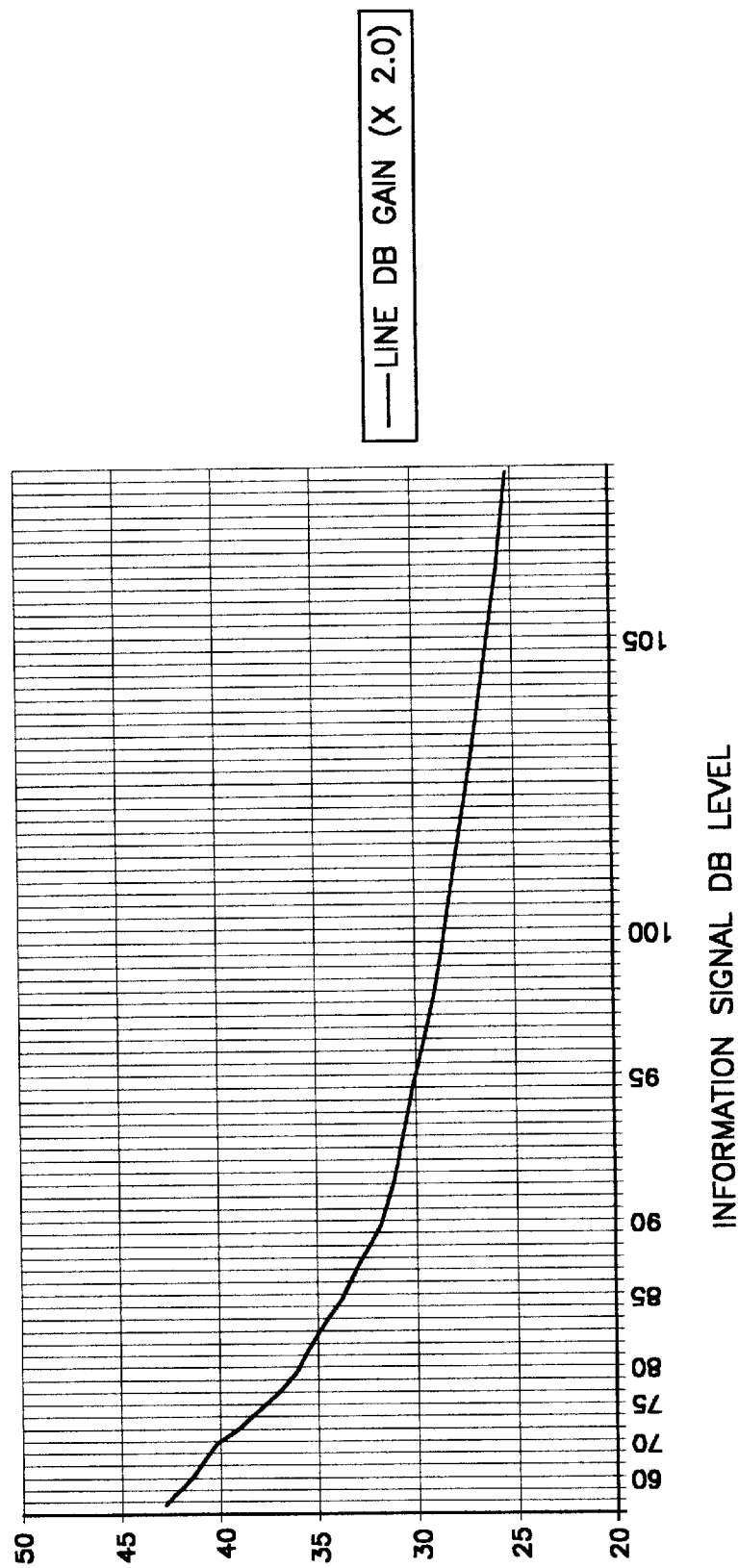
FIG. 34 is a graph that illustrates processed and information signal dB gain, in accordance with one embodiment of the present invention.

The processing carried out in this example is illustrated by FIG. 33, which shows information signal dB level v. processed information signal peak amplitude, and FIG. 34, which shows information signal dB level v. processed information signal/information signal dB gain.

Referring to FIG. 33, processed information signal peak amplitudes are controlled below 2.0, matched for a line level signal which can drive an appropriate amplification and speaker system. The present invention automatically compensates to avoid distortion over the whole information signal amplitude range and to ensure that the clarity of the speech from the computer is maintained even when used in high noise environments such as car, aircraft, PA, or public information system use. The gain on low level information signal amplitudes has been reduced relative to Example 1 to avoid circuit noise being excessively amplified and, therefore having a sufficiently large amplitude in the processed information signal to be detected by the human ear.

For this example the computer speech information signal amplitude range between 60 dB and 90 dB, a 30 dB dynamic range, has been reduced to the 9.7 dB processed information signal amplitude range shown in FIG. 34.

EXAMPLE 3

A system to match the dynamic range of information signals from audio equipment, such as multi media, telephony, T.V, hi-fi, PA, information point etc., to the optimum dynamic range of a receptor of the audio information signal where the receptor may be human, computer or other audio equipment, i.e. audio equipment application.

The information signal from audio equipment could be in analog or digital form. he system, therefore would be implemented in analog or digital form as appropriate. This information signal will be unpredictable especially in multi channel equipment or equipment which has a microphone input.

Referring to FIG. 1(*a*), the variable stage settings for Example 3 are the same as those of Example 2 except for Stage 2 and Stage 12. Assuming that an analog implementation allows for a 20 kHz information signal frequency range to include music etc. and that the sampling rate of a digital implementation is 44.1 kHz. Stage 2 carries out at least 40 dB/decade band pass filtration on Input Signal 1 with the upper and lower break points of 20,000 Hz and 100 Hz for an analog implementation. For digital implementation Stage 2 carries out band pass filtration on Input Signal 1 with the upper and lower break points of 10,000 Hz and 100 Hz with an attenuation of at least 40 dB at 14,000 Hz and 15 Hz. The action of Stage 2 removes any signals outside the information signal frequency range.

Stage 12 carries out at least 40 dB/decade low pass filtration on Combined Signal 11 with a break point of 20,000 Hz for an analog implementation. If digital implementation is required Stage 12 carries out low pass filtration on Combined Signal 11 with a break point of 10,000 Hz and an attenuation of at least 40 dB at 14,000 Hz. The action of Stage 12 removes any signals of a frequency above the information signal frequency range, i.e. it removes the Control Signal 6 frequency component from Combined Signal 12.

Thus the present invention has matched the information signal amplitude range from audio equipment to the optimum amplitude range of the receptor of the audio information signal.

The processing carried out in this example can also be illustrated by FIG. 33, information signal dB level v. processed information signal peak amplitude, and FIG. 34, information signal dB level v. processed information signal/ information signal dB gain.

Referring to FIG. 33, processed information signal peak amplitudes are controlled below 2.0, which protects the receptor from damage or pain due to excessively loud audio information signal amplitudes, matched for a line level processed information signal which can drive appropriate amplification or speaker systems. The present invention automatically compensates to avoid distortion over the whole information signal amplitude range and ensures that the clarity of the audio signal from the equipment is maintained even when the equipment is multi channel or has a microphone for use in real world high noise environments. The automatic compensation in this example greatly reduces the need for volume control adjustments increasing the amplitude of low level information signals and decreasing the amplitude of high level information signals. The processed information signal can thus be placed at a level where its lowest amplitude is above the level of any other ambient sound in the environment where the receptor is receiving the processed information signal to maximize the clarity of reception while the highest processed information signal amplitude is automatically controlled to avoid the receptor being subjected to distortion or damage. The information signal frequency component with the highest amplitude is emphasized in this example with the amplitude of all other information signal frequency components being relatively reduced. This ensures clarity of reception of the highest amplitude information signal frequency component even when there are many other information signal frequency components e.g. the loudest sound source in a noisy environment. Although this example deals with audio frequency information signals the properties of the present invention in this or any of the examples can be applied to information signals of any frequency range.

EXAMPLE 4

A system to match the amplitude range of computer speech information signals from a microphone transducer to the optimum amplitude range of a computer receiving the computer speech information signal, i.e. Computer to Computer Speech application.

The computer speech information signal from a microphone transducer, of any directionality or sensitivity, could be in analog or digital form. The system, therefore, would be implemented in analog or digital form as appropriate.

In this example the computer speaks to another computer. The information signal frequency range of the computer speech in this example can, therefore, be chosen to be audio, 100 Hz to 20,000 Hz, or above the frequency range of human or animal hearing, e.g. 100,000 Hz to 110,000 Hz which covers most if not all animals. Care must be taken, however, that the frequency range chosen does not cause interference with electronic equipment transmitting or receiving on the chosen frequency range. The frequency range of computer speech could be variable to avoid this problem where high level interference amplitudes are controlled by the action of the present invention to prevent damage being caused to the computer receptor.

Referring to FIG. 1(a), the variable stage settings for Example 4 are the same as those of Example 1 except for Stage 2, Stage 3 and Stage 12. Assuming that the computer speech is in the range 100,000 Hz to 110,000 Hz and that the sampling rate of a digital implementation is 441 kHz.

Stage 2 carries out at least 40 dB/decade band pass filtration on Input Signal 1 with the upper and lower break points of 110,000 Hz and 100,00 Hz for an analog implementation. For digital implementation Stage 2 carries out band pass filtration on Input Signal 1 with the upper and lower break points of 110,000 Hz and 100,000 Hz with an attenuation of at least 40 dB at 140,000 Hz and 80,000 Hz. The action of Stage 2 removes any signals outside the information signal frequency range.

Stage 3 generates a Control Signal which is a sine wave tone of a single frequency of 330 kHz for analog implementation and 147 kHz for digital implementation with a sampling rate of 441 kHz or one third the sampling rate for higher sampling rates. The Control Signal preferably contains frequencies above the upper limit of the information signal frequency range.

Stage 12 carries out at least 40 dB/decade low pass filtration on Combined Signal 11 with a break point of 110,000 Hz for an analog implementation. If digital implementation is required Stage 12 carries out low pass filtration on Combined Signal 11 with a break point of 110,000 Hz and an attenuation of at least 40 dB at 140,000 Hz. The action of Stage 12 removes any signals of a frequency above the information signal frequency range, i.e. it removes the Control Signal 6 frequency component from Combined Signal 12.

Thus the present invention has matched the computer speech information signal amplitude range from the microphone transducer to the optimum amplitude range of a computer receiving the computer speech information signal.

The processing carried out in this example can also be illustrated by FIG. 33 information signal dB level v. processed information signal peak amplitude, and FIG. 34, information signal dB level v. processed information signal 1 information signal dB gain.

The present invention in this example may be used for use with portable computer systems, robotics or toys etc. so that computers can communicate with each other at a frequency range which does not affect humans or animals and does not require that the computers are connected via cables, infra red links, microphone arrays, or high cost radio microphones. As the present invention compensates for a moving sound source within a listening zone in this example the computers can move relative to each other within the listening zone without causing a loss of information. This listening zone can be larger than the human listening zone of approximately four meters in Example 1, however, to avoid the need for the generation of very high amplitude computer speech a listening zone of approximately four meters should be used. The present invention may be used to process the speech to be generated by a computer or to process the computer speech received by a computer. As the information signal could be any frequency range the present invention could also be used to process the amplitudes of information signals at the frequency of light or at low frequency carrying information from tactile or motion sensors etc.

EXAMPLE 5

A system to match the dynamic range between 60 dB and 90 dB sound pressure level of human speech to the optimum dynamic range of a receptor of this information signal.

The information could be in an analog or a digital form. The system could be implemented in analog or digital form as appropriate.

Figure 35:
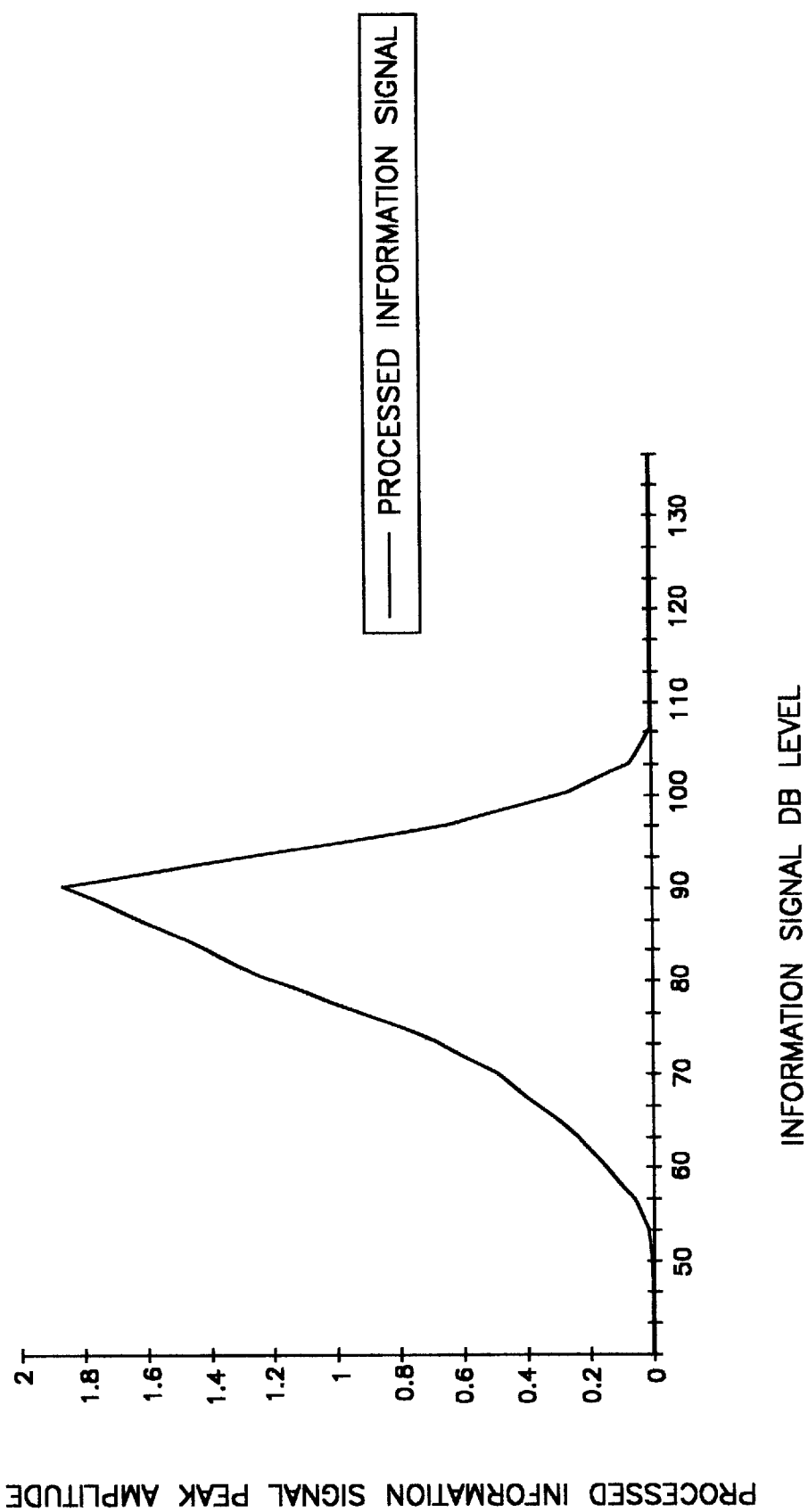
FIG. 35 is a graph that illustrates processed information signal peak amplitude and information signal dB levels, in accordance with one embodiment of the present invention.

The required processed information signal peak amplitude verses information signal dB level is as shown in FIG. 35.

The settings of stages 1, 2, 3, 9 and 12 were the same as for Example 1.

Figure 36:
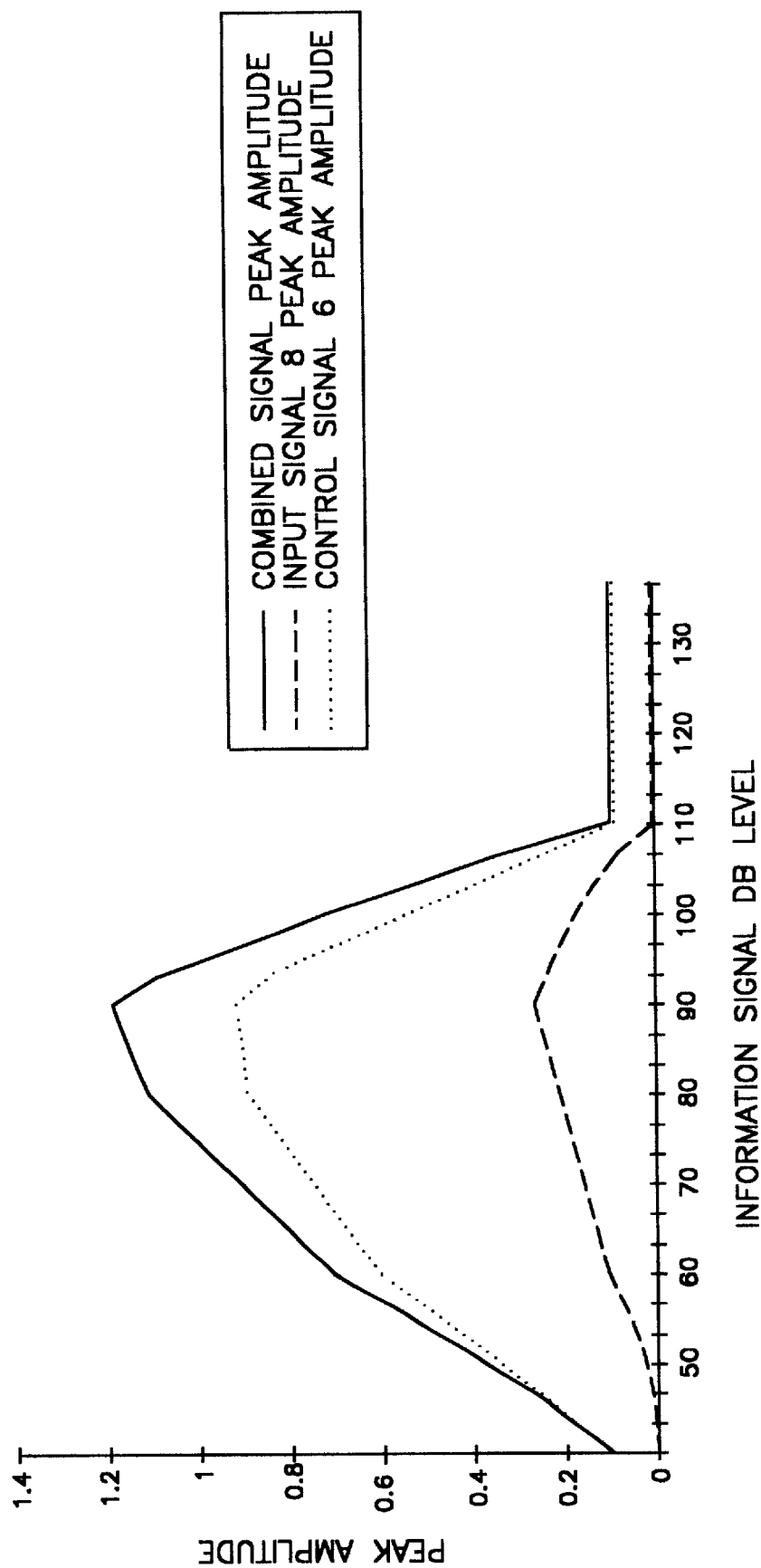
FIG. 36 is a graph that illustrates peak amplitudes and information signal dB level responses, in accordance with one embodiment of the present invention.

Stages 4, 5 and 6 are configured to generate the Control Signal 6 peak amplitude verses information signal dB level response illustrated in FIG. 36.

Stages 7 and 8 are configured to generate the Input Signal 8 verses information signal dB level response illustrated in FIG. 36. As Stage 9 is set to add the amplitudes of Input Signal 8 and Control Signal 6 in the ratio 1:1 the Combined Signal peak amplitude verses information signal dB level response is as illustrated in FIG. 36.

Stage 11 is configured to provide 4th order expansion with Stage 10 instructing Stage 11 not to change this amplitude dependent gain.

Stage 13 is set to give a line level processed information signal by applying a ×4.0 linear gain with the resultant processed information signal verses information signal dB level response as required shown in FIG. 35.

Thus information signals below 50 dB and above 110 dB have been amplitude filtered and information signals between 60 dB and 90 dB have been emphasized. The rate of emphasis or increase in gain is greater between 60 dB and 80 dB than between 80 dB and 90 dB due to the action of Control Signal 6 even though the amplitude dependent gain is kept at 4th order expansion for all information signal dB levels. As human speech sound pressure dB levels are between 60 dB and 90 dB they will be emphasized by the action of the system in this example with particular emphasis being placed on the quieter speech dB levels between 60 and 80 dB.

We claim:

1. A method for matching dynamic range of an information signal to dynamic range of a receptor, comprising the steps of:

monitoring said information signal;

varying gain of said information signal in response to said monitoring step so as to provide a gain adjusted information signal;

generating a variable control signal having a frequency outside frequency range of said information signal, in response to said monitoring step;

combining said control signal with said gain adjusted information signal so as to provide a combined information signal; and providing a variable amplitude dependent gain to said combined information signal wherein siad dependent gain ranging from compression to expansion is selected depending on the amplitude of said information signal so as to provide an output signal that substantially matches the dynamic range of the receptor.

2. The method in accordance with claim 1 wherein prior to said step of monitoring said information signal, the method further comprises a first filtering step for filtering out frequencies outside the frequency range of said information signal.

3. The method in accordance with claim 2 further comprising the step of providing a linear amplification to said information signal.

4. The method in accordance with claim 1, wherein said combining step further comprises the step of varying the ratio of said control signal and said gain adjusted information signal.

5. The method in accordance with claim 4, wherein said ratio is 1:1.

6. The method in accordance with claim 1 wherein said step of providing a variable amplitude dependent gain further comprises the step of subjecting said combined signal to a power of 1/n, wherein n is a positive number including a fraction, so as to provide a combination of variable compression and expansion and unity gain factors.

7. The method in accordance with claim 6, wherein after said step of providing a variable amplitude dependent gain, the method further comprises a second filtering step for filtering out all frequencies outside the frequency range of said information signal.

8. The method in accordance with claim 7, wherein after said second filtering step, the method further comprises the step of providing a linear amplification.

9. A method for matching dynamic range of an information signal to dynamic range of a receptor, comprising the steps of:

monitoring said information signal;

varying gain of said information signal in response to said monitoring step so as to provide a gain adjusted information signal; and providing a variable amplitude dependent gain to said gain adjusted information signal wherein said dependent gain ranging from compression to expansion is selected depending on the amplitude of said information signal so as to provide an output signal that substantially matches the dynamic range of the receptor.

10. The method in accordance with claim 9 further comprising the step of providing a linear amplification to said information signal.

11. The method in accordance with claim 9 wherein said step of providing a variable amplitude dependent gain further comprises the step of subjecting said gain adjusted information signal to a power of 1/n, wherein n is a positive number including a fraction, so as to provide a combination of variable compression and expansion and unity gain factors.

12. A dynamic range matching system for matching dynamic range of an information signal to dynamic range of a receptor, comprising:

an information signal monitor coupled to said information signal configured to provide instruction signals in response to amplitude of said information signal;

a gain adjustment stage coupled to said information signal monitor providing a gain adjusted information signal in response to one of said instruction signals;

a variable control signal generator that generates a signal having a frequency outside frequency range of said information signal, in response to one of said instruction signals;

a combined signal generator coupled to said variable control signal generator and said gain adjustment stage that combines said control signal with said gain adjusted information signal so as to provide a combined information signal; and a variable amplitude dependent gain stage coupled to said combined signal generator and said information signal monitor said variable amplitude dependent gain stage configured to provide a variable amplitude dependent gain to said combined information signal wherein said dependent gain ranging from compression to expansion is selected depending on the amplitude of said information signal so as to provide an output signal that substantially matches the dynamic range of the receptor.

13. The system in accordance with claim 12 further comprising a first filter circuit configured to receive said information signal provided to said dynamic range matching system, said filter having a bandpass response so as to filter out frequencies outside the frequency range of said information signal.

14. The system in accordance with claim 13 further comprising a linear amplification stage configured to receive said information signal and provide an amplified information signal to said first filter circuit.

15. The system in accordance with claim 12, wherein said combined signal generator comprises means to vary the ratio of said control signal and said gain adjusted information signal.

16. The system in accordance with claim 15, wherein said ratio is 1:1.

17. The system in accordance with claim 12 wherein said variable amplitude dependent gain stage further comprises amplifiers subjecting said combined signal to a power of 1/n, wherein n is a positive number including a fraction, so as to provide a combination of variable compression and expansion and unity gain factors.

18. The system in accordance with claim 17, further comprises a second filter circuit coupled to said variable amplitude dependent gain stage to filter out all frequencies outside the frequency range of said information signal.

19. The method in accordance with claim 18 further comprising a linear amplifier coupled to said second filter to amplify signals generated by said second filter.

* * * * *